(12) United States Patent
Ando

(10) Patent No.: US 7,145,846 B2
(45) Date of Patent: Dec. 5, 2006

(54) METHOD FOR CORRECTING INFLUENCE OF THICKNESS UNEVENNESS OF RECORDING MEDIUM, INFORMATION RECORDING/REPRODUCING APPARATUS USING THE SAME METHOD AND OPTICAL HEAD UNIT

(75) Inventor: Hideo Ando, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 519 days.

(21) Appl. No.: 10/095,007

(22) Filed: Mar. 12, 2002

(65) Prior Publication Data

US 2003/0072224 A1 Apr. 17, 2003

(30) Foreign Application Priority Data

Jul. 31, 2001 (JP) ............................. 2001-232633

(51) Int. Cl.
*G11B 7/095* (2006.01)
(52) U.S. Cl. ................................. 369/44.26; 369/53.22
(58) Field of Classification Search ............. 369/44.25, 369/44.26, 44.27, 44.29, 44.32, 53.2, 53.22, 369/53.23, 53.28, 53.13, 53.14
See application file for complete search history.

(56) References Cited

U.S. PATENT DOCUMENTS

| | | | | |
|---|---|---|---|---|
| 5,033,042 A | * | 7/1991 | Morishita | 369/112.05 |
| 5,157,555 A | * | 10/1992 | Reno | 359/823 |
| 5,204,851 A | * | 4/1993 | Kawada et al. | 369/126 |
| 5,446,723 A | * | 8/1995 | Best et al. | 369/44.26 |
| 5,621,717 A | * | 4/1997 | Finkelstein et al. | 369/112.16 |
| 5,771,214 A | * | 6/1998 | Saga | 369/44.29 |
| 5,793,735 A | * | 8/1998 | Oono | 369/112.02 |
| 5,859,818 A | * | 1/1999 | Tateishi et al. | 369/44.32 |
| 6,026,065 A | * | 2/2000 | Kim et al. | 369/44.27 |
| 6,125,088 A | * | 9/2000 | Ogasawara | 369/44.32 |
| 6,430,137 B1 | * | 8/2002 | Saimi et al. | 369/112.1 |
| 6,510,111 B1 | * | 1/2003 | Matsuura | 369/44.32 |
| 6,738,332 B1 | * | 5/2004 | Sato et al. | 369/53.28 |
| 2002/0145952 A1 | * | 10/2002 | Kono | 369/44.27 |

FOREIGN PATENT DOCUMENTS

| | | |
|---|---|---|
| JP | 2000-76665 A | 3/2000 |
| JP | 2000-171346 | 12/2001 |

OTHER PUBLICATIONS

Jpn. J. Appl. Phys. vol. 38 (1999) Pt. 1 No. 2A p. 764 Appendix A ( page 41).

* cited by examiner

*Primary Examiner*—Brian E. Miller
*Assistant Examiner*—Peter Vincent Agustin
(74) *Attorney, Agent, or Firm*—Pillsbury Winthrop Shaw Pittman LLP

(57) ABSTRACT

An optical disk unit of this invention includes a defocus detecting system for detecting a defocus of an objective lens, a thickness unevenness detecting system for detecting a thickness unevenness of a transparent resin layer provided nearest the objective lens of a recording medium, and a thickness unevenness correcting mechanism for changing the focusing characteristic of light impinging upon the objective lens based on a change in the thickness of the transparent resin layer detected by the thickness detecting system.

4 Claims, 19 Drawing Sheets

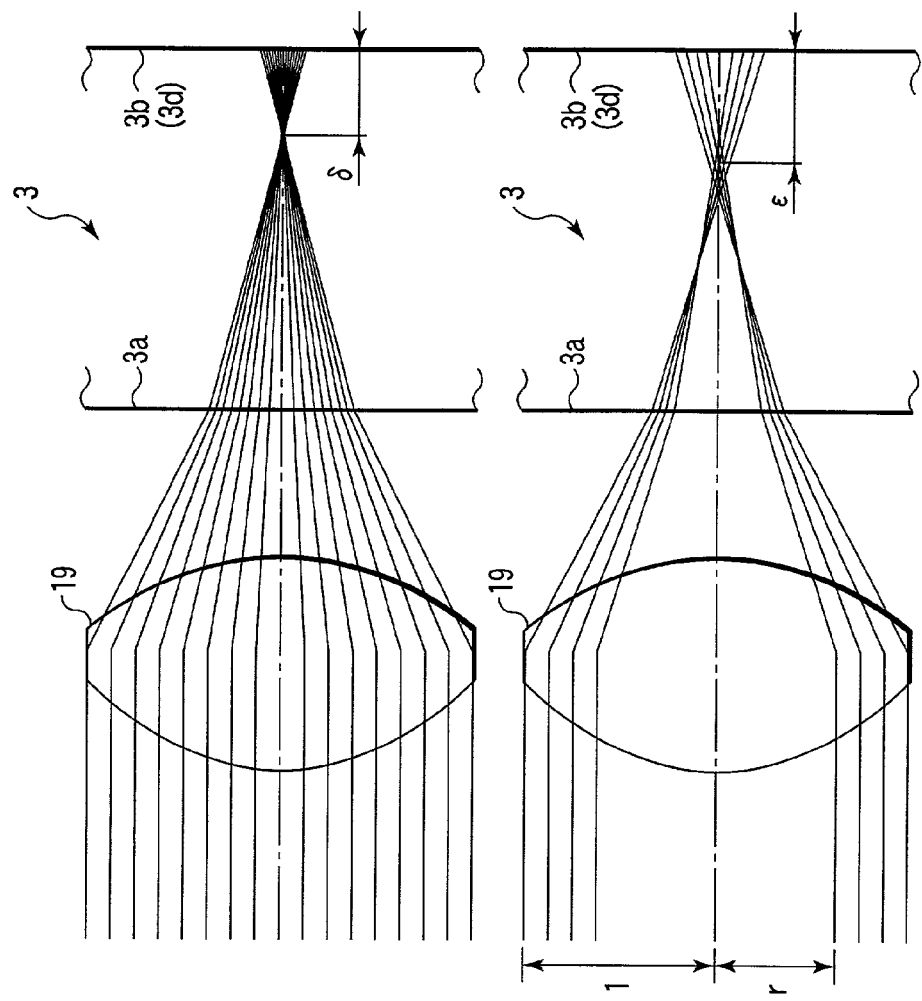

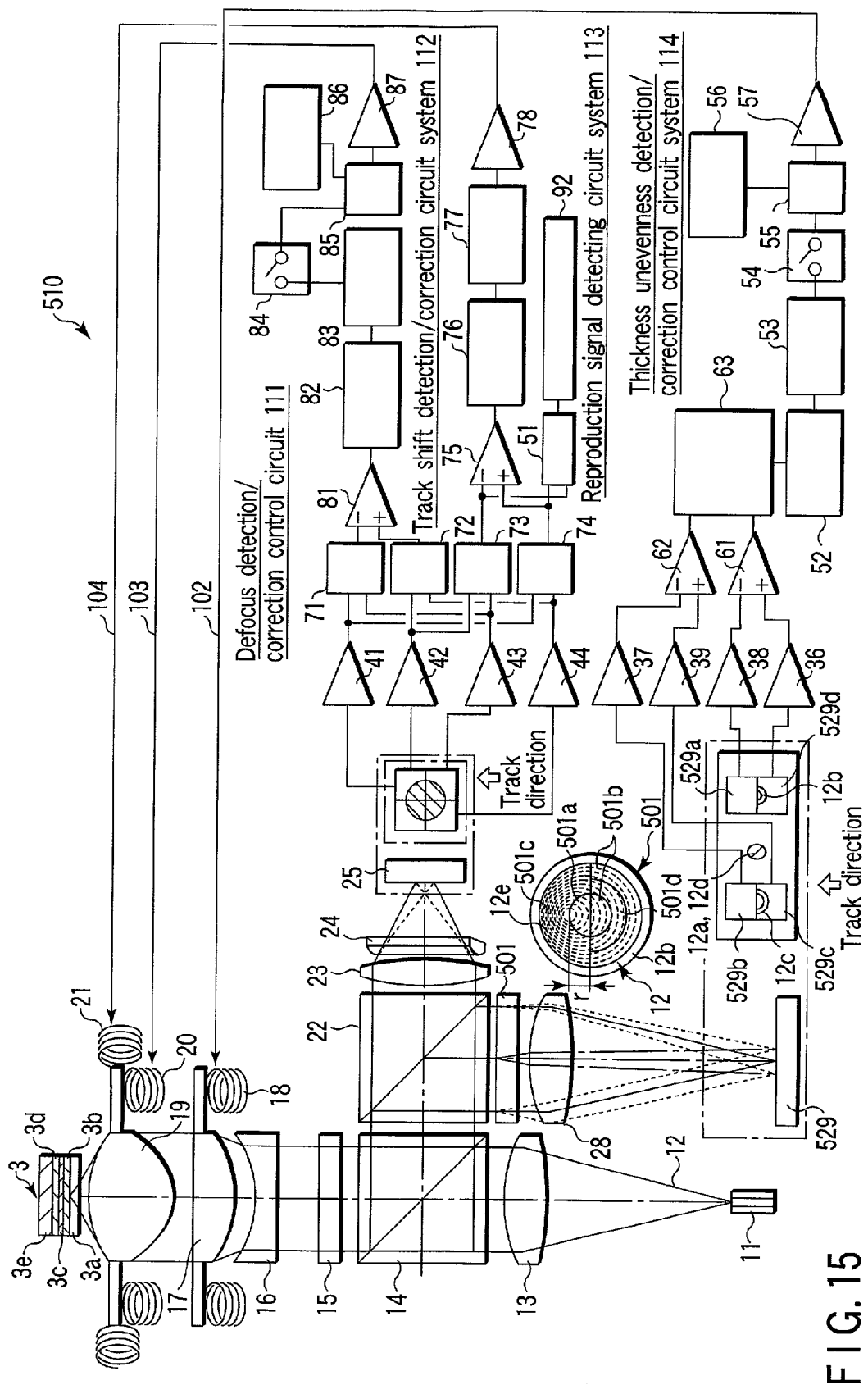
F I G. 15

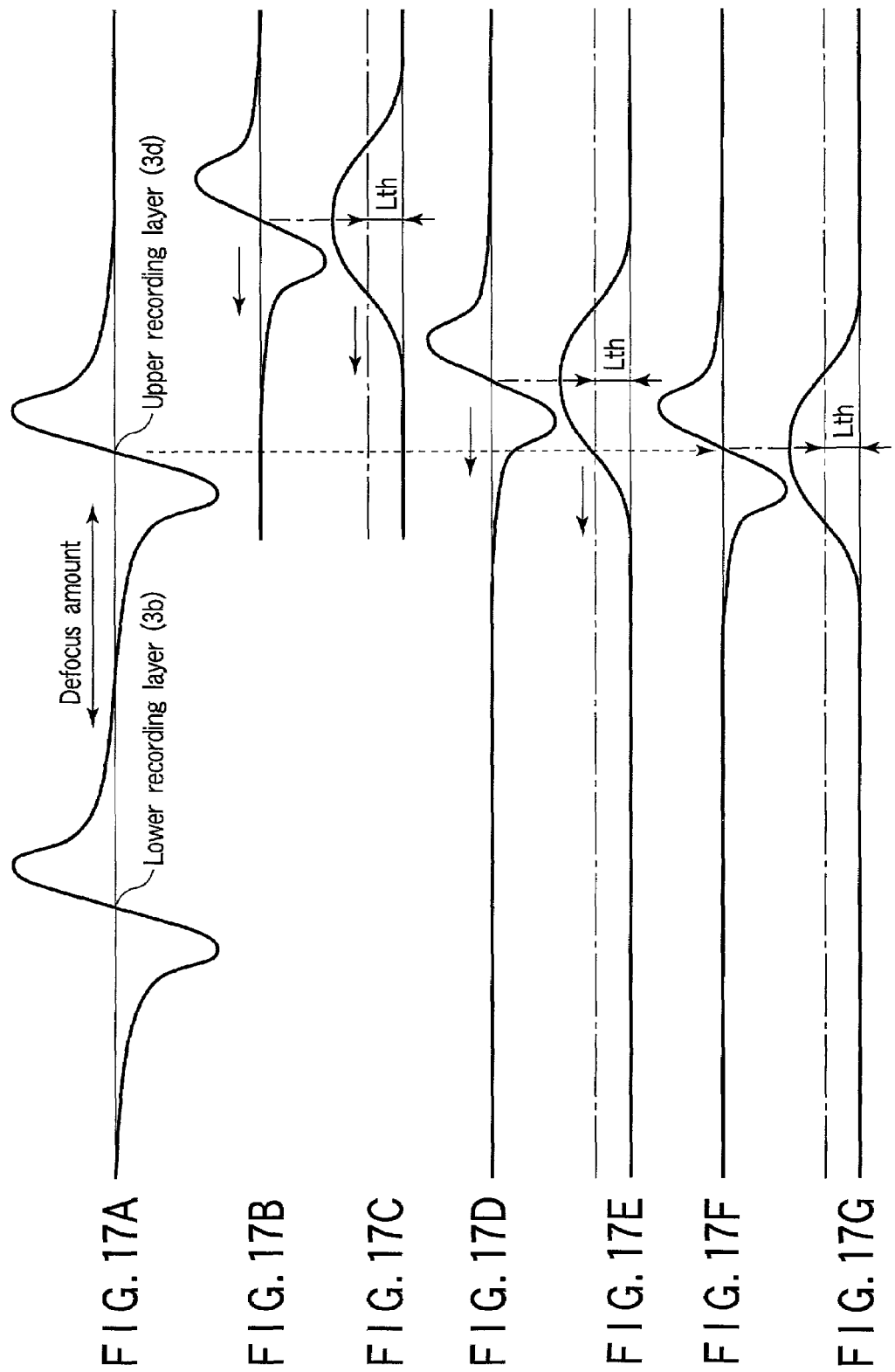

METHOD FOR CORRECTING INFLUENCE OF THICKNESS UNEVENNESS OF RECORDING MEDIUM, INFORMATION RECORDING/REPRODUCING APPARATUS USING THE SAME METHOD AND OPTICAL HEAD UNIT

CROSS-REFERENCE TO RELATED APPLICATIONS

This application is based upon and claims the benefit of priority from the prior Japanese Patent Application No. 2001-232633, filed Jul. 31, 2001, the entire contents of which are incorporated herein by reference.

BACKGROUND OF THE INVENTION

1. Field of the Invention

The present invention relates to an information recording/reproducing apparatus, which is capable of, by focusing light onto a light reflecting layer or a recording layer in an information recording medium comprising a transparent substrate or a transparent protective layer and a single or plural light reflecting layers or recording layers from the transparent substrate or the transparent protective layer, reproducing information recorded in the light reflecting layer or the recording layer or recording information in the information recording medium, and further having a correcting mechanism capable of detecting a thickness unevenness from light incident side for use in reproducing or recording, stretched from the surface of the transparent protective layer or the transparent substrate to the light reflecting layer or the recording layer and a correcting mechanism capable of correcting an influence of the detected thickness unevenness, and a method for correcting the thickness unevenness employed therein, and more particularly to, 1) A method for correcting a thickness unevenness by the time when information is reproduced or recording of information is started, after an information recording medium is loaded on the information recording/reproducing apparatus, and startup of control of that method;

2) A method for correcting an influence of thickness unevenness by the time when information is reproduced or recording of the information is started, just after a layer, which light is converged, of the light reflecting layer or the recording layer is moved (the layer is switched) with respect to a recording medium having plural light reflecting layers or recording layers, and startup of control of that method, and 3) A method for detecting a jump between layers (irregular shift of light converging spot between layers) generated at random, when information is reproduced or information is recorded by converging light to any layer in an information recording medium having plural light reflecting layers or recording layers.

2. Description of the Related Art

Jpn. Pat. Appl. KOKAI Publication No. 2000-171346 has disclosed an example of detecting a defocus of an objective lens by means of a defocus detecting system for detecting the defocus according to a knife edge method, and detecting a spherical aberration or a thickness unevenness in a substrate of a transparent recording medium with a single photo detector 7.

In the aforementioned detecting optical system, a hologram 2 used for dividing a light converging spot including the optical axis center into two sections extracts half of light from the center, and separates it to light 2a near the optical axis center and light 2b far from the optical axis center. Then, a light converging spot P1 of the light 2a near the separated optical axis center and a light converging spot P2 of the light 2b far from the optical axis center are detected on division border lines of split detectors 7a–7b and 7c–7d disposed at focusing positions with respect to a photomagnetic disk 6 upon focusing.

As for the signal detection method, this publication indicates i) detecting a difference in detecting signals from any one (7a–7b or 7c–7d) of the 2-split detectors making a pair as a defocus detecting signal, ii) calculating a difference in differential value of the detection signals from the 2-split detectors (7a–7b and 7c–7d) making a pair so as to detect a spherical aberration.

Generally, in the information recording/reproducing apparatus (optical disk drive unit) including the aforementioned example disclosed in the Jpn. Pat. Application No. 2000-171346, the spot size D (diameter) of a light converging spot to be irradiated to the recording layer or the light reflecting layer of the information recording medium (optical disk) in order to record information in the recording medium or reproduce information therefrom has such a relation of $D \propto \lambda/NA$ between a numerical aperture NA of the objective lens and wavelength $\lambda$ of light.

Because the recording density of information to be recorded in the information recording medium depends upon this spot size D largely, this spot size D needs to be reduced in order to improve the recording density.

In a widely prevailing CD type disk, the NA of the objective lens is substantially 0.47 and the wavelength of light for use is $\lambda=780$ nm.

In the DVD type disk, the NA of objective lens is substantially 0.60 and the wavelength of light for use is $\lambda=650$ nm. Currently, it has been proposed to obtain a recording density several times the DVD type by employing an objective lens whose NA is about 0.9 and light of wavelength of about $\lambda=400$ nm to meet a demand for higher density.

In the current CD type and DVD type disks, when converging light on the light reflecting layer or the recording layer, light is irradiated from the side of the substrate or supporting body (beyond the substrate). If it is intended to converge light on the light reflecting layer or the recording layer by intensifying the NA of the objective lens and shortening the wavelength of light, light is irradiated from the side of a covering layer (transparent protective layer) which functions as a protective film for the light reflecting layer or the recording layer provided opposite to the substrate (supporting body).

However, if a thickness unevenness occurs in the thickness of the transparent protective layer, spherical aberration occurs so that light spot converged on the light reflecting layer or the recording layer is expanded thereby providing a problem that recording or reproduction characteristic deteriorates. Meanwhile, the amount of thickness unevenness in the transparent protective layer or the amount of the spherical aberration with respect to the thickness unevenness increases proportional to the fourth power of the NA of the objective lens.

Further, to increase the recording capacity of the information recording medium, it has been already proposed to provide the DVD type disk with two layers of the recording layers or the light reflecting layers and converge light to only any one layer of the respective layers in the same direction. By providing the recording layer or the light reflecting layer with two layers each (or more), a distance from the transparent protective layer differs depending on each layer. Thus, there is generated such a problem that by using an objective lens with a higher NA than 0.6 (for DVD-disk), the degree of spherical aberration generated by the thickness unevenness exceeds its allowance largely in all the layers or some layer exceeding its allowance may occur.

For the reason, there exists a necessity of measuring a thickness unevenness in the transparent protective layer or a substantial thickness unevenness generated in the light reflecting layer or the recording layer so as to correct the spherical aberration in a real time.

Meanwhile, the aforementioned Jpn. Pat. Appl. KOKAI Publication No. 2000-171346 has not described anything about a correction method (control method) for removing an influence of the thickness unevenness based on the detected spherical aberration.

Further, if there are two or more recording layers or light reflecting layers, the light converging spot generated at random often may be moved to a different recording layer or light reflecting layer due to disturbance such as vibration (hereinafter referred to as abnormal jump between the recording layers), thereby leading to difficulty of focus control (generating defocus).

BRIEF SUMMARY OF THE INVENTION

An object of the present invention is to provide an information recording/reproducing apparatus ensuring a high reliability with respect to thickness unevenness in a transparent resin layer located between a recording layer or a light reflecting layer and an objective lens, and spherical aberration generated depending on light converging position with respect to a plural-layer film when light is focused on the recording layer or the light reflecting layer through an objective lens and a method of thickness unevenness correction control for removing an influence of the thickness unevenness.

According to an aspect of the present invention, there is provided an optical head unit comprising:

a light source supplies light of a predetermined wavelength;

an objective lens focus the light from the light source to the recording layer of the recording medium;

an objective lens moving mechanism moves the objective lens in the optical axis direction and in the direction intersecting a guide groove and a signal mark string formed in the recording medium preliminarily;

a defocus detecting system detects a defocus in the objective lens;

a thickness unevenness detecting system detects a thickness unevenness in a transparent resin layer of the recording medium provided nearest the objective lens; and a thickness unevenness correcting mechanism changes a focusing characteristic of light impinging upon the objective lens from the light source based on a change in the thickness of the transparent resin layer of the recording medium detected by the thickness detecting system.

According to an other aspect of the present invention, there is provided an information recording/reproducing apparatus for reproducing information recorded in the recording layer or recording the information in a recording medium, the information recording/reproducing apparatus including an optical head unit comprising:

a light source an objective lens focus light from the light source to a recording layer of the recording medium;

an objective lens moving mechanism moves the objective lens in the optical axis direction and in the direction intersecting a guide groove and a signal mark string formed in the recording medium preliminarily;

a defocus detecting system detects a defocus in the objective lens;

a thickness unevenness detecting system for detecting a thickness unevenness in a transparent resin layer of the recording medium provided nearest the objective lens; and a thickness unevenness correcting mechanism changes a focusing characteristic of the light impinging upon the objective lens from the light source based on a change in the thickness of the transparent resin layer of the recording medium detected by the thickness detecting system, wherein the thickness unevenness of the transparent resin layer is detected using a defocus detecting signal detected by the defocus detecting system so as to remove an influence of the defocus of the objective lens by removing an influence of the thickness unevenness of the transparent resin layer.

According to a still other aspect of the present invention, there is provided a method for removing an influence of thickness unevenness in a recording medium upon reproducing information recorded in the recording layer of the recording medium or recording information in the recording medium, including an optical head comprising: a light source for supplying light of a predetermined wavelength; an objective lens for focusing light from a light source to a recording layer of a recording medium; a defocus detecting system for detecting a defocus generated when light converged to the recording medium by the objective lens is not focused at a predetermined position; a thickness unevenness detecting system including at least two photo detecting regions and for detecting a thickness unevenness (spherical aberration) in a transparent resin layer of the recording medium provided nearest the objective lens; a thickness unevenness correcting mechanism for changing focusing characteristic of light impinging upon the objective lens from a light source based on a change in thickness of the transparent resin layer of the recording medium detected by the thickness unevenness detecting system; and a defocus correcting mechanism for correcting a defocus detected by the defocus detecting system, the method comprising:

when changing the recording layer which light is focused by the objective lens from a currently focused recording layer to another recording layer, terminating changing of the focusing characteristic of light by the thickness unevenness correcting mechanism, terminating defocus correction control by the defocus correcting mechanism, and moving a light converging position by the objective lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 7A and 7B are schematic views for explaining a principle that detection sensitivity can be improved by an increase of the occurrence of the spherical aberration described with reference to FIG. 3;

FIG. 15 is a schematic sectional view for explaining a still further embodiment of the optical disk unit shown in FIG. 2;

FIGS. 17A to 17G show a relative position of defocus and changes in the output of the thickness unevenness detecting signal and thickness unevenness detecting sum signal;

DETAILED DESCRIPTION OF THE INVENTION

Hereinafter, the embodiments of the present invention will be described in detail with reference to the accompanying drawings.

Figure 1:
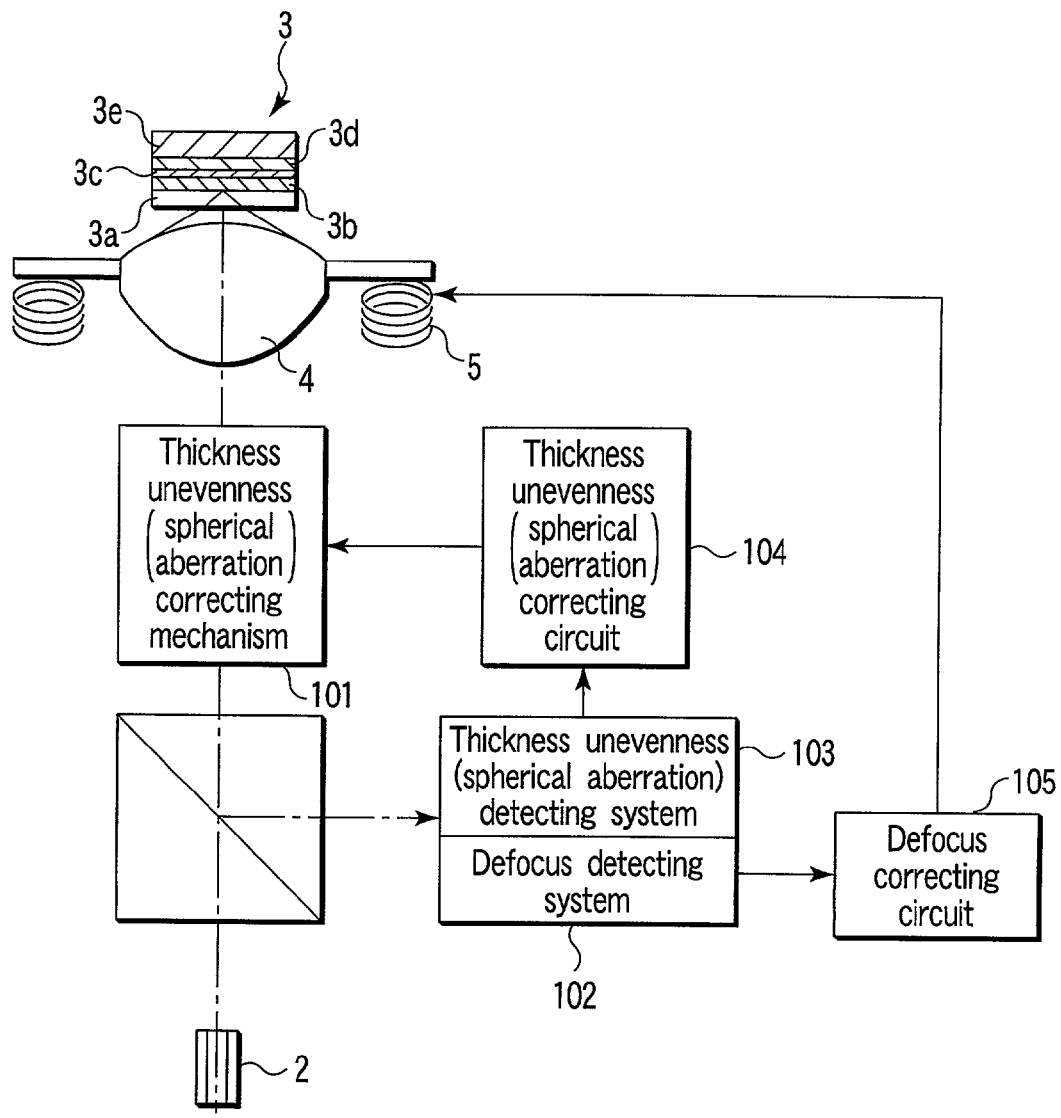
FIG. 1 is a schematic view for explaining an example of the basic structure of an optical head unit and an information recording/reproducing apparatus incorporating the optical head unit of the present invention.

FIG. 1 is a schematic view for explaining an example of the basic structure of an optical head unit and an information recording/reproducing apparatus incorporating the optical head unit of the present invention.

As shown in FIG. 1, each of the optical head unit and the information recording/reproducing apparatus 1 incorporating the optical head unit includes a laser device 2 for emitting a laser beam of a predetermined wavelength, an objective lens 4 for focusing the laser beam emitted from the laser device 2 on an information recording medium or an arbitrary recording layer in an optical disk 3 capable of achieving a high density recording, in which two layers are provided on a single side thereof, and defocus correcting coils 5 for changing the position of the objective lens 4 so that a distance between an arbitrary recording layer of the optical disk 3 and the objective lens 4 matches a focal distance inherent of the objective lens 4.

A thickness unevenness (spherical aberration) correcting mechanism 101 for correcting the unevenness (spherical aberration) in thickness of a surface covering layer 3a provided on the side on which the laser beam incidence side of the optical disk 3 is provided between the laser device 2 and the objective lens 4.

A defocus detecting system 102 is provided between the optical disk 3 and the laser device 2. The defocus detecting system 102 detects a defocus, which is a deviation of the position of the objective lens 4 according to the laser beam directed from the laser device 2 to the optical disk 3 and a reflect laser beam which is reflected by an arbitrary recording plane of the optical disk 3 and split by a beam splitter 6 for splitting the laser beam reflected by the recording layer of the optical disk 3. The thickness unevenness correcting mechanism 101 brings the status of the laser beam incidence upon the objective lens 4 near a status having no thickness unevenness, based on a thickness unevenness component detected by a thickness unevenness (spherical aberration) detecting system 103, which picks up the thickness unevenness (spherical aberration) of the covering layer 3a in the optical disk 3, included in the defocus component detected by the defocus detecting system 102. Meanwhile, the position of the objective lens 4 is controlled independently by a defocus correcting circuit 105 corresponding to the defocus detected by the defocus detecting system 102.

According to the principle of thickness unevenness detection (spherical aberration detection), as shown in FIG. 1, a thickness unevenness detection (spherical aberration detection) signal is obtained only when the defocus correction is carried out completely (on focusing). This indicates a necessity of detecting the defocus at a very high precision. To meet that demand, the defocus is detected using all spot sections of a laser beam (if knife edge method is employed to detect the defocus, the defocus detection is carried out using half of detected light extracted by splitting along a straight line including the vicinity of an optical axis in which the detection accuracy is stabilized most). As a result, even if the laser beam contains much spherical aberration, the defocus can be detected very stably at a high precision.

Figure 2:
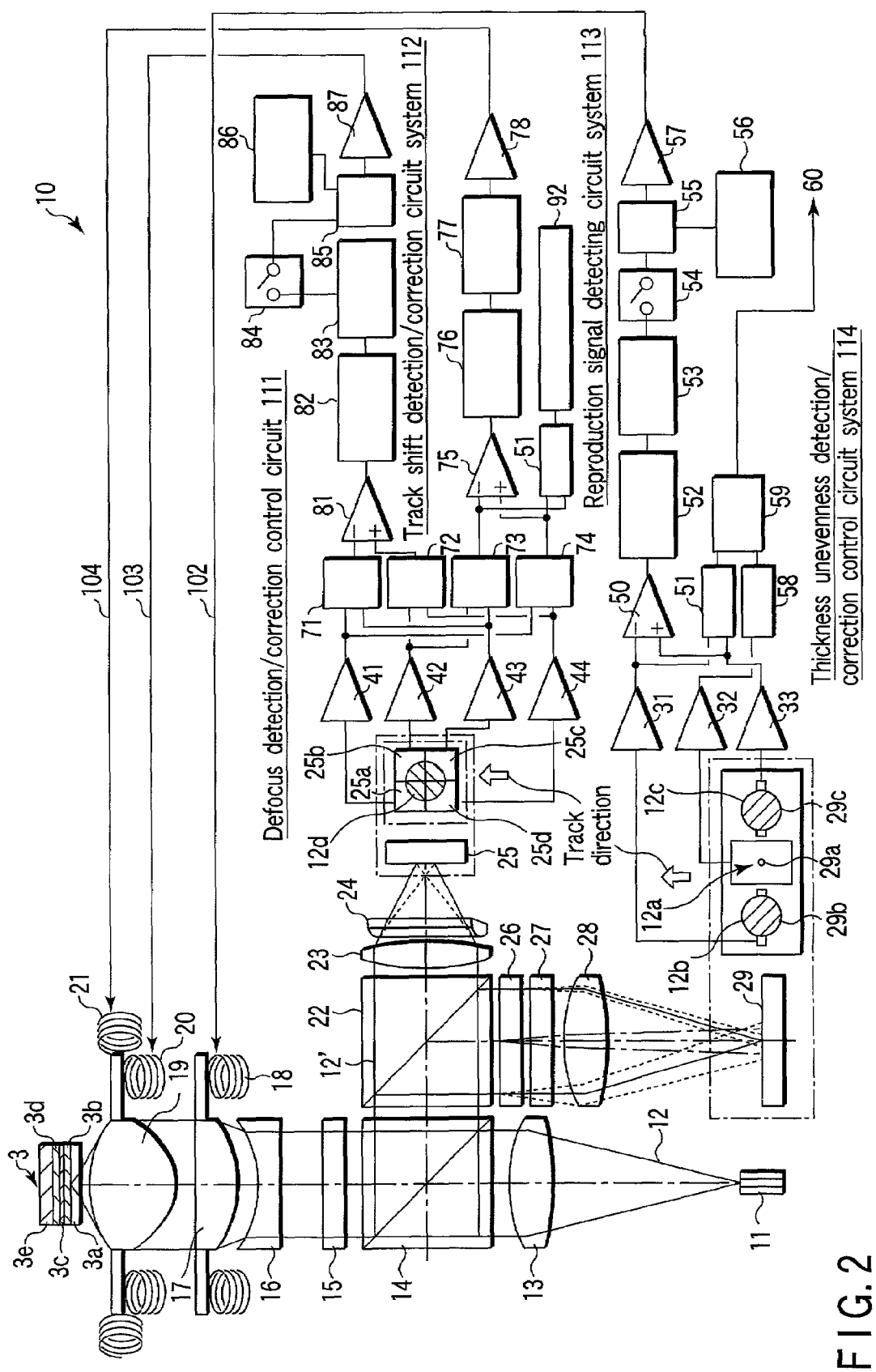
FIG. 2 is a schematic view for explaining an example of the structure in more detail, of the optical head unit and the information recording/reproducing apparatus incorporating the optical head unit shown in FIG. 1.

FIG. 2 is a schematic view for explaining an example of the structure in more detail, of the optical head unit and the information recording/reproducing apparatus (hereinafter referred to as optical disk unit) incorporating the optical head unit shown in FIG. 1.

As shown in FIG. 2, an optical disk unit 10 records information in an arbitrary recording layer of the optical disk 3, which is an information recording medium, and reproduces information from the optical disk 3. More specifically, in the optical disk unit 10, a laser beam 12 is irradiated from a laser unit 11, which is a light source, to a predetermined recording layer 3d or 3b in the optical disk 3 and a reflect laser beam 12' reflected from the arbitrary information recording layer 3d or 3b in the optical disk 3 is received so as to reproduce information recorded in the optical disk 3. When information is recorded in the optical disk 3, an intensity of the laser beam emitted from the laser device 2 changes intermittently by changing the magnitude of a laser driving current supplied to the laser unit 11 corresponding to data to be recorded (information) is irradiated to an arbitrary information recording layer of the optical disk 3. Meanwhile, recording of information into the optical disk 3 and reproduction of information from the optical disk 3 will be described in detail later. Although not shown, needless to say, a guide groove acting as a guide when information is recorded and a signal mark string, which is already recorded information, are formed in the information recording layers 3d and 3b of the optical disk 3.

In the optical disk unit 10 shown in FIG. 2, laser beam 12 emitted from the laser unit 11 is collimated by a collimate lens 13, irradiated into a polarization beam splitter 14 and passes through it toward the optical disk 3. The laser beam 12 passing through the polarization beam splitter 14 passes a λ/4 plate 15, a thickness unevenness correcting concave lens 16 and a thickness unevenness correcting convex lens 17 successively and then is guided to an objective lens 19. Meanwhile, the thickness unevenness correcting convex lens 17 is formed so as to be movable in the direction of the optical axis by means of a thickness unevenness correcting convex lens driving coil 18. The objective lens 19 is formed so as to be movable independently in the optical axis direction and in each of directions perpendicular to a track (guide groove) and the signal mark string (not shown) formed in the optical disk 3.

The laser beam 12 guided by the objective lens 19 is provided with predetermined convergence so that it is converged to a predetermined recording layer of the optical disk 3. In the optical disk (information recording medium) 3, a recording layer or an optical reflecting layer 3d is provided on one face of a substrate 3e such that it adjoins the substrate 3e (adjacent the substrate), followed by a space layer 3c transparent to the wavelength of the laser beam 12, a recording layer or an optical reflecting layer 3b (adjacent a covering layer) apart from the recording layer or the optical reflecting layer adjacent the substrate 3e and a transparent protective layer (light irradiation side covering layer) 3a, layered successively.

The laser beam 12 focused on any one of an arbitrary recording layers (or light reflecting layers) 3d and 3b in the optical disk 3 by the objective lens 19 forms a recording mark (pit) in that light focused recording layer by changing the characteristic of the phase of the recording layer while reflected laser beam 12' generated slightly is returned to the objective lens 19. On the other hand, when information is reproduced, light intensity is changed depending on the status of the recording layer and reproduced laser beam (reflected laser beam) 12' is returned to the objective lens 19. Because the reproduced laser beam 12' and the reflected laser beam 12' are handled substantially in the same manner in a signal reproducing system described below, hereinafter, the reproduced laser beam 12' will be described below.

The reproduced laser beam 12' returned to the objective lens 19 passes the thickness unevenness correcting convex lens 17, the thickness unevenness correcting concave lens 16 and the λ/4 plate 15 to be sent back to the polarization beam splitter 14. The polarization beam splitter 14 separates the reflected laser beam 12' from laser beam 12 directed from the laser unit 11 toward the objective lens 19 (optical disk 3).

The reproduced laser beam 12' separated from the laser beam 12 by the polarization beam splitter 14 is divided to substantially ½ each by a half prism 22.

After the separation, one laser beam 12' is provided with predetermined convergence by a spherical lens 23 and then provided with predetermined focusing characteristic in a direction perpendicular to the optical axis (section of the laser beam 12') by cylindrical lens 24 provided after the lens 23 so that it is focused on a light receiving plane of a first photo detector 25 for use in detecting a defocus and track shift. Meanwhile, the first photo detector 25 is a four-division photo detector having four light receiving regions 25a, 25b, 25c and 25d, produced by dividing with two straight lines passing the optical axis and perpendicular to each other. For explanation of a light receiving pattern, FIG. 2 shows a plan view of the condition in which the separated reproduced laser beam 12' is focused.

Remaining separated reproduced laser beam 12' passes a hologram device 26 in which a predetermined refraction pattern is formed and a sensitizing filter 27 for facilitating detection of a spherical aberration in order. After being provided with predetermined convergence by a spherical lens 28, the beam is focused on a light receiving plane of a second photo detector 29. The second photo detector 29 is a detector in which three light receiving regions 29a, 29b and 29c are disposed in series so that zero-order light and ±first-order light passing the hologram device 26 can be received in an arbitrary direction perpendicular to the optical axis. For explanation of the pattern of the light receiving plane, FIG. 2 shows a plan view of the condition in which the separated reproduced laser beam 12' is focused. An optical system having the spherical lens 23, the cylindrical lens 24 and the first photo detector 25 corresponds to the defocus detecting system 102 in FIG. 1 while an optical system having the hologram device 26, the sensitizing filter 27 for detecting spherical aberration, the spherical lens 28 and the second photo detector 29 corresponds to the thickness unevenness (spherical aberration) detecting system 103 shown in FIG. 1.

An optical system including the thickness unevenness correcting concave lens 16, the thickness unevenness correcting convex lens 17 and the thickness unevenness correcting convex lens driving coil 18 corresponds to the thickness unevenness (spherical aberration) correcting mechanism 101. A current of a predetermined magnitude and polarity is supplied from a spherical aberration correcting circuit 104 shown in FIG. 1 to the thickness unevenness correcting convex lens driving coil 18 and consequently, the thickness unevenness correcting convex lens 17 is moved so as to change a distance between the thickness unevenness correcting convex lens 17 and the thickness unevenness correcting concave lens 16, thereby making it possible to correct an influence of the spherical aberration (unevenness of the thickness of the covering layer 3a in the optical disk 3).

The reproduced laser beam 12' focused on the first photo detector (for detecting a defocus and a track shift) 25 is converted to electric signal (current) corresponding to the light intensity of irradiated laser beam 12' by the four light receiving regions 25a, 25b, 25c and 25d and then converted to a voltage value by preamplifiers 41 (corresponding to the light receiving region 25a), 42 (corresponding to the light receiving region 25b), 43 (corresponding to the light receiving region 25c) and 44 (corresponding to the light receiving region 25d).

Outputs of the respective preamplifiers 41 to 44 are inputted to an adder 71 for summing an output of the preamplifier 41 with an output of the preamplifier 43, an adder 72 for adding an output of the preamplifier 42 with an output of the preamplifier 44, an adder 73 for summing an output of the preamplifier 42 with an output of the preamplifier 43 and an adder 74 for summing an output of the preamplifier 41 with an output of the preamplifier 44.

The outputs of the adders 71 and 72 are subtracted by a subtractor 81 in order to generate a defocus control signal to be supplied to the defocus correcting coil 20 for use in correcting a defocus of the objective lens 19 and amplified (seldom attenuated) to a predetermined level by a gain/band setting circuit 82. After the phase is compensated by a phase compensating circuit 83, the signal is outputted to an adder 85 at a predetermined timing by a switch 84.

A signal supplied to the adder 85 (after the gain and band are set up and the phase is compensated) is added to a reference voltage supplied from a reference voltage generating section 86 and amplified to a predetermined magnitude by an amplifier 87 and supplied to the focus coil 20 at a timing set up by the switch 84.

The outputs of the adders 73 and 74 are subtracted by a subtractor 75 in order to generate the track shift control signal to be supplied to a track shift correcting coil 21 for correcting the track shift of the objective lens 19 and amplified (seldom attenuated) to a predetermined level by a gain/band setting circuit 76. After the phase is compensated by a phase compensating circuit 77, the signal is amplified to a predetermined magnitude by an amplifier 78 and then supplied to the track coil 21.

The outputs of the adders 73 and 74 are summed up by an adder 91 in order to obtain a reproduction signal and a result thereof is supplied to a reproduction signal processing circuit 92.

The reproduced laser beam 12' focused on the second photo detector (for detecting spherical aberration (thickness unevenness of the covering layer) 29 is converted to an electric signal (current) corresponding to the light intensity of irradiated laser beam 12' by the light receiving region 29a for receiving the zero-order light and the light receiving regions 29b and 29c for receiving the ±first-order lights and then converted to a voltage value by preamplifiers 31 (corresponding to region 29b), 32 (corresponding to region 29a), and 33 (corresponding to region 29c).

The outputs of the preamplifiers 31 and 33 are supplied to a subtractor 50 and an adder 51 for carrying out addition so as to generate a difference signal and a sum signal between voltages signals obtained from the ±first-order light.

The difference signal obtained by the subtractor 50 is amplified (in some rare cases attenuated) to a predetermined gain by a gain/band setting circuit 52 and after that, a predetermined band is set up. After the phase is compensated by a phase compensating circuit 53, the signal is outputted to an adder 55 at a predetermined timing by a switch 54.

The difference signal supplied to the adder 55 (after the gain and band are set up and the phase is compensated) is added to a reference signal supplied from a reference voltage generating section 56 and amplified to a predetermined magnitude by an amplifier 57. After that, the signal is supplied to the thickness unevenness correcting convex lens driving coil 18 at a timing set up by the switch 54.

The sum signal obtained by the adder 51 is compared with a signal obtained in a comparator 59 by converting photo-electrically the zero-order light produced by attenuating the output of the preamplifier 32 to a predetermined level by means of an attenuator 58 in order to enable comparison with that sum signal, because the sum signal has an intensity base on the ±first-order light. The output of the comparator 59 is employed as a detection signal for detecting abnormal jump between recording layers (described later) 60.

A phenomenon generated when the thickness of the surface covering layer 3a with the laser beam 12 focused on the recording layer 3b (near the covering layer) in the optical disk (information recording medium) 3 will be described with reference to FIG. 3.

The objective lens 19 is designed so as to collect light most (the minimum circle of confusion coincides with the depth of the covering layer) when the thickness of the transparent protective layer (covering layer) 3a is of an ideal thickness).

For example, if the thickness of the surface covering layer 3a is thinner than ideally expected, the spherical aberration occurs so that a laser beam 12 passing outside of the objective lens 19 is focused frontward of a laser beam 12 passing inside of the objective lens 19 in the optical axis direction. Therefore, a position in which the light intensity (center intensity) in a spot section of the laser beam 12 maximizes at the position of the minimum circle of confusion (in the optical axis direction) is moved frontward by δ as compared to when there is no spherical aberration.

Figure 3:
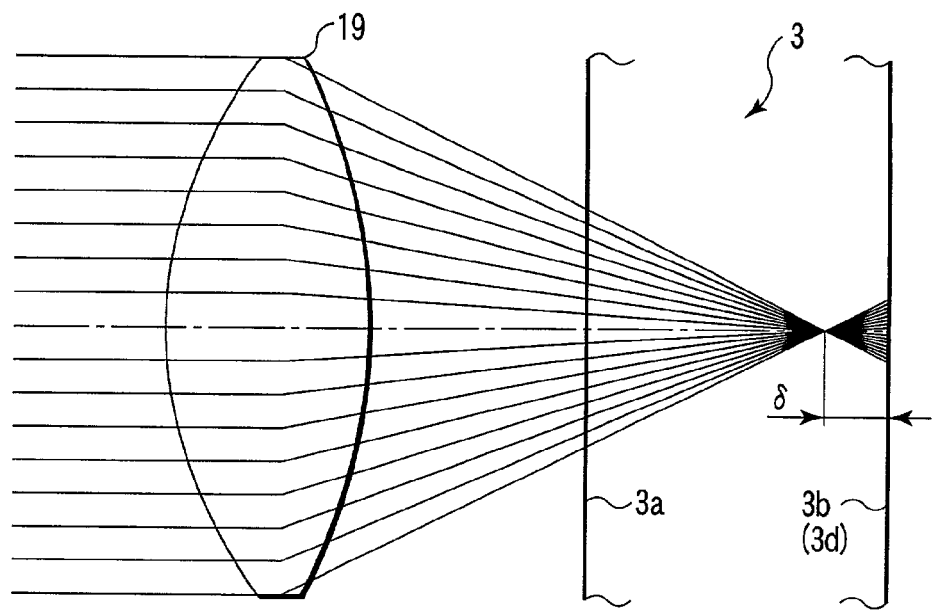
FIG. 3 is a schematic view for explaining occurrence of a shift of a circle of least confusion due to spherical aberration, which is a phenomenon generated when the thickness of a transparent protective layer near an objective lens changes while a laser beam converges on a recording layer near a covering layer of an optical disk (information recording medium) in an optical disk unit.

Conversely, if the thickness of the surface covering layer 3a is thicker than ideally expected, the position of the minimum circle of confusion is moved in an opposite direction to the example shown in FIG. 3 or deeper in the optical axis direction (rightward in this specification) although not shown.

When the objective lens 19 is moved a space between the recording layer 3d (near the substrate) and the layer 3b (near the covering layer) of the objective lens 19 as well as when the thickness of the surface covering layer 3a changes, the position of the objective lens 19 is corrected so that the spherical aberration becomes 0 while beam is focused on the recording layer 3b (near the covering layer) and then, if a spot of the laser beam 12 is moved to the recording layer 3d (near the substrate), the same phenomenon occurs.

If the change rate of the thickness of the surface covering layer 3a is relatively smaller than ideally expected, the change rate of the thickness and the moving distance δ shown in FIG. 3 can be regarded to be in an approximately proportional relation.

As shown in FIG. 2, according to the present invention, all the reproduced laser beam 12' is received by the first photo detector 25 and used for detection of the defocus, even if a great deal of spherical aberration components are contained in the reproduced laser beam 12', the defocus can be detected stably at a high precision.

Because a position where refracted light in the direction of the optical axis of the reproduced laser beam 12' is focused using the hologram device 26 is shifted by a predetermined amount as shown in FIG. 2, the reproduced laser beam 12' passing the spherical lens 28 and provided with predetermined convergence is converged by an activity of the hologram device 26 such that refracted light of the +first-order light is focused backward of the light receiving plane of the second photo detector 29 while the −first-order refracted light is focused frontward of the light receiving plane of the second photo detector 29. In other words, the second photo detector 29 is disposed at a position where the zero-order light of the reproduced laser beam 12' passing the hologram device 26 is converged and a contrast position to the position where the ±first-order lights generated by the hologram device 26 are focused in the direction of the optical axis.

Consequently, the zero-order light of the reproduced laser beam 12' focused by the second photo detector 29 is focused at a predetermined position of the second photo detector 29 as a small convergent spot 12a while the +first-order light and −first-order light are focused at each predetermined position thereof as larger spots 12b and 12c than the spot 12a.

As shown in FIG. 2, the amount of light of each the zero-order beam spot 12a and the ±first-order beam spots 12b and 12c is detected by the photo detecting cells 29a, 29b and 29c within the second photo detector 29. The photo detecting cells 29b and 29c for detecting the ±first-order beam spots 12b and 12c, can detect only the center portion of the beam spots 12b and 12c so as to detect the light intensity in the center of each of the beam spots 12b and 12c. Meanwhile, a direction in which the track direction (circumferential direction) of the information recording medium 3 is irradiated to the second photo detector 29 is a vertical direction relative to this specification paper in FIG. 2. By intersecting the length direction of each of the photo detecting cells 29b and 29c with the track direction, the light is unlikely to be affected by the refraction pattern contained in light reflected by a pre-groove (not shown) on the information recording medium 3.

More specifically, according to the method for detecting the spherical aberration, the center intensities of the ±first-order beam spots 12b and 12c, which are parts of the laser beams 12 separated by the hologram device 26, or distributions of brightness of the beam spots 12b and 12c or at least a spot size of the beam spots 12b and 12c is compared about two different positions (points A and B in FIG. 4 described later) in the direction of the optical axis of the laser beam 12. That is, by comparing about any one of the center intensities, brightness distributions or spot sizes of the ±first-order beam spots 12b and 12c, the magnitude (quantity) and direction of spherical aberration originated from the thickness unevenness of the surface protective layer (covering layer) 3a are detected.

Figure 4:
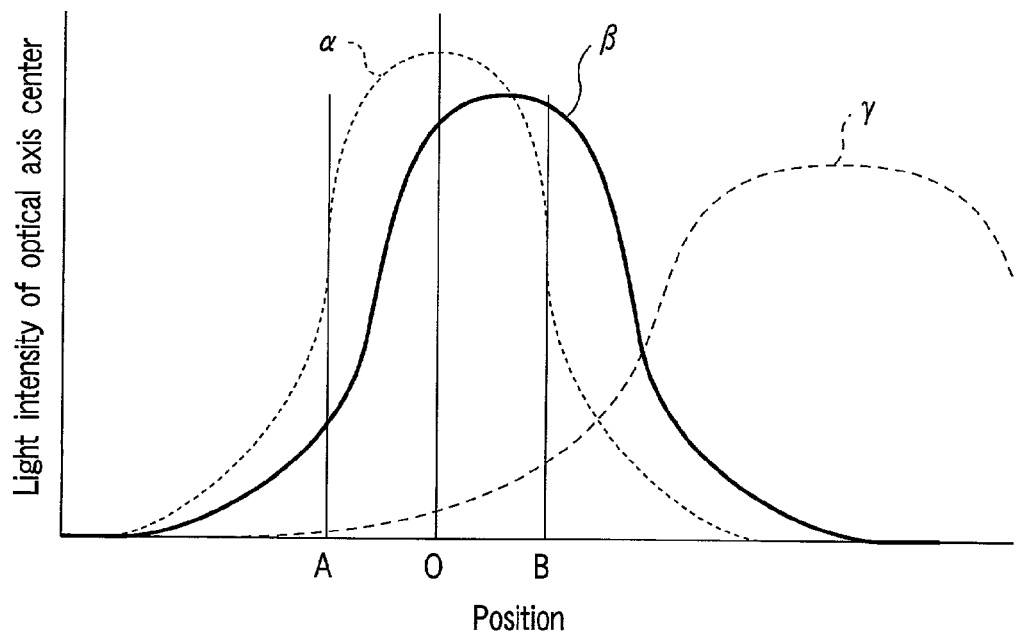
FIG. 4 is a schematic view for explaining changes in light intensity of light spots of the laser beam at respective positions corresponding to shift positions of the circle of confusion, when a converging position or the minimum circle of confusion by a spherical lens in a direction along an optical axis of a detecting optical system shifts in the optical disk unit shown in FIG. 2.

FIG. 4 is a schematic view for explaining changes in light intensity of light spots of the laser beam 12 at respective positions corresponding to shift positions of the minimum circle of confusion, when a converging position or the minimum circle of confusion by a spherical lens 28 in a direction along optical axis of a detecting optical system shifts.

In FIG. 4, the position "O" indicates a position of a zero-order photo detecting cell 29a in the second photo detector 29 relative to zero-order light having no spherical aberration, the position "A" indicates a position of a photo detecting cell 29b relative to the +first-order light beam and the position "B" indicates a position of a photo detecting cell 29c relative to the −first-order light beam.

Although as evident from FIG. 4, the center intensities of the ±first-order light beams at the positions "A" and "B" coincide with each other in a condition having no spherical aberration or on a curve α, if a slight spherical aberration occurs as indicated on a curve β, the center intensity at the position "B" is stronger than the center intensity at the position "A". A difference between these center intensities is obtained with the subtractor 50.

If such a large change as a shift of the spot of the laser beam 12 to the recording layer 3d occurs due to a disturbance or the like when the focal point of the spherical lens 28 is matched with the recording layer 3b near the covering layer (if an abnormal jump between the recording layers occurs), the magnitude of the spherical aberration is increased largely as indicated by a curve γ. As a result, the amounts of detected lights drop conspicuously both at the positions "A" and "B".

That is, because the total amount of lights detected at the photo detecting cells 29b and 29c in the second photo detector 29 drops remarkably when an abnormal jump between recording layers occurs, output signal of the adder 51 shown in FIG. 2 drops largely. On the other hand, because drop of the light amount of the laser beam 12a irradiated by the photo detecting cell 29a is slight even if the abnormal jump between the recording layers occurs, the output signal of the attenuator 58 does not change so much. Thus, by detecting a difference between the both with the comparator 59, a detection signal 60 of detecting an abnormal jump between the recording layers 3d and 3b can be obtained.

Next, optimum ranges of moving amounts (a distance between A and O and a distance between B and O in FIG. 4) in a direction along the optical axis of the ±first-order light beams generated with the hologram device 26 will be described.

First, a consideration model for use in considering a detection characteristic will be described with reference to FIG. 5.

The laser beam 12 emitted from the laser unit 11 described with reference to FIG. 2 passes the collimate lens 13 and the objective lens 19 as shown on the left of FIG. 5 and are focused on the recording layer 3b near the covering layer of the optical disk 3 and the recording layer 3d near the substrate.

Figure 5:
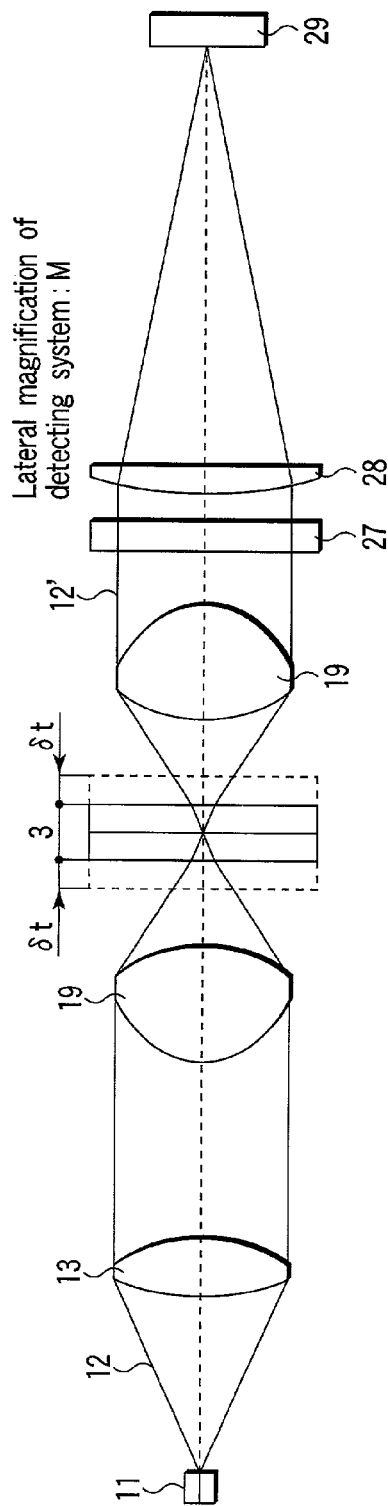
FIG. 5 is a schematic view for explaining a shift amount along the optical axis of ±first-order light generated by a hologram device for defining an optimum range of a distance between A and O and a distance between B and O shown in FIG. 4, and detection characteristic thereof.

On the other hand, the reproduced laser beam 12' reflected by the recording layer 3b near the covering layer of the optical disk and the recording layer 3d near the substrate passes the objective lens 19 and the spherical lens 28 successively as shown on the right side of FIG. 5 so as to be provided with predetermined focusing characteristic and are irradiated onto the second photo detector 29.

Assuming that the lateral magnification of the detecting system is M, if optical paths of laser beams are parallel between the objective lens 19 acting upon the laser beam 12 directed to the recording layer and the spherical lens 28 acting upon the reflected laser beam 12', the lateral magnification is given as a ratio between the focal distance of the spherical lens 28 and the focal distance of the objective lens 19. Depth magnification is given as $M^2$ in the same optical system.

If a thickness unevenness $\delta t$ is generated in the transparent protective layer 3a as described previously with reference to FIG. 3, the position of the minimum circle of confusion of the laser beam 12 focused on the recording layers 3b and 3d of the optical disk 3 by the objective lens 19 shifts by only $\delta$ However, after reflected by the recording layer 3b or 3d, the laser beam 12 returned to the objective lens 19 is affected by the thickness unevenness $\delta t$ of the transparent protective layer 3a again. A shift amount $\zeta$ of the minimum circle of confusion of the laser beam 12' focused on the second photo detector 29 is expressed by multiplying double a distance between the objective lens 19 and the recording layer of the optical disk 3 (reciprocation distance) with the depth magnification.

$$\zeta = 4M^2 \delta \quad (1)$$

Assuming that a factor which changes the position of the minimum circle of confusion by only $\delta$ is $\omega$, a numerical aperture number of the objective lens 19 is NA, refractive index of the transparent protective layer 3a is n and the amount of defocus is $\delta z$, if when a defocus having a magnitude of $\delta z$ occurs, a defocus due to wave aberration is $\omega_{20}$ and a defocus due to a thickness unevenness of the substrate protective layer 3a (that is, it is reasonable that this is originated from spherical aberration) is $\omega_{40}$, the factor is $\omega = \omega_{20} + \omega_{40}$. The $\omega_{20}$ and $\omega_{40}$ can be expressed in the same way as an expressions (A.1) and (A.2) described in H. Ando et. al.: Jpn J. Appl. Phys. Vol. 32 (1993) Pt. 1, No. 11B p. 5272.

$$\omega_{20} = \frac{1}{2} NA^2 \delta z \text{ and} \quad (2)$$

$$\omega_{40} = \frac{n^2 - 1}{8n^3} NA^4 \delta t \quad (3)$$

If the $\delta z$ in the expression (2) is substituted for $\delta$ in (1), the shift amount $\xi$ of the minimum circle of confusion of the laser beam 12' focused by the second photo detector 29 is expressed as $$\zeta = 8\omega_{20} \left(\frac{M}{NA}\right)^2 \quad (4)$$

A change in the spot center intensity of the laser beam 12 relative to a spherical aberration coefficient $\omega_{20}$ corresponding to the defocus amount $\delta z$ when the wavelength of the laser beam 12 is assumed to be $\lambda$, is expressed with following expressions obtained by substituting 0 for $\eta$ in an expression (10) (here, expressed as an expression (M10) and the expression (M10) is marked at an end of the expression), described in the above quoted H. Ando et. al.: Jpn J. Appl. Phys. Vol. 32 (1993) Pt. 1, No. 11B p. 5272.

$$I(\omega_{20}) \approx \frac{\{1 - \exp(-\sigma^2)\}^2 + 4 \exp(-\sigma^2) \cdot \sin^2\left(\frac{k\omega_{20}}{2}\right)}{\sigma^4 + (k\omega_{20})^2} \text{ and} \quad (5)$$

$$k = 2\frac{\pi}{\lambda} \quad (6)$$

When assuming that distribution of intensity in section of the laser beam 12 impinging upon the objective lens 19 in light transmitting system located on the left (on this paper) relative to the recording medium 3 in FIG. 5 is Gauss distribution, a region of a radius $e^{-2}$ from the center is regarded to be an effective beam diameter of the laser beam 12 or a diameter (W) of a beam spot, $\sigma$ means a value A/W which is a ratio relative to the diameter of the objective lens 19 (here, effective aperture diameter (A)) ($\sigma = A/W$).

Figure 6:
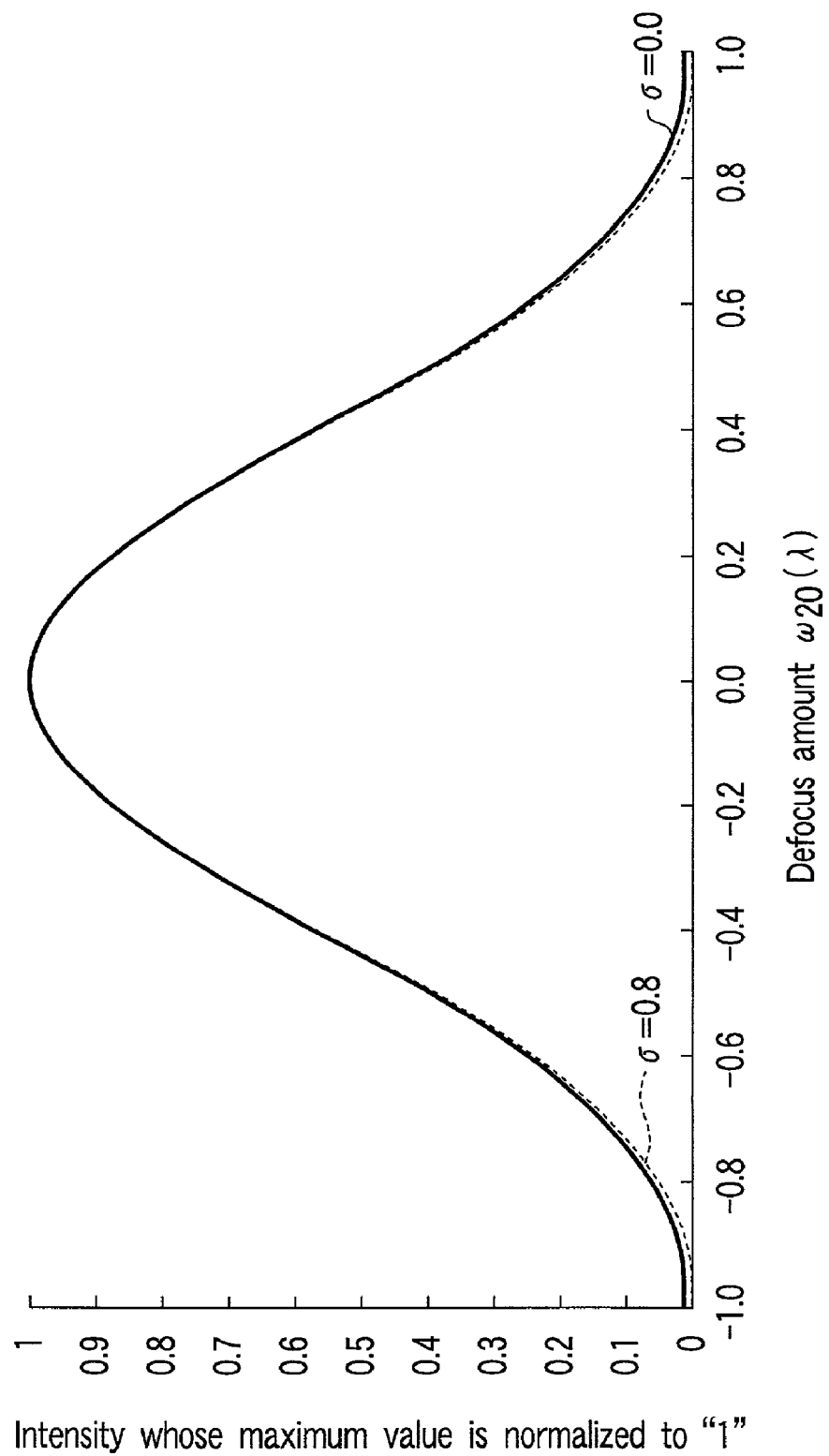
FIG. 6 is a graph showing a calculation result based on an expression (5)

FIG. 6 shows a calculation result of the expression (5). As evident from FIG. 6, a region in which the change of the center intensity relative to aberration $\omega_{20}$ corresponding to a defocus amount $\delta z$ is a range from 0.2 to 0.8 in vertical axis (a relative center intensity under a condition in which the maximum is normalized to "1").

A defocus amount $\omega_{20}$ corresponding to a defocus amount $\delta z$ in which the center intensity is 0.2 is $\pm 0.65\lambda$ on the horizontal axis (axis of "$\lambda$" times the wavelength of the laser beam 12) when $\sigma = 0$ and $\pm 0.65\lambda$ when $\sigma = 0.8$. On the other hand, the defocus amount $\omega_{20}$ corresponding to the defocus amount $\delta z$ in which the center intensity is 0.8 is $\pm 0.26\lambda$ when $\sigma = 0$ and $\sigma = 0.8$.

Therefore, if the expression (4) is used, an optimum range of a distance from a focal point of the laser beam 12 by the objective lens 19 to the second photo detector 29 (a distance between A and O and a distance between B and O in FIG. 4) is given in the form of $$\zeta \leq 5.2\lambda \left(\frac{M}{NA}\right)^2 \text{ and} \quad (7)$$

$$\zeta \geq 2.1\lambda \left(\frac{M}{NA}\right)^2 \quad (8)$$

As described above, the principle of detecting a thickness unevenness (detecting a spherical aberration) of the transparent protective layer 3a according to the present invention has a feature that a defocus detecting optical system (a portion comprised of the spherical lens 23, a cylindrical lens 24 and the first photo detector 25 in FIG. 1) is prepared separately from a detecting optical system for detecting a thickness unevenness of the transparent protective layer 3a and output originated from the thickness unevenness is corrected using a detecting signal of the thickness unevenness detecting system (spherical aberration detecting system) in a condition that the defocus correcting control is carried out (when focusing is attained).

Next, the structure of the sensitizing filter for detecting the spherical aberration shown in FIG. 2 and sensitizing principle will be described.

The sensitizing filter 27 for detecting the spherical aberration intensifies actual sensitivity upon detecting the spherical aberration by dividing a section of the reproduced laser beam 12' to at least two sections [dividing a region along an optical path section is generally called "wavefront splitting"] and changing any one or both of i) transmission light amount or ii) phase characteristic with respect to part of light subjected to the wavefront splitting. Intensifying the spherical aberration detection characteristic using the sensitizing filter 27 means a different content of the invention (specific feature of the present invention) independent from the content of the invention described up to here.

Hereinafter, the sensitizing principle will be described in detail.

As described previously with reference to FIG. 3, if the spherical aberration occurs, in the section spot of the reproduced laser beam 12' returned to the objective lens 19, a component passing outside a component in the optical axis center (region of a predetermined radius including the optical axis) is converged forward of a component passing inside or the region including the optical axis (FIG. 7A shows the same as FIG. 3 again to facilitate a comparison with FIG. 7B). If from the optical axis center to the radius $r$ of the section spot of the reproduced laser beam 12' impinging upon the objective lens 19 is shielded using this phenomenon as shown in FIG. 7B, the position of the minimum circle of confusion is moved from δ to ε.

According to the present invention, detection characteristic upon detecting the spherical aberration is intensified using an amount of shift from δ to ε of the position of the minimum circle of confusion as shown in FIG. 7A (FIG. 3) and FIG. 7B.

Figure 8:
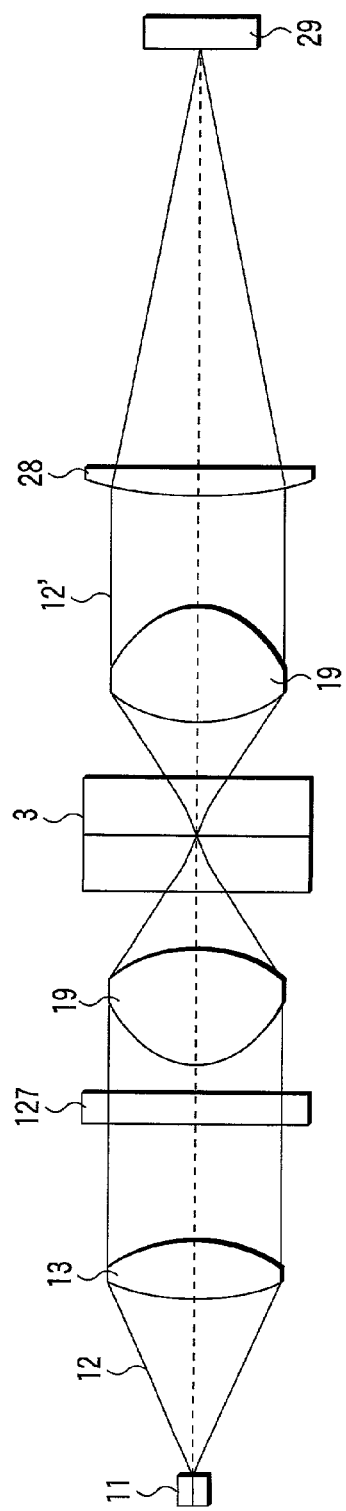
FIG. 8 is a schematic view for explaining a principle capable of providing a shift amount along the optical axis of ±first-order light generated by a hologram device for defining an optimum range of a distance between A and O and a distance between B and O shown in FIG. 4, and detection characteristic thereof.

To consider the condition of $r$ for intensifying the spherical aberration detection most by characteristic analysis, the system shown in FIG. 8, which facilitates comparison with FIG. 5 described before will be used as a calculation model.

If the thickness of the transparent protective layer 3a changes by only δt in the optical disk unit 10 shown in FIG. 2, as shown in FIG. 5, the laser beam 12 reciprocates between the objective lens 19 and the recording layer 3d, so that a spherical aberration equivalent to 2δt is generated.

After that, when the laser beam 12 passes the sensitizing filter 27 for detecting the spherical aberration before it impinges upon the spherical lens 28 of the detecting optical system, the characteristic of the laser beam 12 changes partly.

"A pseudo spherical aberration generating/sensitizing filter function provided device 127", which has a spherical aberration and functions as a sensitizing filter by converging a place where this spherical aberration is generated and a portion in which the characteristic of the laser beam 12 is changed to a portion just before the laser beam 12 impinges upon the objective lens 19, will be described.

After the laser beam 12 passes the pseudo spherical aberration generating/sensitizing filter function provided device 127 in FIG. 8, the thickness of the transparent protective layer 3a maintains its ideal status. If the converging spot characteristic in the optical disk 3 is enlarged with a detection optical system having a lateral magnification M, the detection characteristic of the second photo detector 29 shown in FIG. 5 coincides with the detection characteristic of a second photo detector 129 shown in FIG. 8, which is a calculation model for analysis. Meanwhile, the enlargement characteristic (magnification) of the model shown in FIG. 8 can be converted easily according to the expression (1).

FIG. 7B shows an example of the sensitizing filter which shields laser beam impinging upon the objective lens 19 from the optical axis center to its radius $r$. In FIG. 8, as the characteristic of the sensitizing portion of the pseudo spherical aberration generating/sensitizing filter function provided device 127, laser beam impinging upon the objective lens 19 is split in terms of wavefront to three concentric regions with circumferences of a radius b and a radius "a" as borders and by subjecting only a ring region surrounded by the radius b and the radius "a" to attenuation of transmission light amount and phase change, the change of a position ε in which the center intensity is maximized is analyzed.

Because an optical device which gives attenuation of transmission light amount and phase change to only the ring region surrounded by the radius "a" and the radius b is called apodizer in a special field of optics, a portion acting as a sensitizing filter for detecting spherical aberration in the pseudo spherical aberration generating/sensitizing filter function provided device 127 shown in FIG. 8 will be called "apodizer" in a following description.

Expressions (A-1) and (A-15) to be quoted in a following calculation are quoted from respective expressions described in H. Ando: Jpn. J. Appl. Phys. Vol. 38 (1999) Pt. 1 No. 2A p. 764 Appendix A and will be introduced later. A detailed description for the introduction is omitted.

Coordinates on a pupil on a predetermined surface of the objective lens 19 are defined to be (X, Y) while coordinates on a light converging surface of the optical disk 3 are defined to be (x, y). Because complex amplitude distribution G (x, y) of the light converging spot is in the relation of Fourier transformation relative to a pupil function g (X, Y) of the pupil on a predetermined surface of the objective lens 19, when it is assumed that $P_0$ is a range of Fourier integration on the pupil on a predetermined surface of the objective lens 19, α is a standardization constant, f is a focal distance of the objective lens 19 and NA is the numerical aperture of the objective lens 19, the wavelength of the laser beam 12 is expressed in λ, so that it can be described as follows.

$$G(x, y) = \alpha F\{g(X, Y)\}_{P_0} \quad (2\text{-}1)$$

If the intensity distribution of laser beam impinging upon the objective lens 19 is approximated to Gauss distribution and it is assumed that the A/W value in the X-axis direction is $\sigma x (=(A/W)_X)$ and the A/W value in Y-axis direction is $\sigma y (=(A/W)_Y)$ and a deviation amount of the center intensity due to lens shift of the objective lens 19 is $X_0$, a following expression can be introduced.

$$\begin{aligned}(X, Y) &= \exp\left\{-\left(\frac{\sigma_X}{f \cdot NA}\right)^2 (X + X_o)^2 - \left(\frac{\sigma_Y}{f \cdot NA}\right)^2 Y^2\right\} \\ &\approx \exp\left\{-\left(\left(\frac{\sigma_X}{f \cdot NA}\right)^2 X^2 + \left(\frac{\sigma_Y}{f \cdot NA}\right)^2 Y^2\right) - \left(\frac{\sigma_X}{f \cdot NA}\right)^2 \cdot 2 X_o X\right\}\end{aligned} \quad (2\text{-}2)$$

where in the expression (2-2), $X_0$ is regarded to be so small that it can be approximated to $X_0^2 \approx 0$.

If the above-described orthogonal coordinate system representation is transformed to polar coordinate system using $$r = \frac{\sqrt{X^2 + Y^2}}{fNA} \quad (2\text{-}3)$$

$$\phi = \tan^{-1}\left(\frac{Y}{X}\right) \quad (2\text{-}4)$$

$$\rho = NA \frac{\sqrt{X^2 + Y^2}}{\lambda} \quad (2\text{-}5)$$

$$\varphi = \tan^{-1}\left(\frac{y}{x}\right) \quad (2\text{-}6)$$

it comes

-continued $$\sigma^2 \equiv \frac{\sigma x^2 + \sigma y^2}{2} \quad (2\text{-}7)$$

and $$\sigma_-^2 \equiv \frac{\sigma x^2 - \sigma y^2}{2}. \quad (2\text{-}8)$$

Here, if $$\Delta_{OL} \equiv \frac{Xo}{fNA} \quad (2\text{-}9)$$

is used, the expression (2-2) is transformed to $$g(r, \phi) = \exp\{-\sigma^2 r^2 - \sigma_-^2 r^2 \cos(2\phi) - 2\sigma_x^2 \Delta_{OL} r \cos\phi\} \quad (2\text{-}10)$$

The pupil function of the pupil on a predetermined surface of the objective lens 19 when wavefront aberration $\omega(r, \phi)$ occurs is formulated as follows $$g(r, \phi) = \exp\{-\sigma^2 r^2 - \sigma_-^2 r^2 \cos(2\phi) - 2\sigma_x^2 \Delta_{OL} r \cos\phi - ik\omega(r, \phi)\} \quad (2\text{-}11)$$

and $$k = 2\pi/\lambda \quad (2\text{-}12)$$

Meanwhile, when in the optical disk system, up to quartic or lower term is considered by polynomial development of the wavefront aberration $\omega(r, \phi)$, it is desirable to consider in a condition that the spherical aberration $\omega s$ is $$\omega s(r, \phi) = \omega_{40}(r^4 - Qr^2 + R) \quad (2\text{-}13)$$

and the defocus $\omega d$ is $$\omega d(r, \phi) = \omega_{20} r^2 \quad (2\text{-}14).$$

In the aforementioned expression (2-13), Q means an optimum value in which the center intensity is maximized according to movement theorem. In the expression (2-13), R is a phase term, which affects a mixing ratio between a real part and an imaginary part of the complex amplitude distribution although it does not affect the center intensity.

In Fourier transformation in polar coordinate system, Henkel's transformation expression is applied and $$G(\rho, \phi) = \alpha H\{g(r, \phi)\}_{P_0} \quad (2\text{-}15)$$

is expressed with respect to the expression (2-1).

Then, if the expression (2-11) is transformed to $$g(r, \phi) = \exp\{-\sigma^2 r^2 - \sigma_-^2 r^2 \cos(2\phi) - 2\sigma_x^2 \Delta_{OL} r \cos\phi\} + \{e^{-ik\omega(r,\phi)} - 1\}\exp\{-\sigma^2 r^2 - \sigma_-^2 r^2 \cos(2\phi) - 2\sigma_x^2 \Delta_{OL} r \cos\phi\} \quad (2\text{-}16)$$

light converging spot amplitude distribution $Gt(\rho, \phi)$ is such that $Go(\rho, \phi)$: light converging spot amplitude distribution when there is no aberration in a conventional optical system and $Gw(\rho, \phi)$: aberration term affecting the light converging spot amplitude distribution of the conventional optical system and $$Gt(\rho, \phi) = Go(\rho, \phi) + Gw(\rho, \phi) \quad (2\text{-}17)$$

is expressed, it comes that $$G_0(\rho, \phi) = \alpha H\{\exp[-\sigma^2 r^2 - \sigma_-^2 r^2 \cos(2\phi) - 2\sigma_x^2 \Delta_{OL} r \cos\phi]\}P_0 \quad (2\text{-}18)$$

and $$G_W(\rho, \phi) = \alpha H\{[e^{-ik\omega(r,\phi)} - 1]\exp[-\sigma^2 r^2 - \ldots]\}P_0 \quad (2\text{-}19)$$

If Oiler's formula $$e^{-ik\omega(r,\phi)} = \cos\{k\omega(r,\phi)\} - i\sin\{k\omega(r,\omega)\} \quad (2\text{-}20)$$

is applied to $e^{-ik\omega(r,\phi)}$, it is transformed to $$G_W(\rho, \phi) = -\alpha H\{2\sin^2[k\omega(r,\phi)/2]\cdot\exp[-\sigma^2 r^2 - \ldots]\}P_0 - i\alpha H\{2\sin[k\omega(r,\phi)/2]\cdot\cos[k\omega(r,\phi)/2]\cdot\exp[-\sigma^2 r^2 - \ldots]\}P_0 \quad (2\text{-}21)$$

When each value of $\sigma$, $\sigma-$, $\Delta_{OL}$ is a small value than 1 ($1>\sigma$, $1>\sigma_{13}$, $1>\Delta_{OL}$), such an approximate expression as $$\exp[-\sigma^2 r^2 - \sigma_-^2 r^2 \cos(2\phi) - 2\sigma_x^2 \Delta_{OL} r \cos\phi] \approx 1 - \sigma^2 r^2 - \sigma_-^2 r^2 \cos(2\phi) - 2\sigma_x^2 \Delta_{OL} r \cos\phi \quad (2\text{-}22)$$

is applied to the expression (2-18) and (2-19) and further, when each value of $\sigma_{13}$, $\Delta_{OL}$ is sufficiently smaller than 1 ($1>>\sigma_{13}$, $1>>\Delta_{OL}$), it is regarded as $$\exp[-\sigma^2 r^2 - \sigma_-^2 r^2 \cos(2\phi) - 2\sigma_x^2 \Delta_{OL} r \cos\phi] \approx 1 - \sigma^2 r^2 \quad (2\text{-}23)$$

for calculation.

When the wavefront aberration $\omega(r, \phi)$ is sufficiently smaller than 1 ($1>>k\omega$), $$e^{-ik\omega(r,\phi)} - 1 \approx -ik\omega(r, \phi) - \{k\omega(r,\phi)\}^2/2 \quad (2\text{-}24)$$

is applied to the expression (2-19) to make approximation.

When the inner circumference radius of a ring region of apodizer is b (corresponds to "r" in FIG. 7B) and the outer circumference radius is a (corresponds to "1" in FIG. 7A) while complex transmission amplitude in the ring region is expressed in T, an apodizer of arbitrary shape (type) can be obtained by changing the setting condition of the value T.

That is, it is so defined that:

(A) if T is T=0, "completely shielding type apodizer", (B) if T is T=−1, "phase type apodizer" in which the phase is shifted by $\lambda/2$ (C) if T is 1>T>0, "light amount damping type apodizer" which reduces transmission light amount, and (D) if T is T=$te^{i\theta}$, "general type apodizer" in which phase shift and light amount damping are generated at the same time.

Although the complex amplitude distribution $G_{ant}(\rho, \phi)$ of the light converging spot on the optical disk recording plane formed by light passing the ring region of the apodizer can be obtained by Henkel transformation like in the expression (2-18), an integration range on the pupil on a predetermined surface of the objective lens 19 is limited within a ring region $P_{ant}$.

That is,

[Expression 18]

$$G_{ant}(\rho, \phi) \equiv \alpha(1-T)H\{\exp[-\sigma^2 r^2 - \sigma_-^2 r^2 \cos(2\phi) - \quad (3\text{-}1)$$

-continued
$$2\sigma_x^2 \Delta_{OL} r\cos\phi]\} P_{anl}$$

Further, according to theorem of Bavinette, the complex amplitude distribution Gt (ρ, φ) of the light converging spot formed by light passing the ring-like apodizer is expressed as follows $$Gt(\rho, \phi) = Go(\rho, \phi) - G_{anl}(\rho, \phi) \quad (3\text{-}2)$$

according to the expressions (2-18) and (3-1).

Further, when an aberration occurs, an expression corresponding to the (2-17) can be expressed in the form of $$Gt(\rho, \phi) = Go(\rho, \phi) - G_{anl}(\rho, \phi) + Gw(\rho, \phi) - Gw_{anl}(\rho, \phi) \quad (3\text{-}3)$$

assuming that Go(ρ, φ) is an amplitude distribution of the light converging spot at the time having no aberration in the conventional optical system and $G_{anl}(\rho, \phi)$ is a converging light spot amplitude distribution formed at the time having no aberration, by light passing the ring region of the apodizer.

A peak efficiency η is defined as an important parameter which affects the light converging spot characteristic largely, the expression $$\eta \equiv \frac{|G_0(0, \varphi) - G_{anl}(0, \varphi)|^2}{|G_0(0, \varphi)|^2} \quad (3\text{-}4)$$

means a ratio of the center intensity of the light converging spot depending on presence or absence of the apodizer.

Further, as another important parameter, the radius c of the center portion of the ring region is defined as $$c \equiv (a+b)/2 \quad (3\text{-}5)$$

Meanwhile, the center intensity of the light converging spot at the time having no aberration is standardized to "1". That is, $$|G_0(0, \phi) - G_{anl}(0, \phi)|^2 = 1 \quad (3\text{-}6)$$

is set up.

If the expression (3-4) is substituted for the expression (3-6), $$G_0(0, \phi) = 1/\sqrt{\eta} \quad (3\text{-}7)$$

is obtained.

On the other hand, in the expression (2-18), if $\sigma_-$ and $\Delta_{OL}$ are sufficiently smaller than 1, in case of $\sigma_-$, $1 \gg \Delta_{OL}$, $$G_0(0, \phi) \approx \alpha H\{\exp[-\sigma^2 r^2]\} P_0 = 2\pi\alpha \int_0^1 r\exp[-\sigma^2 r^2]\, dr \quad (3\text{-}8)$$
$$= \frac{\pi\alpha}{\sigma^2}\{1 - \exp(-\sigma^2)\}$$

is obtained according to the expressions (A-1) and (A-13).

Thus, by using the expressions (3-7) and (3-8), the standard constant α can be obtained as follows.

$$\alpha \approx \frac{\sigma^2}{\{1 - \exp(-\sigma^2)\}\pi\sqrt{\eta}} \quad (3\text{-}9)$$

If σ, $\sigma_-$, and $\Delta_{OL}$ obtain relatively small values as other condition, the following expression is obtained by approximation based on the expressions (A-5), (A-7), (A-8) and (A-13).

$$G_0(\rho, \phi) \approx \alpha H\{1 - \sigma^2 r^2 - \sigma_-^2 r^2 \cos(2\phi) - 2\sigma_X^2 \Delta_{OL} r\cos\phi\} P_0 \quad (3\text{-}10)$$
$$= \pi\alpha(1 - \sigma^2/2)$$

Therefore, the expression (3-9) is transformed to $$\alpha \approx \frac{1}{(1 - \sigma^2/2)\pi\sqrt{\eta}} \quad (3\text{-}11)$$

Further, by substituting the expression (3-11) for the expression (2-18), $$G_0(\rho, \phi) \approx \alpha H\{1 - \sigma^2 r^2 - \sigma_-^2 r^2 \cos(2\phi) - 2\sigma_X^2 \Delta_{OL} r\cos\phi\} P_0 \quad (3\text{-}12)$$
$$= \frac{J_1(2\pi\rho)/(\pi\rho) - \sigma^2 M_{20}(\rho) + \sigma_-^2 M_{22}(\rho)\cos(2\varphi) + i2\sigma_X^2 \Delta_{OL} M_{11}(\rho)\cos\varphi}{(1 - \sigma^2/2)\sqrt{\eta}}$$

is introduced from the expression (A-13).

In this expression (3-12), $M_{m\nu}(\rho)$ means an integration definition expression including Bessel function defined according to the expression (A-5).

Further, if the expressions (2-22), (3-11) and (A-14) are applied to the expression (3-1), $$G_{anl}(\rho, \phi) \approx \alpha(1-T)H\{1 - \sigma^2 r^2 - \sigma_-^2 r^2\cos(2\phi) - \quad (3\text{-}13)$$
$$2\sigma_X^2 \Delta_{OL} r\cos\phi\}\} P_{anl}$$
$$= \frac{2(1-T)(a-b)}{(1-\sigma^2/2)\sqrt{\eta}}\{c(1 - \sigma 2c2)J_0(2\pi c\rho) + \sigma_-^2 c^3 J_2(2\pi c\rho)\cos(2\phi) - i2\sigma_X^2 \Delta_{OL} c^2 J_1(2\pi c\rho)\cos\phi\}$$

is obtained.

If the apodizer which generates general phase shift and light amount damping at the same time is employed in the expression (3-13), T obtains a complex number ($T = te^{i\theta}$).

Here, if $$\epsilon(c) \equiv 2(a-b)c(1 - \sigma^2 c^2) \quad (3\text{-}14)$$

is defined and Oiler's formula is applied to the complex number T like in the expression (2-20), the expression (3-13) is transformed to $$G_{anl}(\rho, \phi) \approx \frac{(1 - t\cos\theta) - it\sin\theta}{(1 - \sigma^2/2)\sqrt{\eta}} \epsilon(c) \times \{J_0(2\pi c\rho) + \quad (3\text{-}15)$$

-continued $$\frac{\sigma_-^2 c}{1-\sigma^2 c^2} J_2(2\pi c\rho)\cos(2\varphi) + i\frac{2\sigma_\chi^2 \Delta_{OL} c}{1-\sigma^2 c^2} J_1(2\pi c\rho)\cos\varphi \right\}$$

Particularly, because at the position of $\rho=0$ (center amplitude position of light converging spot), $$G_0(0,\phi) - G_{anl}(0,\phi) \approx \frac{(1-\sigma^2/2) - \varepsilon(c)(1-t\cos\theta) + i\varepsilon(c)t\sin\theta}{(1-\sigma^2/2)\sqrt{\eta}} \quad (3\text{-}16)$$

can be introduced from the expressions (3-7), (3-15) and (A-1), if the expression (3-16) is substituted for the expression (3-6), a relation about $\eta$ $$\varepsilon^2(c)(1 - 2t\cos\theta + t^2) = -\{(1-\eta)(1-\sigma^2/2)^2 - (2-\sigma^2)\varepsilon(c)(1-t\cos\theta)\} \quad (3\text{-}17)$$

can be obtained.

As a special case, $$1 - \sqrt{\eta} = \frac{2(1-T)}{1-\sigma^2/2}(a-b)c(1-\sigma^2 c^2) \quad (3\text{-}18)$$

(3-18) is introduced from the expressions (3-6) and (3-16) if T is a real number.

If the expression (3-18) is substituted for the expression (3-13), an approximate expression $$G_{anl}(\rho,\phi) \approx \frac{1-\sqrt{\eta}}{\sqrt{\eta}} \{J_0(2\pi c\rho) + \frac{\sigma_-^2 c^3 \cos(2\varphi)}{1-\sigma^2 c^2} J_2(2\pi c\rho) + i\frac{2\sigma_\chi^2 \Delta_{OL} c^2 \cos\varphi}{1-\sigma^2 c^2} J_1(2\pi c\rho) \} \quad (3\text{-}19)$$

is obtained.

Meanwhile, if $\sigma_-$ and $\Delta_{OL}$ are sufficiently smaller than 1 ($1\gg\sigma_-$, $1\gg\Delta_{OL}$), the expressions (3-12) and (3-19) can be transformed to $$G_0(\rho,\Psi) \approx \frac{J_1(2\pi\rho)/(\pi\rho) - \sigma^2 M_{20}(\rho)}{(1-\sigma^2/2)\sqrt{\eta}} \quad (3\text{-}20)$$

and $$G_{anl}(\rho,\phi) \approx \frac{1-\sqrt{\eta}}{\sqrt{\eta}} J_0(2\pi c\rho) \quad (3\text{-}21)$$

On the other hand, wavefront aberration when the spherical aberration and defocus occur at the same time can be expressed as follows, according to the expressions (2-13) and (2-14).

$$\omega s(r,\phi) = \omega_{40}(r^4 - Qr^2 + R) + \omega'_{20}r^2 \quad (10\text{-}1)$$

Here, assuming $$\omega_{20} = \omega'_{20} - Q\omega_{40}, \quad \omega_{00} = \omega_{40} R \quad (10\text{-}2),$$

the expression (10-1) can be transformed to $$\omega s(r,\phi) = \omega_{40}r^4 + \omega_{20}r^2 + \omega_{00} \quad (10\text{-}3).$$

If in the expression (2-10), $\sigma_-$ and $\Delta_{OL}$ are sufficiently smaller than 1 ($1\gg\sigma_-$, $1\gg\Delta_{OL}$), the expressions (3-9) and (10-3) are substituted for the expression (2-11) and the expression (A-13) is employed, $$G_{WS}(\rho,\phi) = \text{Real}\{G_{WS}(\rho,\phi)\} + i\text{Img}\{G_{WS}(\rho,\phi)\} \quad (10\text{-}4),$$

$$\text{Real}\{G_{WS}(\rho,\phi)\} \approx -\alpha H\{2\sin^2[k\omega s(r,\phi)/2]\exp(-\sigma^2 r^2)\}_{P0} - \quad (10\text{-}5)$$
$$\frac{4\sigma^2}{\{1-\exp(-\sigma^2)\}\sqrt{\eta}} \int_0^1 r\sin^2$$
$$\{k(\omega_{40}r^4 + \omega_{20}r^2 + \omega_{00})/2\} \cdot \exp(-\sigma^2 r^2) J_0(2\pi\rho r) dr$$

and $$\text{Img}\{G_{WS}(\rho,\phi)\} \approx \quad (10\text{-}6)$$
$$-\alpha H\{\sin[k\omega s(r,\phi)]\exp(-\sigma^2 r^2)\}_{P0} - \frac{2\sigma^2}{\{1-\exp(-\sigma^2)\}\sqrt{\eta}}$$
$$\int_0^1 r\sin\{k(\omega_{40}r^4 + \omega_{20}r^2 + \omega_{00})\}\exp(-\sigma^2 r^2) J_0(2\pi\rho r) dr$$

can be obtained.

If the apodizer which generates the phase shift and light amount damping at the same time is employed, by using the expressions (2-19) to (2-21), (3-1), (3-9), (10-3) and (A-14), $$G_{wsanl}(\rho,\phi) = -\alpha\{(1-t\cos\theta) - it\sin\theta\} \cdot H\{[1-e^{-ik\omega s(r,\phi)}] \cdot \exp(-\sigma^2 r^2)\}_{P_{anl}} = \text{Real}\{G_{wsanl}(\rho,\phi)\} + i\text{Img}\{G_{wsanl}(\rho,\phi)\} \quad (10\text{-}7)$$

$$\text{Real}\{G_{wsanl}(\rho,\phi)\} = -\frac{2\sigma^2(a-b)c}{\{1-\exp(-\sigma^2)\}\sqrt{\eta}} \exp(-\sigma^2 r^2) \cdot J_0(2\pi c\rho) \times \quad (10\text{-}8)$$
$$\{2(1-t\cos\theta)\sin^2[k(\omega_{40}c^4 + \omega_{20}c^2 + \omega_{00})/2] + t\sin\theta\sin[k(\omega_{40}c^4 + \omega_{20}c^2 + \omega_{00})]\}$$

and $$\text{Img}\{G_{wsanl}(\rho,\phi)\} = -\frac{2\sigma^2(a-b)c}{\{1-\exp(-\sigma^2)\}\sqrt{\eta}} \exp(-\sigma^2 c^2) \cdot J_0(2\pi c\rho) \times \quad (10\text{-}9)$$
$$\{(1-t\cos\theta)\sin[k(\omega_{40}c^4 + \omega_{20}c^2 + \omega_{00})] - 2t\sin\theta\sin^2[k(\omega_{40}c^4 + \omega_{20}c^2 + \omega_{00})/2]\}$$

can be obtained.

According to the present invention, the value Q indicated in the expression (2-13) is calculated under a condition that and $\omega_{40}$ and $\sigma$ are relatively small values. Here, in the pupil function indicated in the expression (2-16), it is regarded that $\sigma_- \approx 0$ and $\Delta_{OL} \approx 0$.

Further, in a detailed description below, it is regarded that R=0.0 because a phase term R does not affect the center intensity.

If the expressions (2-23), (2-24), (3-11) are applied to the expressions (10-4) to (10-9), the expressions (10-5), (10-6), (10-8), and (10-9) are approximated to $$\text{Real}\{G_{WS}(0,\phi)\} \approx \qquad (10\text{-}10)$$

$$-\alpha H\{[(k\omega_{40}r^4 + k\omega_{20}r^2)^2/2](1-\sigma^2 r^2)\}_{P0} - \frac{1}{(1-\sigma^2/2)\sqrt{\eta}}$$

$$\left\{\left(\frac{1}{6} - \frac{\sigma^2}{8}\right)k^2\omega_{20}^2 + \left(\frac{1}{4} - \frac{\sigma^2}{5}\right)k\omega_{20}k\omega_{40} + \left(\frac{1}{10} - \frac{\sigma^2}{12}\right)k^2\omega_{40}^2\right\}$$

$$\text{Img}\{G_{WS}(0,\phi)\} \approx -\alpha H\{(k\omega_{40}r^4 + k\omega_{20}r^2)\cdot(1-\sigma^2 r^2)\}_{P0} - \qquad (10\text{-}11)$$

$$\frac{1}{(1-\sigma^2/2)\sqrt{\eta}}\left\{\left(\frac{1}{2} - \frac{\sigma^2}{3}\right)k\omega_{20} + \left(\frac{1}{3} - \frac{\sigma^2}{4}\right)k\omega_{40}\right\}$$

$$\text{Real}\{G_{wsanl}(0,\phi)\} \approx -\frac{1}{(1-\sigma^2/2)\sqrt{\eta}} \times \qquad (10\text{-}12)$$

$$\{(1-t\cos\theta)(k\omega_{40}c^4 + k\omega_{20}c^2)^2/2 + t\sin\theta(k\omega_{40}c^4 + \omega_{20}c^2)\}$$

and $$\text{Img}\{G_{wsanl}(0,\phi)\} \approx -\frac{\varepsilon(c)}{(1-\sigma^2/2)\sqrt{\eta}} \times \qquad (10\text{-}13)$$

$$\{(1-t\cos\theta)(k\omega_{40}c^4 + k\omega_{20}c^2) - t\sin\theta(k\omega_{40}c^4 + \omega_{20}c^2)^2/2\}$$

Here, if $$As + iBs \equiv G_0(0,\phi) - G_{anl}(0,\phi) \qquad (10\text{-}14)$$

and $$Cs + iDs \equiv G_{ws}(0,\phi) - G_{wsanl}(0,\phi) \qquad (10\text{-}15)$$

are set up, $$|Gt(0, 100)|^2 \approx (As^2 + Bs^2) + (Cs^2 + Ds^2) + (2AsCs + 2BsDs) \qquad (10\text{-}16)$$

is obtained.

Then, if the expressions (3-14), (3-16), (10-4), (10-7), (10-10) to (10-13) are substituted for $$|Gt(0,\phi)|^2 \approx (As^2 + Bs^2) + (Cs^2 + Ds^2) + (2AsCs + 2BsDs)$$

(10-16) and the expression (3-17) is applied, $$|Gt(0,\phi)|^2 \approx 1 - \frac{1}{(1-\sigma^2/2)^2\eta} \qquad (10\text{-}17)$$

$$\left\{S_A\left(k\omega_{20} + \frac{S_B k\omega_{40} + S_C}{2S_A}\right)^2 + S_D k^2\omega_{40}^2 + S_E k\omega_{40} + S_F\right\}$$

$$S_A = \left(\frac{1}{3} - \frac{\sigma^2}{4}\right)\left(1 - \frac{\sigma^2}{2}\right) - \left(\frac{1}{2} - \frac{\sigma^2}{3}\right)^2 - \qquad (10\text{-}18)$$

$$\left\{\left(\frac{1}{3} - \frac{\sigma^2}{4}\right) - \left(1 - \frac{2\sigma^2}{3}\right)c^2 + \left(1 - \frac{\sigma^2}{4}\right)c^4\right\}\varepsilon(c)(1-t\cos\theta)$$

$$S_B = \left(\frac{1}{2} - \frac{2\sigma^2}{5}\right)\left(1 - \frac{\sigma^2}{2}\right) - \left(\frac{1}{2} - \frac{\sigma^2}{3}\right)\left(\frac{2}{3} - \frac{\sigma^2}{2}\right) - \qquad (10\text{-}19)$$

$$\left\{\left(\frac{1}{2} - \frac{2\sigma^2}{5}\right) - \left(\frac{2}{3} - \frac{\sigma^2}{2}\right)c^2 - \left(1 - \frac{2\sigma^2}{3}\right)c^4 + (2-\sigma^2)c^6\right\}$$

$$\varepsilon(c)(1-t\cos\theta)$$

and $$Sc = \left\{\left(1 - \frac{2\sigma^2}{3}\right) - (2-\sigma^2)c^2\right\}\varepsilon(c)t\sin\theta \qquad (10\text{-}20)$$

are obtained.

On the other hand, according to the expression (10-17), the value of $Gt(0,\phi)^2$ when $\omega_{20}$ turns to its maximum value under the condition of "SA>0" is automatically determined so that the following expression is obtained.

$$\omega_{20} = -\frac{S_B k\omega_{40} + S_C}{2S_A} \qquad (10\text{-}21)$$

Particularly, when $k\omega_{40}=0$, the expression (10-21) is as follows:

$$k\omega_{20} = -S_C/2S_A \qquad (10\text{-}22)$$

If a phase difference of angle θ occurs in light passing the ring region of the apodizer, the center intensity of the light converging spot is maximized at a position $\omega_{20}$ in which a focal point obtained according to the expression (10-22) is shifted. A detailed consideration upon this phenomenon will be described later.

If as the style of the apodizer, T is a real number (shielding type apodizer, light amount damping type apodizer or phase type apodizer shifting the phase by λ/2), it comes that sin θ≈0. If a relation of the expressions (3-18), (10-2), (10-18), (10-19) and (10-21) is employed, the value Q in the expression (2-13) can be expressed in $$Q = -\omega_{20}/\omega_{40} \approx S_{B'}/S_{A'} \qquad (10\text{-}23)$$

$$S_{A'} = \left(\frac{1}{3} - \frac{\sigma^2}{4}\right)\left(1 - \frac{\sigma^2}{2}\right) - \left(\frac{1}{2} - \frac{\sigma^2}{3}\right)^2 - \qquad (10\text{-}24)$$

$$\left\{\left(\frac{1}{3} - \frac{\sigma^2}{4}\right) - \left(1 - \frac{2\sigma^2}{3}\right)c^2 + \left(1 - \frac{\sigma^2}{2}\right)c^4\right\}\left(1 - \frac{\sigma^2}{2}\right)(1-\sqrt{\eta})$$

and $$S_{B'} = \left(\frac{1}{4} - \frac{\sigma^2}{5}\right)\left(1 - \frac{\sigma^2}{2}\right) - \left(\frac{1}{2} - \frac{\sigma^2}{3}\right)\left(\frac{1}{3} - \frac{\sigma^2}{4}\right) - \qquad (10\text{-}25)$$

$$\left\{\left(\frac{1}{4} - \frac{\sigma^2}{5}\right) - \left(\frac{1}{3} - \frac{\sigma^2}{4}\right)c^2 - \left(\frac{1}{2} - \frac{\sigma^2}{3}\right)c^4 + \left(1 - \frac{\sigma^2}{2}\right)c^6\right\}$$

$$\left(1 - \frac{\sigma^2}{2}\right)(1-\sqrt{\eta})$$

From the expressions (10-23) to (10-25), it is made evident that the value Q indicating a defocus position in which the center intensity when the spherical aberration is generated is maximized does not depend on the spherical aberration. Meanwhile, FIG. 9 shows changes of the value Q when c and σ introduced from the expressions (10-23) and (10-25) change.

Figure 9:
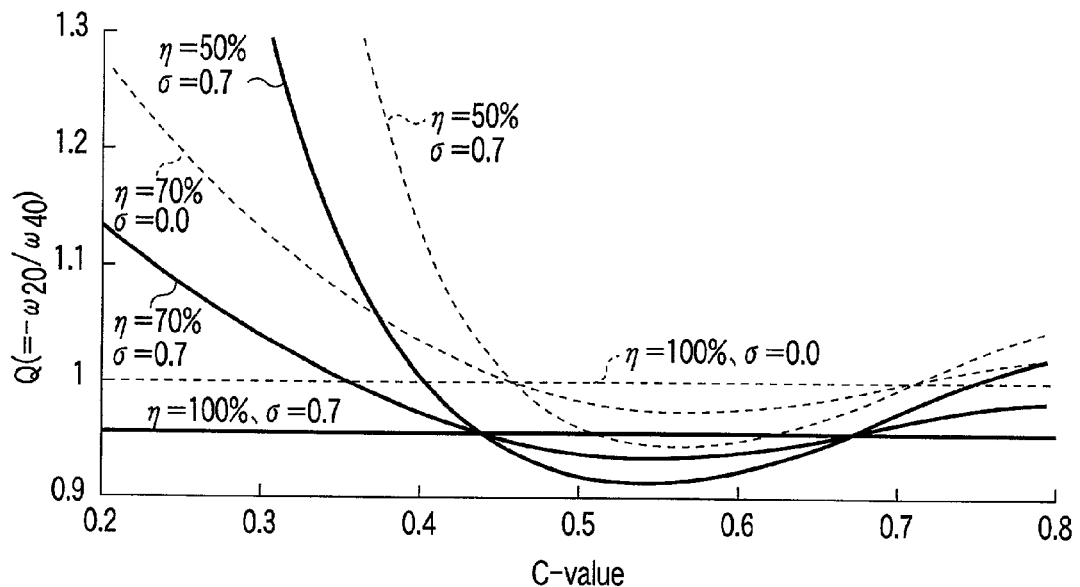
FIG. 9 is a graph showing changes in a value Q when $c$ and $\sigma$ calculated according to equations (10–23) to (10–25) change.

As evident from FIG. 9, the value Q is substantially "1" or a value in the vicinity thereof. That is, when the apodizer is used, under condition of σ=0.7, the value Q is increased as compared to the conventional optical system (η=100%) at a position c>0.67 and 0.44>c.

In 0.67>c>0.44, it can be recognized that the value Q is decreased slightly. Further, this tendency becomes more conspicuous as the peak efficiency η decreases. Meanwhile, under the condition of σ=0.0, the value Q is increased as compared to the conventional optical system (η=100%) in a range of c>0.70 and 0.45>c.

Consequently, the value Q is decreased slightly in the range of 0.70>c>0.45.

Therefore, under any condition, the value Q is increased at the position of c<0.44 and the value Q is decreased at the position of 0.45<c<0.67.

$\omega_{40}$ corresponds to a spherical aberration amount as described previously and as shown in the expression (2), $\omega_{20}$ indicates a shift amount δz of a center intensity maximum position within the information recording medium 3 when the spherical aberration occurs.

Therefore, it is indicated that under the condition in which the value Q is larger than the conventional system (η=1), the spherical aberration detecting sensitivity increases so that the effect of a sensitizing filter is produced.

Because as indicated by the expression (3-5), c is the radius of the center portion of the ring region and it sometimes comes that b=0, a necessary condition for exerting the sensitizing characteristic of the sensitizing filter 127 for detecting the spherical aberration having an opening of a predetermined radius (r) shown in FIG. 7B is as follows.

$$r \leq 0.88 = 0.44 \times 2 \qquad (11)$$

In conclusion, the sensitizing filter 27 for use in detecting the spherical aberration in the optical disk unit 10 shown in FIG. 2 is so constructed to be capable of damping light amount of the laser beam 12' within a range satisfying the aforementioned expression (11), changing the phase characteristic of the laser beam 12' or changing the phase characteristic while damping the light amount of the laser beam 12' when the radius of the spot section of the laser beam 12' is set to "1".

The sensitizing filter 27 for detecting the spherical aberration is formed entirely of glass or a transparent plastic plate having a predetermined thickness. As a method for changing the light amount of the laser beam 12', transmission light amount damping film made of gelatine, metal, or inorganic material called ND filter is formed partially or in a range satisfying the expression (11).

As a method for forming a change in the phase characteristic, generally, a transparent inorganic film of $S_iO_2$ or the like is formed in a range satisfying the expression (11) of the aforementioned transparent plate and unevenness is formed locally. According to this method, the thickness of the sensitizing filter 27 for detecting the spherical aberration is changed locally so as to induce a change in phase partially in the spot section of transmitting laser beam 12'. Consequently, the same effect as when the sensitivity to the laser beam 12' is intensified is obtained.

The features of an optical disk unit shown in FIG. 2 and an optical head and an information recording/reproducing apparatus having the same optical head shown in FIG. 1 will be described by exemplifying the structure of the information recording/reproducing apparatus shown in FIG. 1. Even if a spherical aberration is generated due to a thickness unevenness of the covering layer 3a in the optical disk 3 by activating the defocus correcting circuit 105 using the defocus detecting system 102 having a high detection accuracy and a high reliability, a thickness unevenness of the covering layer (transparent protective layer) 3a of the optical disk 3 or a spherical aberration, which is generated when laser beam is focused on any of the recording layer 3d near the substrate or the recording layer 3b near the covering layer is detected and the spherical aberration correcting mechanism 101 is driven so as to correct the thickness unevenness (spherical aberration).

Referring to FIG. 2, for example, if the thickness unevenness correcting convex lens 17 is moved in order to correct the spherical aberration, although laser beam 12 of the light transmission system is of parallel beam before the thickness unevenness correcting convex lens 17 is moved, in a condition just before it passes the thickness unevenness correcting convex lens 17 and enters the objective lens 19, it changes to divergent light or convergent light. On the other hand, because convergence provided to the laser beam 12 by the objective lens 19 is constant, a converging position of the laser beam 12 focused to the optical disk 3 is changed.

In a defocus detection/correction circuit control circuit system 111 of the optical disk unit 10 shown in FIG. 2, its control is carried out so that the aforementioned light converging position coincides with the recording layer 3d or the recording layer 3b in the optical disk 3. Consequently, a thickness unevenness detection/correction control circuit system 114 is activated so as to correct the spherical aberration and at the same time, the defocus detection/correction control circuit system 111 is affected. Because an interference (cross-talk) occurs between the thickness unevenness detection/correction control circuit system 114 and the defocus detection/correction control circuit system 111, both the "defocus correction control" and "thickness unevenness correction control" become considerable unstable.

To reduce this problem, the interference (cross-talk) between the "defocus correction control" and "thickness unevenness correction control" is reduced by changing a response speed of the defocus correction control and thickness unevenness correction control.

Figure 10:
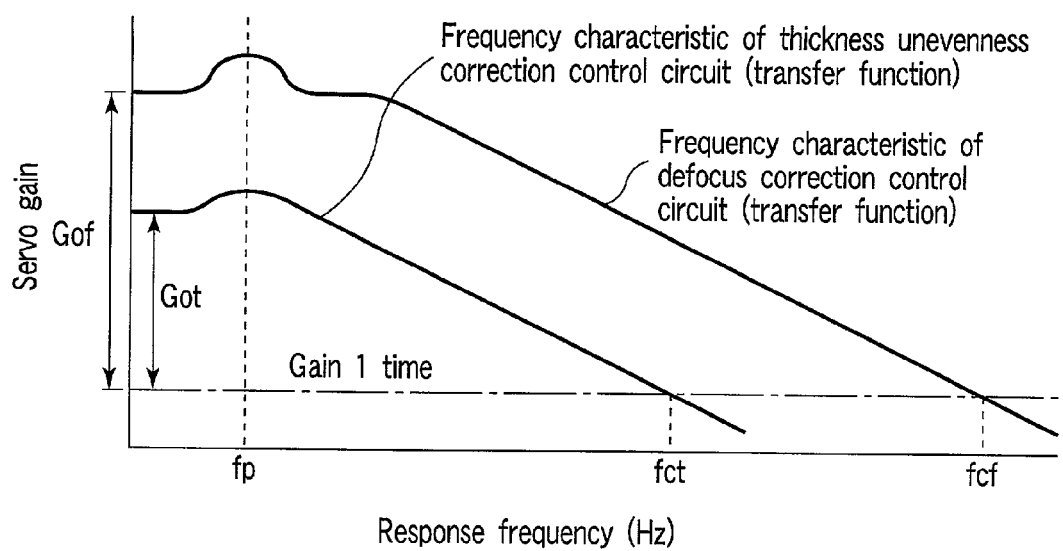
FIG. 10 is a graph for comparing the frequency characteristics (transfer functions) of a defocus correction control circuit and a thickness unevenness correction control circuit.

FIG. 10 is a graph for comparing the frequency characteristic (transfer function) of each of the defocus correction control circuit and the thickness unevenness correction control circuit.

As shown in FIG. 10, according to the present invention, servo gain of DC level of the frequency characteristic (transfer function) of the defocus correcting control circuit and the thickness unevenness correcting control circuit is set up so that a DC gain Gof of the defocus correction control circuit is much larger than a DC gain Got of the thickness unevenness correction control circuit. Further, the cut-off frequency, which is a response frequency at the time when gain is single time indicating a limit of applicability of correction control, is set up so that the cut-off frequency of the defocus correction control circuit is larger than the cut-off frequency fct of the thickness unevenness correction control circuit, that is, $$fcf \geq fct \qquad (12)$$

In the optical disk unit 10, the setting shown in the expression (12) is attained easily by each of the gain/band setting circuit 58 and the gain/band setting circuit 83. That is, because although not shown, linear amplifier gain can be adjusted by for example, adjustment of resistance ratio in each of the gain/band setting circuit 58 and the gain/band setting circuit 83, the DC gains Gof and Got can be set up independently.

Further, the cut-off frequencies fcf and fct, which are determined depending on setting of the DC gains Gof and Got can be automatically determined due to the structure of a driving mechanism (defocus correcting coil 20 and track shift correcting coil 21) of the objective lens 19 and the structure of a driving mechanism (thickness unevenness correcting coil 18) of the thickness unevenness correcting convex lens 17. Meanwhile, in the optical disk unit 10 shown in FIG. 2, although not shown, it is permissible to set up the cut-off frequencies fcf and fct positively by disposing a low-pass filter contained a pair of a capacitor and a resistor in each of the gain/band setting circuit 58 and the gain/band setting circuit 83.

As described above, an effect that the servo gain of the DC level of the frequency characteristic (transfer function) of the defocus correction control circuit and the thickness unevenness correction control circuit is set up so that the DC gain Gof of the defocus correction control circuit is much larger than the DC gain Got of the thickness unevenness correction control circuit, will be described.

For example, if the thickness of the covering layer 3a of the optical disk 3 changes suddenly or the recording layer on which light from the objective lens 19 is focused is changed from 3b to 3d or from 3d to 3b, the thickness unevenness detection/correction control circuit system 114 is activated so that the thickness unevenness correcting convex lens 17 is moved in a predetermined direction by a predetermined amount (distance).

However, because the cut-off frequency fct of the thickness unevenness detection/correction control circuit system 114 is sufficiently lower than the cut-off frequency fct of the correction control circuit system 111, the thickness unevenness correcting convex lens 17 is moved slowly. On the other hand, because the cut-off frequency fcf of the correction control circuit system 111 is several times higher than the cut-off frequency fct of the thickness unevenness detection/correction control circuit system 114, the position of the objective lens 19 is adjusted more quickly than the thickness unevenness correcting convex lens 17.

As a result, even while the thickness unevenness correcting convex lens 17 is being moved, the focus of the objective lens 19 is maintained at a high precision.

As a result of a confirmation experiment, to obtain the above-described effect, the cut-off frequency fcf of the defocus correction control circuit needs to be about twice higher than the cut-off frequency fct of the thickness unevenness correction control circuit and to stabilize the correction control to some extent, the fcf is desired to be 10 times or more higher than the fct.

That is, as an independent condition, the condition of $$fcf \geq 2fct \quad (13)$$

is necessary and preferably, if $$fcf \geq 10fct \quad (14),$$

the effect of the thickness unevenness correction is intensified.

FIGS. 11A to 11D are schematic diagrams for explaining the characteristic of the defocus detecting signal and the characteristic of the thickness unevenness detecting signal in the optical disk unit 10 (optical head and information recording/reproducing apparatus having the same optical head shown in FIG. 1) shown in FIG. 2.

Figure 11:
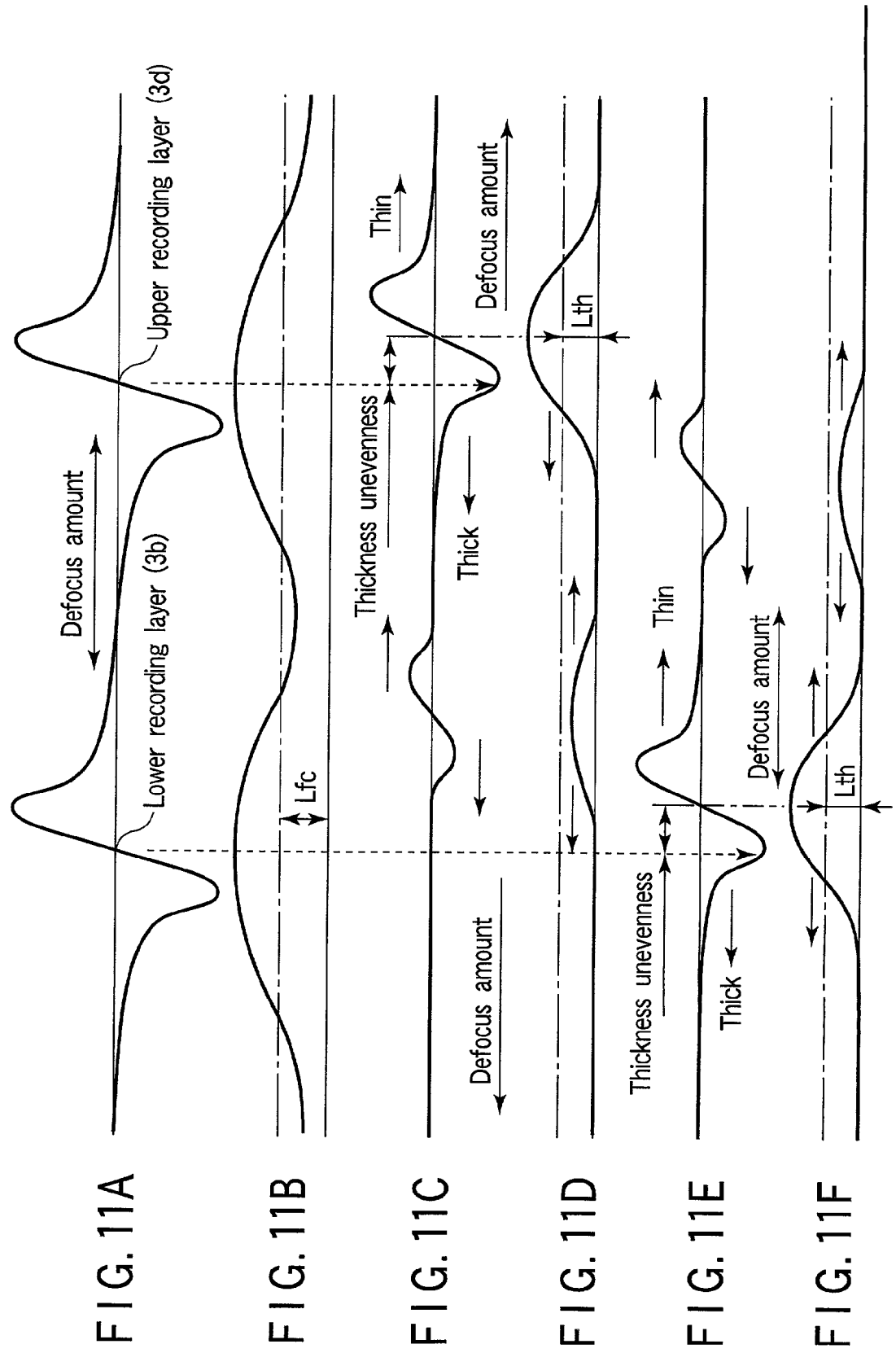
FIGS. 11A to 11F are schematic views for explaining the characteristic of a defocus detecting signal and the characteristic of a thickness unevenness detecting signal in the optical disk unit 10 (optical head unit and information recording/reproducing apparatus using the same optical head unit shown in FIG. 1) shown in FIG. 2.

In FIG. 11A, the horizontal axis indicates a defocus detecting signal with respect to a relative position between the objective lens 19 and the optical disk 3 and the vertical axis indicates an output signal from the subtractor shown in FIG. 2, for example.

As shown in FIG. 2, the optical disk 3 includes the second recording layer 3d (near the substrate) and the first recording layer 3b (near the covering layer), those layers being laid successively and therefore, the defocus detecting signal is subjected to "0" cross (the signal level passes a reference level) at two positions of the recording layer 3d and the recording layer 3b.

In FIG. 11B, the horizontal axis indicates a defocus detecting signal at a relative position of the objective lens 19 to the optical disk 3 and its vertical axis indicates changes of total light amount of the reproduced laser beam 12' irradiated on the photo detecting cells 25a, 25b, 25c and 25d of the first photo detector 25, or for example, output signal of the adder 81 in FIG. 2.

The level of the sum signal outputted from the adder 81 reaches its maximum value in the vicinity of a position of the upper recording layer 3d and in the vicinity of the lower recording layer 3b, and at other position, that is, if the objective lens 19 deviates so that light is not focused on any recording layer, the spot size of the reproduced laser beam 12' focused on each of the photo detecting cells 25a, 25b, 25c and 25d in the first photo detector 25 is increased, so that it projects from each of the photo detecting cells 25a, 25b, 25c and 25d, thereby reducing the level of the sum signal largely.

For example, the laser beam 12 is converged to the recording layer 3d (near the substrate) of the optical disk 3 or in the vicinity thereof and if the spherical aberration is corrected corresponding to the focus condition, detection characteristic shown in FIGS. 11C and 11D is obtained.

If the light converging position (near the covering layer) of the laser beam 12 is moved from a condition in which the detection signal shown in FIGS. 11C and 11D is obtained to the upper recording layer 3b, a difference signal and a sum signal for detecting the defocus change as shown in FIGS. 11A and 11B. After that, the defocus is detected in the lower recording layer 3b and a predetermined control for correction is carried out.

According to the present invention, as shown in the expressions (12) to (14), the defocus correction about the objective lens 19 is carried out at a speed of 2 to 10 times as compared to the thickness unevenness correction with the thickness unevenness correcting convex lens 17 and therefore, just after the light converging position of the laser beam 12 is moved from the recording layer 3d to the recording layer 3b (or from the recording layer 3b to the recording layer 3d), the focusing condition is attained rapidly.

Because as evident from the expressions (12) to (14), in the thickness unevenness correction control, its response speed is delayed 10 to 2 times as compared to defocus correction, the thickness unevenness correction (spherical aberration correction) is insufficient just after the position in which the laser beam 12 is converged is moved from the recording layer 3d to the recording layer 3b. Therefore, the spot size of the ±first-order spot focused on each photo detecting cell 29b and 29c of the second photo detector 29 for spherical aberration detection is increased tremendously (brightness drops), so that the signal amplitude of a difference signal (FIG. 11C) for thickness unevenness detection and the signal amplitude of a sum signal (FIG. 11D) decrease. Consequently, it is possible to detect such an abnormal jump between the recording layers that the light converging position of the laser beam 12 changes from the recording layer 3d to the recording layer 3b suddenly due to a disturbance according to the feature of the present invention shown in the expressions (12) to (14).

That is, because the difference signal and sum signal for defocus detection have the characteristics shown in FIGS. 11A and 11B, even if the position where the laser beam 12 is converged due to an abnormal jump between the recording layers changes, the sum signal level can maintain the amplitude more than Lfc shown in FIG. 11B in the vicinity of the recording layer 3b. Even if thickness unevenness (spherical aberration) correction is carried out in the vicinity of the recording layer 3d, the level of the sum signal (output signal of the adder 51 in FIG. 2) for thickness unevenness detection has a magnitude of Lth or more as shown in FIG. 11D.

Therefore, if the light converging position of the laser beam 12 is moved to the vicinity of the recording layer 3b just after that, the thickness unevenness detection/correction control circuit system 114 cannot follow up, so that the spots of the spherical aberration detecting laser beams 12b and 12c protrude largely from the spherical aberration detecting cells 29b and 29c. As a result, the level of the sum signal (output signal of the adder 51 shown in FIG. 2) for thickness unevenness detection drops below Lth (FIG. 11D), and therefore, it is possible to obtain a detection signal 60 for abnormal jump between the recording layers by determining whether or not the level of the sum signal for thickness unevenness detection is Lth or more with the comparator 59 shown in FIG. 2.

Hereinafter, an application or a modification of the optical disk unit shown in FIG. 2 will be described with reference to FIGS. 12 to 16. Meanwhile, like reference numerals are attached to the same components as FIG. 2 (and FIG. 1) and a detailed description thereof is omitted.

Figure 12:
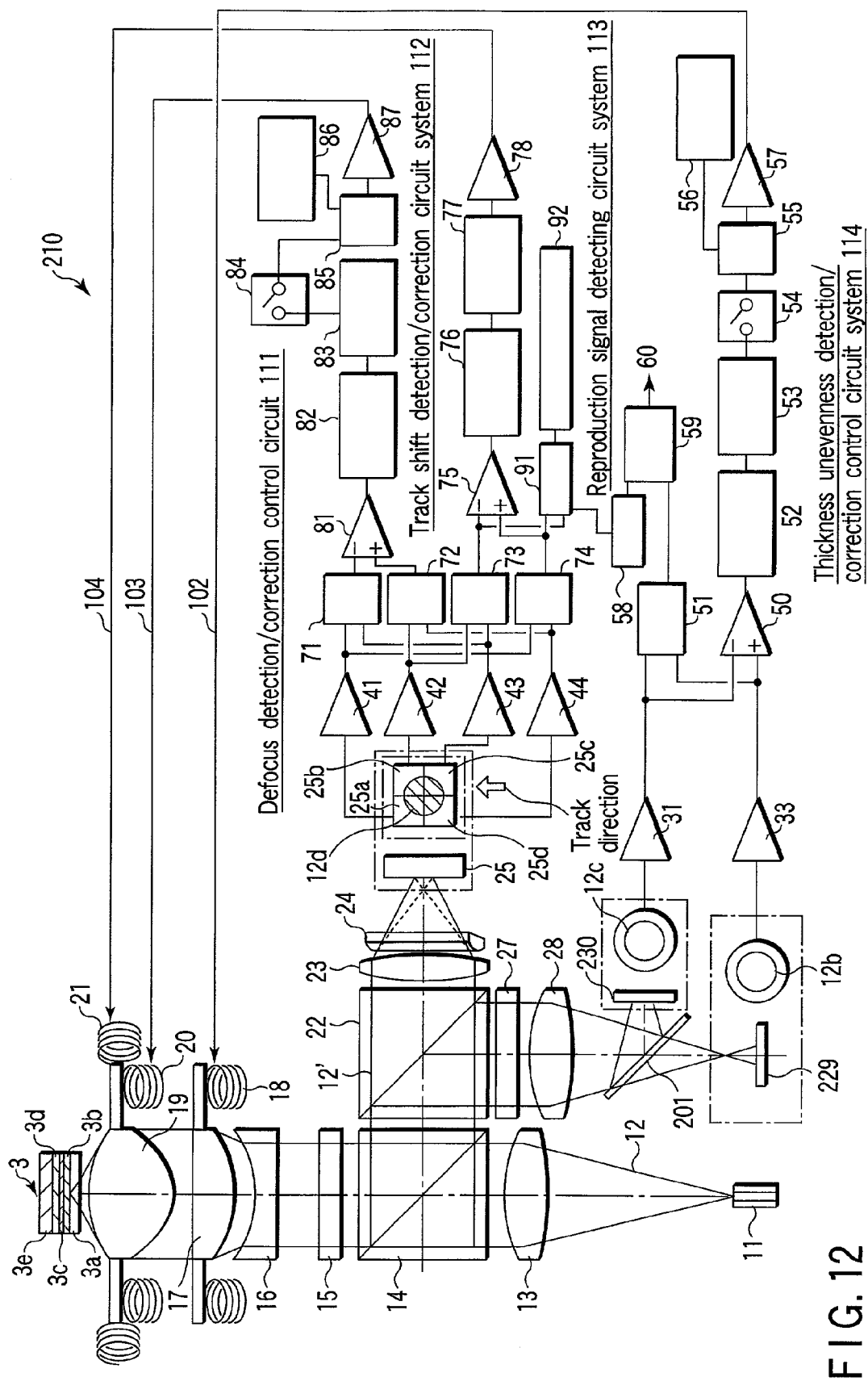
FIG. 12 is a schematic view for explaining another embodiment of the optical disk unit shown in FIG. 2.

Although the structure of the optical disk unit shown in FIG. 2 is compared with the structure of the optical head unit and the information recording/reproducing apparatus using the same optical head unit shown in FIG. 1, it is needless to say that there exist the same relation in the optical disk unit shown in FIG. 12.

The feature of an optical disk unit 210 shown in FIG. 12 is that the hologram device 26 used in the optical disk unit 10 described with reference to FIG. 2 is removed and a half mirror 201 is disposed between the spherical lens 28 and the second photo detector 29 (optical disk unit 10 of FIG. 2). Further, because the reproduced laser beam 12' directed to the second photo detector 229 is split by using the half mirror 201, a third photo detector 230 is added (about the photo detectors 229 and 230, both the optical system disposition and spots focused on the light receiving plane are indicated for convenience like FIG. 2).

The second photo detector 229 and the third photo detector 230 are provided at predetermined positions (substantially equal distances form the center of the minimum circles of confusion) in front of and behind the minimum circle of confusion formed when the reproduced laser beam 12' is converged based on convergence provided by the spherical lens 28. The distances from the center of the minimum circle of confusion to the second photo detector 229 and to the third photo detector 230 are defined according to the expressions (7) and (8) described previously.

In the optical disk unit 210 shown in FIG. 12, an optical detecting cell necessary for detecting the reproduced laser beam 12' focused along the optical axis of the spherical lens 28, a preamplifier for use in processing of the output thereof and an expensive hologram device can be omitted. In order to enable detection of an abnormal jump between the recording layers like the optical disk unit 10 shown in FIG. 2, a reproduction signal attenuated to a predetermined level with the attenuator 58 by branching the output of an adder 91 of a reproduction signal detecting system 113 is inputted to the comparator 59.

Figure 13:
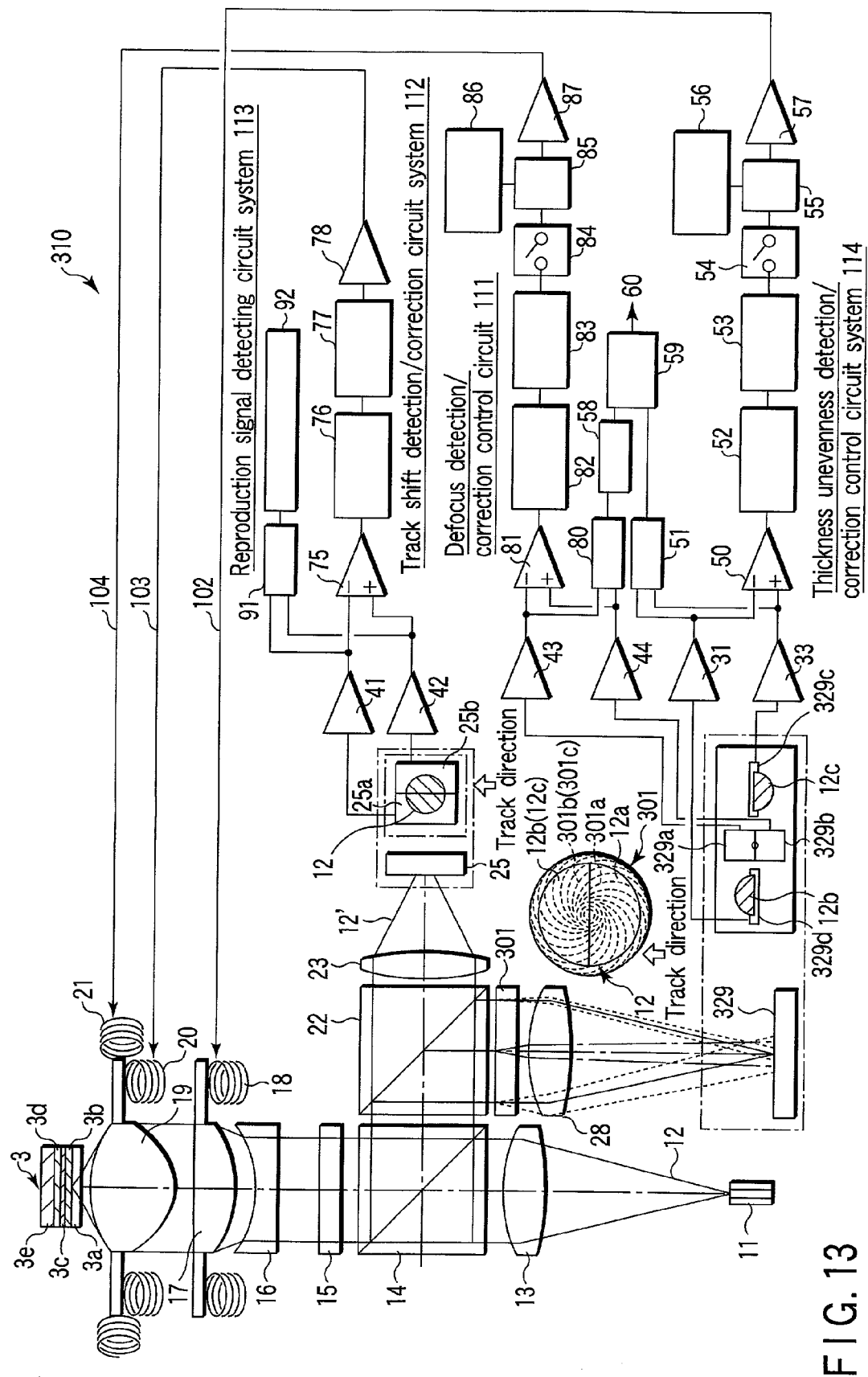
FIG. 13 is a schematic sectional view for explaining still another embodiment of the optical disk unit shown in FIG. 2.

An optical disk unit 310 shown in FIG. 13 is an example using a knife edge method in the defocus detecting system of the optical disk unit 10 described with reference to FIG. 2.

In the optical disk unit 310 shown in FIG. 13, as evident from a refraction pattern capable of coping with the knife edge method, that is, a schematic diagram in a plan view direction, a light shielding portion 301a which functions as a knife edge and a refraction pattern 301b (301c) which generates the ±first-order spot are given to the hologram device 301 such that it is divided by a straight line including the center of the optical axis. As for the structure of the optical disk unit 310 shown in FIG. 13, the optical system defined by a portion having no pattern of the hologram device 310 (a boundary portion of the light shielding portion 301a, equivalent to a state having no hologram device 301), the spherical lens 28 and two photo detecting cells 329a and 329d in the center of a second photo detector 329 corresponds to the defocusing detection system 111 in the optical head unit shown in FIG. 1 and the information recording/reproducing apparatus having the optical head unit. Further, an optical system defined by the refraction pattern 301b (301c) of the hologram device 301, the spherical lens 28 and remaining two photo detecting cells 329b, 329c of the second photo detector 329 corresponds to the thickness unevenness (spherical aberration) detection system 114. Although part of the optical components are employed in common, the spherical aberration detection system 114 and the defocusing detection system 111 are provided independently.

The feature of the optical disk unit 310 shown in FIG. 13 is that the thickness unevenness detection/correction control circuit system 114 also serves as the correction control circuit system 111 by using only the single spherical lens 28 and the single photo detector 329 so as to reduce the size of the optical head unit thereby further reducing the weight thereof. Because the correction control circuit system 111 also serves as the thickness unevenness detection/correction control circuit system 114, the other piece of the reproduced laser beam 12' divided by the half prism 22 is employed to only detect a track shift and the first photo detector 325 is divided to two sections. Accompanied thereby, the quantity of pre-amplifiers for use in a signal processing circuit (track shift detection/correction control circuit system 112) is reduced.

The optical disk unit 310 shown in FIG. 13 is so constructed to detect a defocus using half detection light 12a extracted by dividing with a straight line including the vicinity of the optical axis center in which detection accuracy is stabilized most according to the knife edge method. Consequently, not only the accuracy of the defocus detection is improved but also the highest detection reliability is secured.

Figure 14:
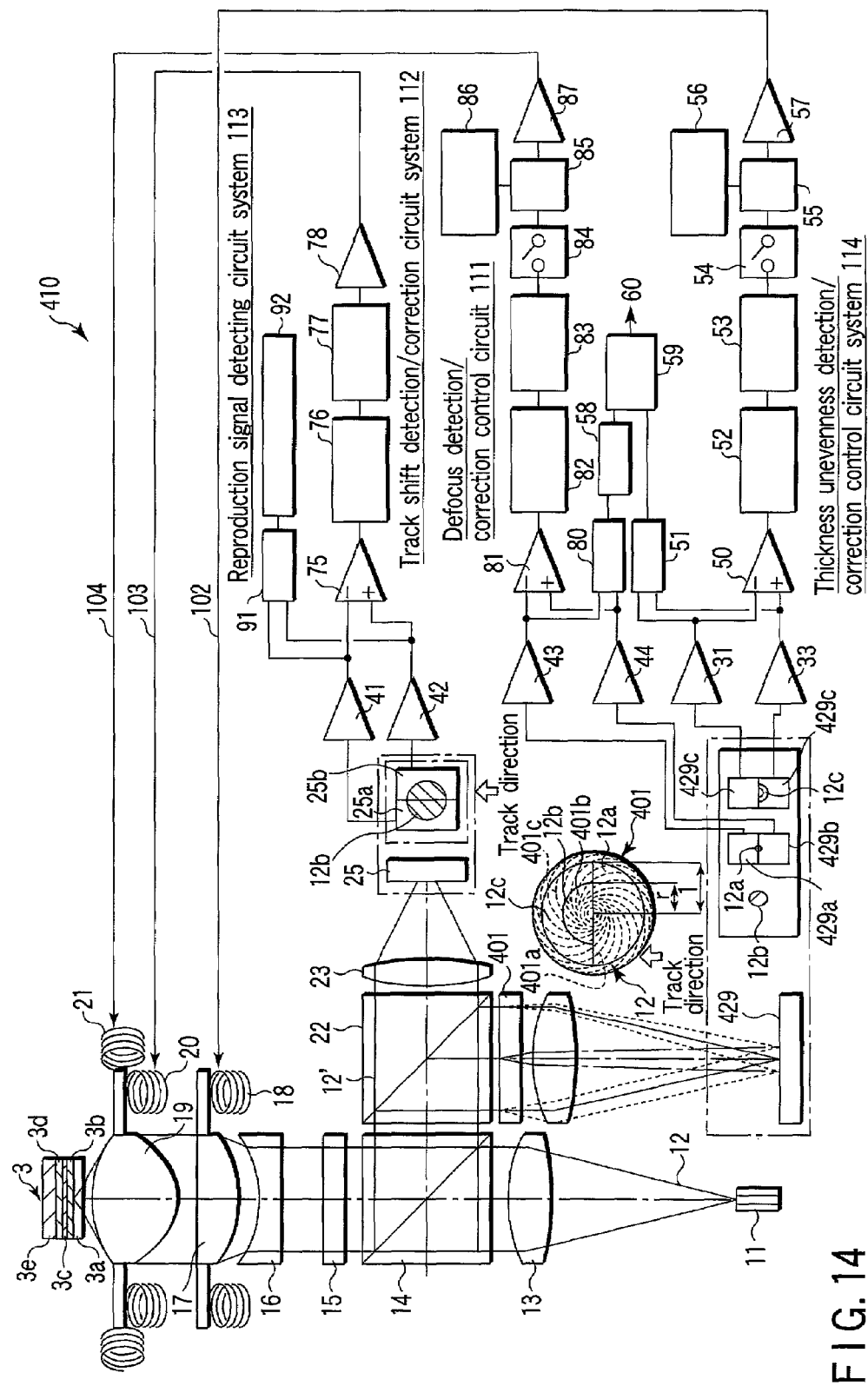
FIG. 14 is a schematic sectional view for explaining a further embodiment of the optical disk unit shown in FIG. 2.

An optical disk unit 410 shown in FIG. 14 employs the knife edge method as a defocus detection method like the optical disk unit 310 shown in FIG. 13 and in this unit, by using a pattern similar to a sensitizing filter for spherical aberration detection, which functions in the same way as a sensitizing filter used in the optical disk unit 10 shown in FIG. 2 as a hologram pattern of a hologram device 401 for generating the ±first-order spot, sensitizing processing is carried out.

The feature of the optical disk unit 410 shown in FIG. 14 is that the hologram device 401 includes three regions 401a, 401b and 401c and includes a blazed grating liked pattern covering the all of regions. Using only the laser beam 12c passing through the region 401c for detecting a spherical aberration. Meanwhile, because the radius $r$ of a border between the region 401b and the region 401c is set up so as to satisfy the expression (11), the sensitizing processing is attained to detect the spherical aberration and by detecting a sensitized signal, the spherical aberration is detected. A detection region of a corresponding photo detector 429 is divided to regions in which the zero-order light (center portion) is focused and regions 429b and 429c in which the ±first-order light (outer peripheral portion) is focused. Since, the hologram device 401 is blazed so as to attain the same function as a blazed grating (structure in which the refracted portion is inclined and which facilitates refraction in a specific direction), so that most of the refracted light is turned to the +first-order refracted light (so that light amount ratio of the −first-order refracted light is almost 0). Further, by shifting the center position of refraction stripes, the pattern is optimized so that the center of the optical axis of the +first-order refracted light is irradiated on a border line between the photo detecting cells 429b and 429c and a border line between the photo detecting cells 429a and 429d. Meanwhile, a spot 12b defined in an intermediate portion or between the center portion and the outer peripheral portion of the spot formed by the laser beam 12 is not used in this example.

The optical disk unit 410 shown in FIG. 14 is so constructed to detect a defocus using half detection light 12a extracted by dividing with a straight line including the vicinity of the optical axis in which the detection accuracy is the highest and stabilized according to the knife edge method like the optical disk unit 310 shown in FIG. 13. Thus, not only the accuracy of the defocus detection is improved but also the highest detection reliability is secured.

An optical disk unit 510 shown in FIG. 15 is an improvement of the optical disk unit 410 shown in FIG. 14. A hologram device 501 includes five regions, first to fifth, that is, regions 501a, 501b (inside), 501b (outside), 501c and 501d and includes a blazed grating liked pattern covering the all regions. The spherical aberration is detected using the laser beam 12b passing the region 501b and the laser beam 12c passing the region 501c. The radius of a border between the region 501c and the region 501a satisfies the expression (11) like the optical disk unit shown in FIG. 14 or FIG. 13 so as to sensitize the spherical aberration.

Meanwhile, the detection region of a corresponding photo detector 529 is divided to regions 529a and 529d in which the zero-order light (center portion) is focused and regions 529b and 529c in which the ±first-order light (outer peripheral portion) is focused. An intermediate portion, that is, part of the spots 12a and 12d defined between the center portion and outer peripheral portion of a spot formed by the laser beam 12 is not employed in this example.

If the detection light characteristic in a range shown in the expression (10) is changed in the hologram device 501 (light amount is attenuated or/and the phase is changed), the sensitivity of detecting the spherical aberration drops as described above. Conversely, the optical disk unit 510 shown in FIG. 15 makes a best use of this characteristic. That is, by combining the laser beam 12c whose detection sensitivity is increased on the photo detector 520 with the laser beam 12b whose detection sensitivity drops, sensitivity of detecting the spherical aberration can be improved further.

Since, the hologram device 501 is blazed so as to attain the same function as a blazed grating (structure in which the refracted portion is inclined and which facilitates refraction in a specific direction), so that most of the refracted light is turned to the +first-order refracted light (so that light amount ratio of the −first-order refracted light is almost 0). Further, by shifting the center position of refraction stripes, the pattern is optimized so that the center of the optical axis of the +first-order refracted light is irradiated on a border line between the photo detecting cells 529b and 529c and a border line between the photo detecting cells 529a and 529d.

In the optical disk unit 410 shown in FIG. 14 and the hologram devices 401 and 501 for use in the optical disk unit 510, duty in the refraction pattern is set to be 50%. That is, the refraction pattern is designed so that the zero-order refracted light component is 0 (light amount ratio of transmission light passing straight without being refracted is 0).

As described previously with reference to FIG. 7B, this employs the fact that if a portion from the center of the optical axis of the laser beam 12 impinging upon the objective lens 19 up to the radius $\underline{r}$ is shielded (transmission light amount is attenuated or the phase is changed), the maximum position (minimum circle of confusion) of the center intensity when focusing is attained is shifted by $\epsilon$.

Using the fact that when the position of $\epsilon$ is regarded as a light emission point, light emitted from the $\epsilon$ is reflected by the recording layer 3b or 3d of the optical disk 3 and returned to the objective lens 19 so that after that, it turns to convergent light, if that convergent light is irradiated into a detection light optical system shown at the right of FIG. 8, a shift amount $\xi$ of light converging point in the vicinity of the second photo detector 29 becomes equal to a value obtained by substituting $\epsilon$ for $\delta$ in the expression (1).

Therefore, if this convergent light is detected by a conventional defocus detecting optical system, a pseudo defocus detecting signal can be obtained. If in the optical system model shown in FIG. 8, pseudo spherical aberration is generated by the pseudo spherical aberration generating/sensitizing filter function provided device 26 and a portion from the center of the optical axis of the laser beam 12 up to the radius $\underline{r}$ is shielded (or transmission light amount is attenuated or the phase is changed), the center intensity is maximized at a position $\epsilon$ just before the recording layer 3b or 3d of the optical disk 3 (this position is regarded as a pseudo light emission point) although the focusing is attained, so that the pseudo defocus signal is detected on the second photo detector 29 after the detection optical system at the right of FIG. 8 is passed.

Figure 16:
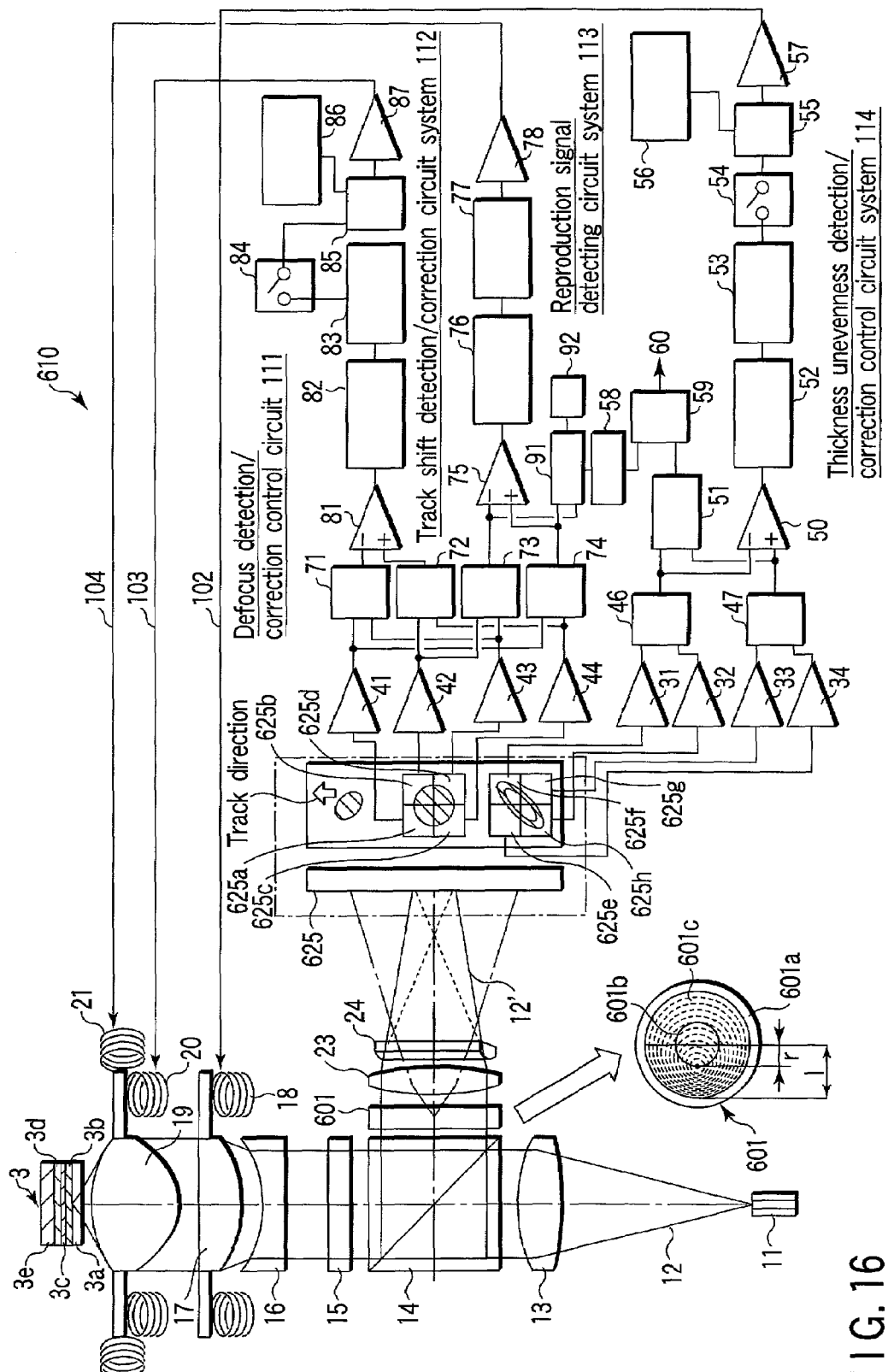
FIG. 16 is a schematic sectional view for explaining a yet still further embodiment of the optical disk unit shown in FIG. 2.

For the reason described above, if spherical aberration occurs due to thickness unevenness of the transparent protective layer (covering layer) 3a of the optical disk 3, defocus correction is carried out accurately using the first detection optical system (defocus detecting system) and a portion from the center of the optical axis up to the radius $\underline{r}$ is shielded by the second detection optical system (spherical aberration detecting system) at the same time (or transmission light amount is damped or the phase is changed). After that, if a signal is detected with a conventional existing defocus detecting optical system, spherical aberration amount can be detected in the form of pseudo defocus detection signal. FIG. 16 shows an example in which the spherical detecting system is constructed by using that phenomenon.

An optical disk unit 610 shown in FIG. 16 employs a stigmatic method known as a general defocus detecting method for spherical aberration detection. That is, a hologram device 610 shown in FIG. 16 is divided to two regions, first region 601b and second region 601c. By shifting the center of the refraction stripe of each region, the center of the optical axis of the +first-order refracted light refracted by the region 601c is focused on a center portion surrounded by the fifth to eighth photo detecting cells 625e, 625f, 625g and 625h of a photo detector 625.

Meanwhile, because at least two regions 601b and 601c of the hologram device 601 are blazed so as to attain the same function as a blazed grating like the hologram devices 501 and 401 described with reference to FIGS. 15 and 14 (structure in which the refracted portion is inclined so as to facilitate refraction in a specific direction), the +first-order refracted light intensity becomes much larger than the −first-order refracted light intensity. Therefore, the ratio of each refracted light intensity is 1:1:0:0:0 in the order of zero-order refracted light intensity, +first-order refracted light intensity, −first-order light intensity, +second-order light intensity, −second-order light intensity.

Meanwhile, the zero-order refracted light (straight transmission light) passing the center portion of the hologram device 601 passes the spherical lens 23 and the cylindrical lens 24 and is irradiated on photo detecting cells 625a to 625d of a photo detector 625 so as to detect a defocus amount according to defocus detection method widely called astigmatic method. Then, the defocus correcting coil 20 is provided with a current with the defocus detection/correction control circuit system 111 and then the position of the objective lens 19 is moved so as to correct the defocus.

The radius r of a border line (border circle) between the first region 601b and the second region 601c of the hologram device 601 is set up so as to satisfy the expression (11) as described previously. Therefore, the +first-order refracted light refracted by the region 601c of the hologram device 601 in a condition in which the focal point is made on the recording layer 3b or 3d of the optical disk 3 is sensitized for detecting the spherical aberration, so that in a model indicated in FIG. 5, a light converging position shown in FIG. 7B is increased from δ to ε. Its increase amount is further expanded on the detection optical system as shown in the expression (1). The laser beam 12c irradiated on the photo detecting cells 625e, 625f, 625g and 625h generates a pseudo defocus amount depending on a difference of a change from δ to ε in terms of the position of spherical aberration (position of minimum circle of confusion). As a result, the pattern of the laser beam irradiated on the photo detector 625 is changed from an angular shape having a completely circular shape to an elliptic ring shape as shown in FIG. 16 (photo detecting cells 625e, 625f, 625g and 625h) (as focused on the photo detecting cells 625a, 625b, 625c and 625d).

After this pattern change is processed by the thickness unevenness detection/correction control circuit system 114, it is converted to the thickness unevenness (spherical aberration) amount and then, by feeding a corresponding current to the thickness unevenness correcting convex lens driving coil 18, the thickness unevenness correcting convex lens 17 is moved by a predetermined amount in a predetermined direction. As a result, an influence by the spherical aberration generated by thickness unevenness in the covering layer 3a of the optical disk 3 can be removed. It is needless to say that the optical disk unit 610 shown in FIG. 16 has the same structure as the optical head unit and the information recording/reproducing apparatus having the same optical head unit shown in FIG. 1. Meanwhile, although the spherical aberration detection system 114 also serves as the defocusing detection system 111, they can be regarded as optically independent system without any cross talk because laser beam used in the spherical aberration detection system 114 is completely separated from laser beam used in the defocusing detection system 111.

Expressions (A-1) to (A-15) for use in dividing the regions of the hologram device for wavefront splitting using the hologram device 26 to be incorporated in the optical disk unit 10 shown in FIG. 2 are shown below.

A1) Definition of Bessel's Function and Development of Bessel's Function

The Bessel's function is defined as follows $$J_\nu(2\pi\rho r) \equiv \sum_{\xi=0}^{\infty} \frac{(-1)^\xi}{\xi!(\nu+\xi)!} (\pi\rho r)^{2\xi+\nu 24)} \quad (A-1)$$

According to the expression (A-1), $$J_0(2\pi\rho r) - J_2(2\pi\rho r) = 1 + \sum_{\xi=1}^{\infty} \frac{(-1)^\xi(2\xi+1)}{\xi!(\xi+1)!} (\pi\rho r)^{2\xi} \quad (A-2)$$

is introduced.

Because the aforementioned Bessel's function has a characteristic $$J_{-\nu}(2\pi\rho r) = (-1)^\nu J_\nu(2\pi\rho r)^{2)} \quad (A-3)$$

$$(-i)^{-\nu} J_{-\nu}(2\pi\rho r) = (-i)^\nu J_\nu(2\pi\rho r) \quad (A-4)$$

is obtained from the expression (A-3).

Therefore, $$M_{m\nu}(\rho) \equiv 2\int_0^1 r^{m+1} J_\nu(2\pi\rho r) dr \quad (A-5)$$

is obtained.

If the expression (A-1) is substituted for the expression (A-5), the above expression is changed to $$M_{m\nu}(\rho) = \sum_{\xi=0}^{\infty} \frac{2(-1)^\xi}{(2\xi+2+m+\nu)\xi!(\xi+\nu)!} (\pi\rho)^{(2\xi+\nu)} \quad (A-6)$$

According to the expression (A-6), $$M_{m\nu}(0) = \frac{2}{m+2} (\nu = 0), \quad (A-7)$$

$$M_{m\nu}(0) = 0 \, (\nu \neq 0) \quad (A-8)$$

and $$N_{(2\mu)}(\rho) \equiv M_{(2\mu)0}(\rho) - M_{(2\mu)2}(\rho) \quad (A-9)$$

$$= \frac{1}{\mu+1} + \sum_{\xi=1}^{\infty} \frac{(-1)^\xi(2\xi+1)}{(\xi+\mu+1)\xi!(\xi+1)!} (\pi\rho)^{2\xi}$$

are obtained.

Meanwhile, the aforementioned g(r, φ) is Henkel-transformed, it comes that $$H\{g(r, \phi)\} = \sum_{n=-\infty}^{\infty} (-i)^n e^{in\psi} 2\pi \int_0^\infty r g_n(r) J_n(2\pi\rho r) dr,^{22)} \quad (A-10)$$

-continued $$\text{and } g_n(r) = \frac{1}{2\pi}\int_0^{2\pi} g(r,\phi)e^{-in\phi}d\phi,^{22)} \quad (A\text{-}11)$$

$n$: integer

When g(r, φ) has the structure of $$g(r,\phi) = \sum_v A_v(r)\cos(v\phi), \quad (A\text{-}12)$$

$v$: integer the expression (A-10) turns to $$H\{g(r,\phi)\} = H\left\{\sum_v A_v(r)\cos(v\phi)\right\} \quad (A\text{-}13)$$

$$= 2\pi\sum_v (-i)^v \cos(v\psi)\int_0^\infty rA_v(r)J_v(2\pi\rho r)dr$$

If the expression (A-12) is substituted for the expression (A-11) and the expression (A-4) is used, the expression (A-13) is defined as $$H\{g(r,\phi)\}P_{anl} = H\left\{\sum_v A_v(r)\cos(v\phi)\right\}P_{anl} \quad (A\text{-}14)$$

$$= 2\pi\sum_v (-i)^v \cos(v\psi)(a-b)cA_v(c)J_v(2\pi c\rho)$$

$$\text{and } c \equiv \frac{a+b}{2} \quad (A\text{-}15)$$

under the condition of b<r<a and b≈a.

Further, the expression $$I(0) \approx \frac{1}{\sigma^4 + (\kappa\omega_{20})^2}\left\{D^2\eta + 4e^{-\sigma^2}\sin^2\left(\frac{\kappa\omega_{20}}{2}\right)[1-(1-\eta)DF]\right\}, \quad (M10)$$

is used to introduce the aforementioned expression (5).

In the optical disk unit shown in FIGS. 2, 12 to 16, 1) a method for correcting a thickness unevenness by the time when information is reproduced or recording of information is started after an information recording medium is loaded on the information recording/reproducing apparatus, and startup of control of that method, 2) a method for correcting an influence of thickness unevenness by the time when information is reproduced or recording of the information is started just after a layer which light is converged of the light reflecting layer or the recording layer is moved (the layer is switched) with respect to a recording medium including plural light reflecting layers or recording layers and startup of control of that method, and 3) a method for detecting a jump between layers (irregular shift between layers) generated at random when information is reproduced or information is recorded by converging light to any layer in an information recording medium having plural light reflecting layers or recording layers will be described in detail.

As described previously with reference to FIGS. 11A to 11F, the abnormal jump between layers will be described as a sum signal of the thickness unevenness detection signal which is indicated on the vertical axis of each of, that is, output level of the adder.

FIGS. 17A to 17G are graphs indicating changes in a thickness unevenness detection signal and a sum signal for detecting thickness unevenness in case where the defocus detection signal in the optical disk unit shown in FIG. 2 (FIGS. 12 to 16), and the thickness unevenness correcting convex lens 17 are set up at different three positions as a pair of FIG. 17B and FIG. 17C, a pair of FIG. 17D and FIG. 17E and a pair of FIG. 17F and FIG. 17G. Meanwhile, in FIGS. 17A to 17G, a case where the defocus correction control is activated so that the objective lens 19 is focused on the upper recording layer 3d will be considered.

If as shown in FIGS. 17B and 17C, a remaining thickness unevenness amount (remaining error amount of spherical aberration) just after a predetermined voltage is applied to the thickness unevenness correcting coil 18 is large in order to correct the position of the thickness unevenness correcting convex lens 17 the level of the sum signal shown in FIG. 17C is Lth (a much smaller value (substantially "0") than the magnitude defined previously in FIG. 11D or 11F). That is, it is detected that the position of the thickness unevenness correcting convex lens 17 is far from the focusing position shown in FIG. 17A. If the voltage applied to the thickness unevenness correcting convex lens driving coil 18 is changed so that the position of the objective lens 19 arrives at a position shown in FIG. 17D, the level of the sum signal becomes substantially equal to Lth as shown in FIG. 17E. That is, it is evident that the remaining thickness unevenness (remaining error amount of spherical aberration) affecting the objective lens 19 by correction which is a change of the position of the thickness unevenness correcting convex lens 17 has been reduced much.

If the objective lens 19 reaches the focusing position (target position) shown in FIG. 17F, the level of the sum signal becomes about 1.5 times to 2.5 times Lth (gain control is enabled) and the magnitude of the thickness unevenness detection signal substantially reaches a standard value.

However, in various optical disk units shown in FIG. 2 and FIGS. 12 to 16, as described previously, in any case of i) case where a large thickness unevenness occurs in the transparent protective layer (covering layer) 3a of the recording medium 3, and ii) case where dust or scratch occurs in the surface of the transparent protective layer 3a of the recording medium 3, the level of the sum signal (for example, output signal of the adder 51 in FIG. 2) for detecting the thickness unevenness drops.

Therefore, it is necessary to identify which the sum signal for detecting the thickness unevenness indicates i) occurrence of the thickness unevenness or ii) attachment of dust or occurrence of scratch. Meanwhile, because the thickness of the covering layer 3a is 0.1 mm in median value, the thickness unevenness can be detected with allowance of ±0.05 mm.

The characteristic or configuration of a photo detector capable of specifying any one of a change in the thickness unevenness of the covering layer 3a or a case where dust adheres to the covering layer 3a in the optical disk unit shown in FIG. 2 and FIGS. 12 to 16 or processing of output signal will be described.

First, if dust or scratch occurs in the surface of the transparent protective layer 3a of the information recording medium 3 in the optical disk unit shown in FIG. 2, the output level drops. Therefore, even if a thickness unevenness of about ±0.05 mm occurs because the specified thickness of the covering layer is 0.1 mm, it is possible to detect the thickness unevenness by extracting a detection signal capable of obtaining an output of a predetermined output signal level and then comparing that detection signal with the sum signal (output signal level of the adder 51) for detecting the thickness unevenness in terms of the magnitude.

The output signal level drops if dust or scratch occurs in the surface of the covering layer 3a of the information recording medium 3. Even if the thickness of the covering layer changes in allowance of ±0.5 mm, the unit of FIG. 2 is capable of using an output signal outputted from the photo detecting cell 29a as a detection signal whose output signal level does not drop.

The light receiving area of the photo detector 29a is two or more times a minimum size required for detecting an ordinary defocus. If no thickness unevenness occurs in the covering layer 3a, when the objective lens 19 is located at its focusing position, the size of a light spot focused on the photo detecting cell 29a becomes a predetermined size (a design value for detecting the defocus). By setting so that a light spot twice or more larger than a design value for is 15 detecting the defocus is irradiated on the photo detecting cell 29a if a thickness unevenness occurs in the covering layer 3a, it is possible to detect occurrence of thickness unevenness of the covering layer 3a as well as the defocus. In other words, by making it possible to detect all area (total light amount) of the light spot even if the area of the light spot of the defocus signal changes to be twice or more larger due to the thickness unevenness of the covering layer 3a, a defocus amount of the objective lens 19 can be detected. Consequently, a change in the area of the light spot except when dust or scratch occurs in the covering layer 3a or thickness unevenness in the covering layer 3a can be detected.

In the optical disk unit shown in FIG. 12, the sum signal detected by the photo detector 25 for use in detecting the defocus, track shift and reproduction signal is hardly affected by the thickness unevenness of the covering layer 3a of the information recording medium 3. That is, because the spot size of the light spot 12d of the laser beam 12' irradiated onto the photo detector 25 is not changed largely even if a thickness unevenness occurs in the covering layer 3a, the sum signal (for example, output signal of the adder 85) detected by the photo detector 25 is increased as compared to the other outputs. Thus, even if a thickness unevenness (spherical aberration) occurs, little change occurs in the output level.

In the optical disk unit shown in FIG. 13, the sum signals (output of an adder 80) from photo detecting cells 239a and 329b for use in detecting the defocus are focused on the border line between the photo detecting cells 329a and 329b at the time of focusing of the objective lens 19. Thus, the size of each of the photo detecting cells 329a and 329b can be set up to be larger than the spot 12a.

Therefore, if a thickness unevenness occurs, the spot 12a never protrudes out of the photo detecting cells 329a and 329b.

In the optical disk unit shown in FIG. 14, when the sum signals (output of the adder 80) from the photo detecting cells 429a and 429b for use in detecting the defocus are provided, the spot 12a never protrudes out of the photo detecting cells 429a and 429b even if the thickness unevenness occurs in the same manner as the example shown in FIG. 13.

That is, even if the thickness of the covering layer changes in the allowance of ±0.5 mm in the optical disk unit shown in FIGS. 12 to 14, the output levels (output of the adder 51) of the aforementioned signal and a sum signal for detecting the thickness unevenness drop as a detection signal whose output level does not drop and consequently, the output of the comparator 59 is not changed so that the abnormal jump detection signal 60 is not generated.

In a condition in which the light spot of laser beam for recording or reproduction is converged on the upper recording layer 3d (in a condition before an abnormal jump between the recording layers in the light spot is generated), most of the laser beam spot (12b and 12c in FIG. 2, 12b and 12c in FIG. 12, 12b and 12c in FIG. 13 or 12c in FIG. 14) for detecting the thickness unevenness is converged in an area of the optical cell (29b and 29c in FIG. 2, 229 and 230 in FIG. 12, 329c and 329d in FIG. 13, and 429c and 429d in FIG. 14), respectively. Thus, as shown at the right of FIG. 11D, output voltage of the comparator 59 exceeds the level of its predetermined value Lth. If the light converging spot of laser beam for recording or reproduction is moved instantaneously from the upper recording layer 3d to the lower recording layer 3b, the defocus correction control is activated so that the focusing condition is attained, just after the light converging spot is moved to the lower recording layer 3b, because the frequency characteristic (cut-off frequency Fcf) of the defocus correction control circuit system 111 is sufficiently high (sufficiently fast), as described with reference to FIG. 11B.

However, as described with reference to FIGS. 11C, 11D, 11E and 11F, because the frequency characteristic (cut-off frequency Fct) of the thickness unevenness correction control circuit system 114 is very low (slow), the thickness unevenness correction is delayed several times to hundred times as compared to the defocus correction. Therefore, a condition in which a large thickness unevenness arises continues for a relatively long period.

In this case, the spots (12b and 12c in FIG. 2, 12b and 12c in FIG. 12, 12b and 12c in FIG. 13 or 12c in FIG. 14) of laser beam for detecting the thickness unevenness are irradiated on a corresponding photo detecting cell such that they protrude largely from the photo detecting cells for detecting the thickness unevenness (29b and 29c in FIG. 2, 229 and 230 in FIG. 12, 329c and 329d in FIG. 13 and 429c and 429d in FIG. 14), respectively. Thus, the output of the adder 51 (ex. FIG. 2) which is the sum signal of the thickness unevenness detection signal drops largely.

Consequently, the output level of the comparator 59 in each optical disk unit becomes lower than the predetermined value Lth as shown in FIG. 11D. By detecting a drop of the output level of the comparator 59 to below the predetermined level Lth, the signal 60 for detecting abnormal jump between the recording layers is obtained.

Hereinafter, an example of the correction control operation in which the sum signal indicated in each of FIG. 11D, FIG. 11F, FIG. 17C, FIG. 17E and FIG. 17G obtained as a result of detecting the thickness unevenness in order to remove an influence generated when dust is attached or scratch is generated in the transparent protective layer 3a of the recording medium 3 is replaced with output signal of the comparator 59 so as to enable "start of thickness unevenness correction", "termination of thickness unevenness correction control" and "detection of abnormal jump between recording layers" while the defocus correction control is being executed (focus servo loop ON), will be described below.

FIG. 17A shows a defocus detecting signal and each pair of FIGS. 17B, 17C, FIGS. 17D, 17E and FIGS. 17F, 17G indicate changes in the output of thickness unevenness detecting signal (output signal of the subtractor 50) and a sum signal for detecting the thickness unevenness (output signal of the adder 51) by changing the output voltage from the driving voltage generating portion 56 with the switch 54 in the thickness unevenness detection/correction control circuit system 114 turned OFF. Meanwhile, the horizontal axis in each graph indicates a defocus amount of the objective lens 19 or a defocus detecting signal with respect to a relative position of the objective lens 19. Further, a case where the objective lens 19 is focused on the upper recording layer 3d of the recording medium 3 as a result of the defocus correction control as shown in FIG. 17A will be considered.

From each pair of FIGS. 17B and 17C, FIGS. 17D and 17E and FIGS. 7F and 17G, it is recognized that if a remaining thickness unevenness after correction based on an output voltage value of the driving voltage generating portion 56 is large, the level of the sum signal (output signal from the comparator 59) is much smaller than the predetermined value Lth as shown in FIGS. 17B and 17C.

On the other hand, if the output voltage of the driving voltage generating portion 56 is changed so that the lens is moved to a position shown in FIG. 17D, that is, a focusing position of the upper recording layer 3d, the level of the sum signal (output signal of the comparator 59) becomes larger than the predetermined value Lth as shown in FIG. 17E. That is, it is made evident that the size of the remaining thickness unevenness (remaining error of spherical aberration) remaining after correction of the thickness unevenness is suppressed.

Further, if the output voltage of the driving voltage generating portion 56 is changed, it is recognized that the level of the sum signal (output signal from the comparator 59) is increased up to about double the predetermined value at a focusing position of the upper recording layer 3d as shown in FIGS. 17F and 17G.

Figure 18A:
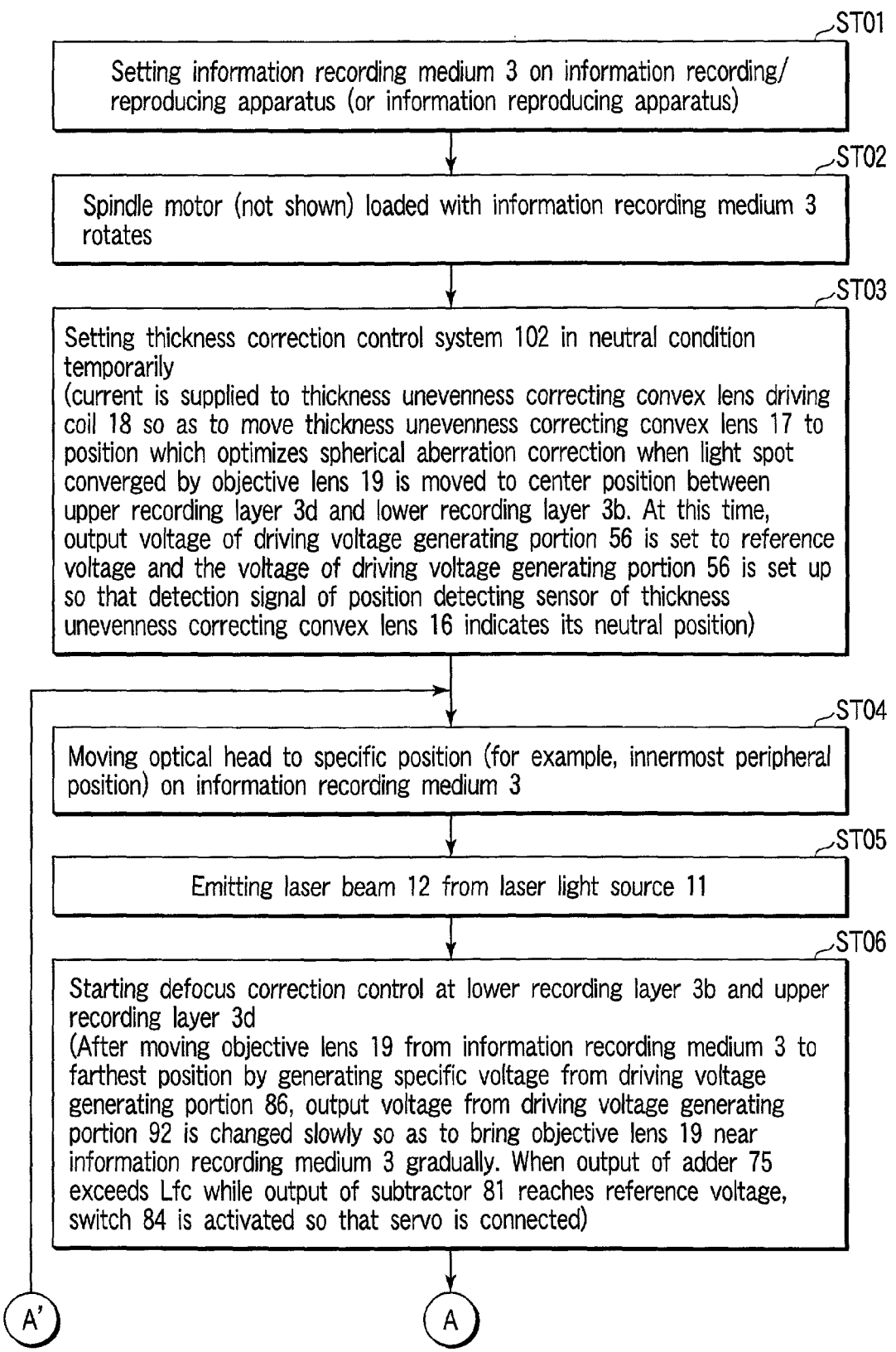
FIGS. 18A and 18B show an example of a method for extracting a start timing of thickness unevenness detection/correction control by detecting a status having a small thickness unevenness amount using the sum signal of the thickness unevenness detecting signal as an applied example other than detection of abnormal jump between converging spot recording layers.
Figure 18B:
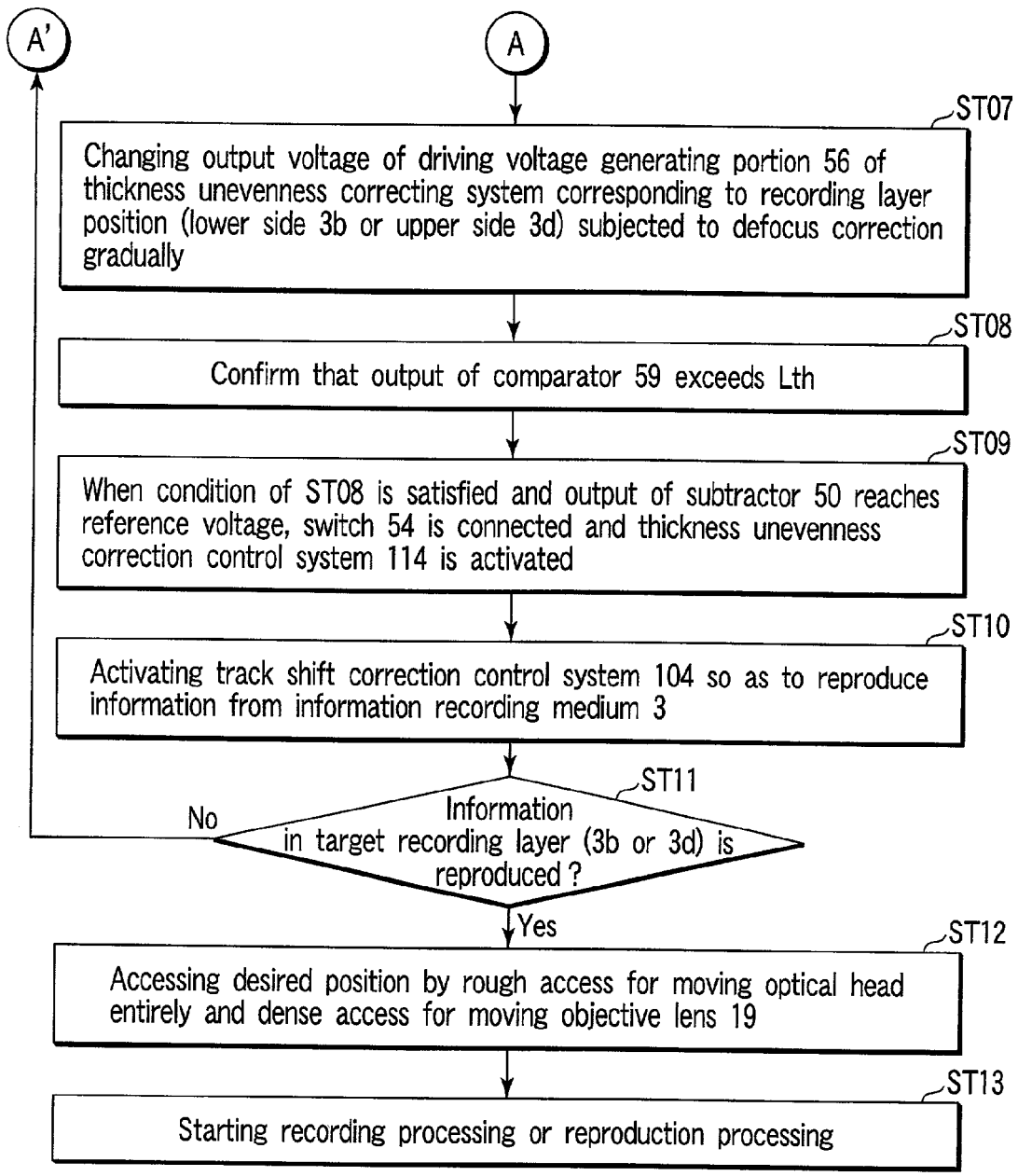

FIGS. 18A and 18B is a schematic diagram (flow chart) for explaining an example of a method capable of extracting a start timing of thickness unevenness detection/correction control by searching a condition having a small thickness unevenness using a sum signal (output of the comparator 59) of the thickness unevenness signal as an application example other than an abnormal jump of the light converging spot between the recording layers.

First, the information recording medium 3 is loaded on an information recording/reproducing apparatus (or information reproducing apparatus) of any type described with reference to FIG. 2 or FIGS. 12 to 16 (ST01).

Subsequently, a spindle motor (not shown) is rotated so that the information recording medium 3 is rotated at a predetermined speed (ST02).

Next, process for searching an optimum position for thickness unevenness correction is executed. Ahead of this process, the position of the thickness unevenness correcting convex lens 17 is moved to a temporary neutral position. In case where the thickness unevenness correcting convex lens 17 is disposed at a predetermined position of a fixing system through a slider member (not shown) or the like, if the switch 54 in the thickness unevenness detection/correction control circuit system 114 is turned off or the output voltage of the driving voltage generating portion 56 is set to a reference voltage so that no current flows to the thickness unevenness correcting convex lens driving coil 18, the thickness unevenness correcting convex lens 17 is located at a neutral position due to activity of a spring.

If the thickness unevenness correcting convex lens 17 is so constructed to include no spring member, such that it is located at a predetermined position relative to a fixing position through a sliding mechanism (not shown), a position sensor using optical principle or using a electrostatic capacity principle is disposed and the neutral position of the thickness unevenness correcting convex lens 17 is determined at a position where the output of this position sensor becomes a reference voltage. Further, a correction amount of the spherical aberration in the vicinity of the neutral position of the thickness unevenness correcting convex lens 17 is substantially "0". Because when the thickness of the transparent protective layer 3a is ideal with respect to an information recording medium having a single recording layer, spherical aberration correction (thickness unevenness correction) is hardly necessary, the vicinity of a neutral position of the thickness unevenness correcting convex lens 17 corresponds to an optimum position for thickness unevenness correction. Further, because even in an information recording medium corresponding to an information reproducing (recording/reproducing) apparatus employing an objective lens of a high NA, an average value between a distance from the surface of the transparent protective layer 3a to the lower recording layer 3b and a distance from the surface of the transparent protective layer 3a to the upper recording layer 3d requires the spherical aberration correction amount of substantially "0", if there are plural recording layers capable of reproducing or recording from a single side, an optimum position for thickness unevenness correction in the center of the upper recording layer 3d and the lower recording layer 3b is located in the vicinity of the "neutral position" of the thickness unevenness correcting convex lens 17. Meanwhile, by locating the thickness unevenness correcting convex lens at the "neutral position" or in the vicinity thereof, time required for searching for the vicinity of the optimum position for thickness unevenness correction can be reduced.

More detail, current of a predetermined magnitude is supplied to the thickness unevenness correcting driving coil 18, so that the thickness unevenness correcting convex lens 17 is moved slowly. Then, by the movement of this thickness unevenness correcting convex lens, a position in which the thickness unevenness amount (remaining error amount of spherical aberration) is minimized (small) is obtained (detected). Actually, current of a predetermined magnitude and polarity is supplied so as to move the thickness unevenness correcting convex lens 17 to a position optimizing spherical aberration correction when a light converging spot which is focused by the objective lens 19 is located substantially in the center between the upper recording layer 3d and the lower recording layer 3b of the recording medium 3 (ST03).

In step ST03, when defocus correction control is started (when the switch 84 of the defocus detection/correction control circuit system 111 is connected), the thickness unevenness correcting convex lens 17 is located at the neutral position as initial setting.

That is, because the thickness unevenness correction control system 102 is located at the neutral position in its initial condition, which a recording layer which the objective lens 19 is focused on is the upper recording layer 3d or the lower recording layer 3b can be distinguished.

Next, in order to protect the recording layer 3b or the recording layer 3d from erroneous recording of unnecessary information prior to start of the defocus correction control, the optical head unit is moved to a specific position like an innermost peripheral position on the information recording medium 3 (ST04).

By supplying a predetermined driving current from a light emission control portion (laser driving circuit) (not shown) subsequently, laser beam 12 of a predetermined wavelength is emitted from the semiconductor laser device 11 (ST05).

When the defocus correction control is started (focus servo loop is turned ON) so that the switch 84 of the defocus detection/correction control circuit system 111 is cut off, a sweep voltage whose output voltage changes gradually is supplied from the driving voltage generating portion 86 to the objective lens driving coil (defocus correcting coil) 20, so that the objective lens 19 is moved slowly. More detail, the objective lens 19 is moved to a position farthest from the information recording medium 3 in a while and then, the objective lens 19 is approached to the information recording medium 3 gradually. That is, sum signal output level of defocus detection signal outputted from the defocus detecting photo detector (25 in FIG. 2, 25 in FIG. 12, 329a and 329b in FIG. 13, 429a and 429b in FIG. 14, 529a and 529d in FIG. 15), respectively, becomes higher than Lfc in the vicinity of a focusing position in the upper recording layer 3d or the lower recording layer 3b as described with reference to FIGS. 11A to 11F. Therefore, the level of the sum signal is detected so as to detect the focusing position. At a position where the output of the subtractor 81, which is the defocus detection signal, reaches a reference voltage (see FIG. 11A), the switch 84 is connected so as to start the defocus correction control (ST06).

Next, by changing the output voltage of the driving voltage generating portion 56 gradually, the thickness unevenness correcting convex lens 17 is moved in the direction of decreasing the remaining thickness unevenness correction amount (remaining spherical aberration amount) with respect to a recording layer which the objective lens 19 is focused (ST07).

The above-described step ST07 is continued until the output level of the comparator 59 exceeds a predetermined value Lth (ST08).

Next, the thickness unevenness correction control is started (thickness servo loop is turned ON). Specifically, because in step ST08, the objective lens 19 is located at substantially the focusing position when the thickness unevenness detection signal (output signal of the subtractor 50) substantially reaches the reference voltage (because the thickness unevenness correcting convex lens 17 is located at a temporary neutral position), the remaining thickness unevenness (remaining error amount of spherical aberration) after the correction is substantially "0". With this condition, the switch 54 of the thickness unevenness detection/correction control circuit system 114 is turned ON so as to activate the thickness unevenness correction control system 114 (ST09).

Subsequently, track shift correction control is started (track servo loop is turned ON). That is, the switch (not shown) in the track shift detection/correction control circuit system 112 is connected so as to activate the track shift correction control system 104 and information is reproduced from the information recording medium 3 (ST10).

In step ST10, whether or not information in a target information layer (3a or 3b) is reproduced is determined (ST11). In detail, in step ST11, pre-address information (not shown) in the information recording medium 3 is reproduced and whether or not information in the target recording layer 3b or 3d is reproduced is recognized. If information in the target recording layer is not reproduced (ST11-NO), defocus correction and thickness unevenness correction to the objective lens 19 are repeated (ST06 to ST10).

If in step ST11, information in the target recording layer is reproduced (ST11-YES), a current position is recognized using pre-pit address information so as to carry out rough access for moving the optical head entirely or dense access for moving only the objective lens is carried out and then, when a reproduction or recording start position is reached, recording processing or reproduction processing is started (ST13).

During continuous recording or continuous reproduction, an abnormal jump of a light converging spot between recording layers, which may be originated from disturbance or the like, is detected using a method described below with reference to FIG. 20 and if necessary, the light converging spot is returned to a target track.

Figure 19A:
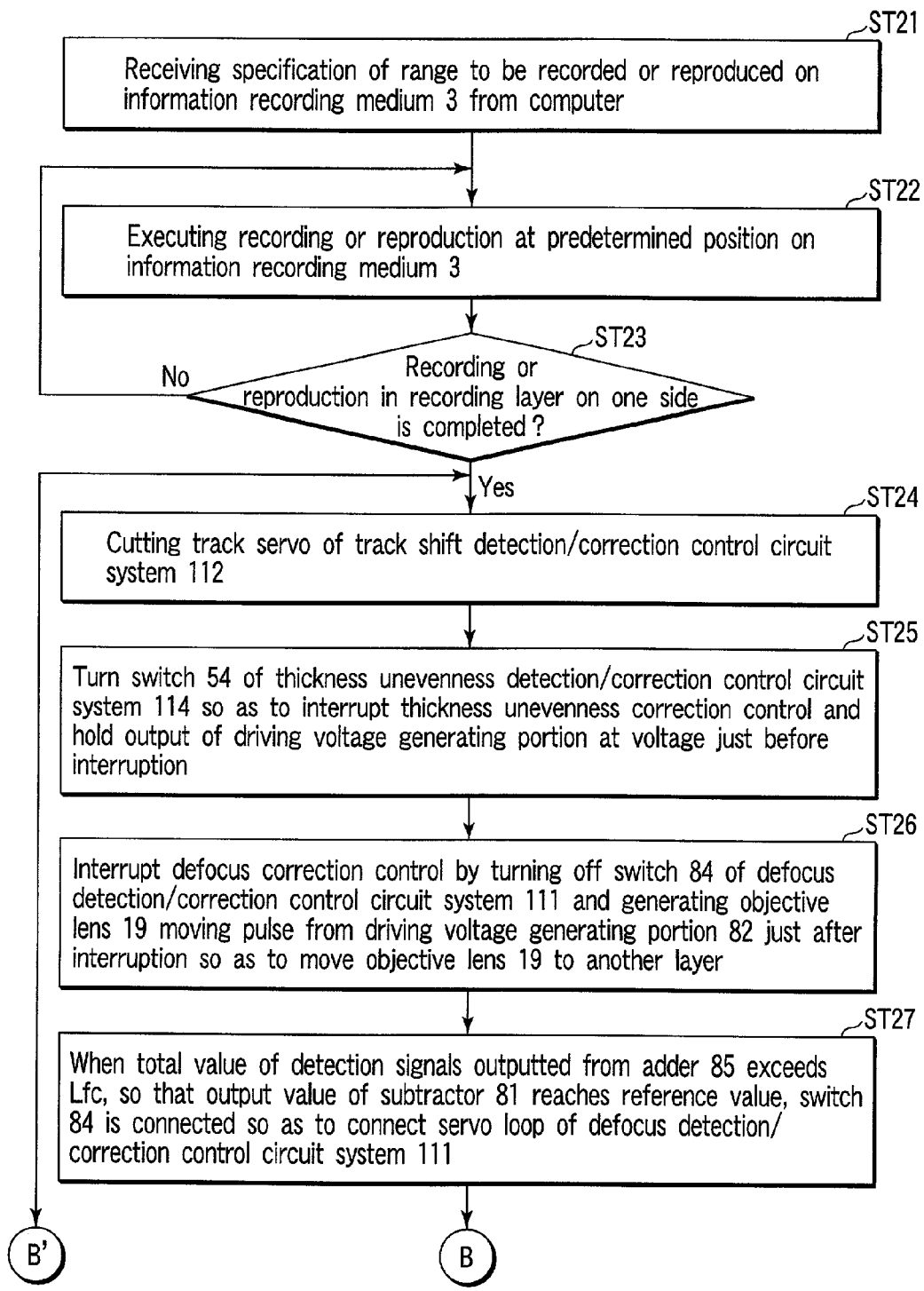
FIGS. 19A and 19B show a processing method for recording information across plural recording layers 3b and 3d from a side of the information recording medium 3 and for reproducing the same information, which is a modification of the method for extracting a start timing of thickness unevenness detection/correction control by detecting a status having a small thickness unevenness amount using the sum signal of the thickness unevenness detecting signal described with reference to FIGS. 18A and 18B.
Figure 19B:
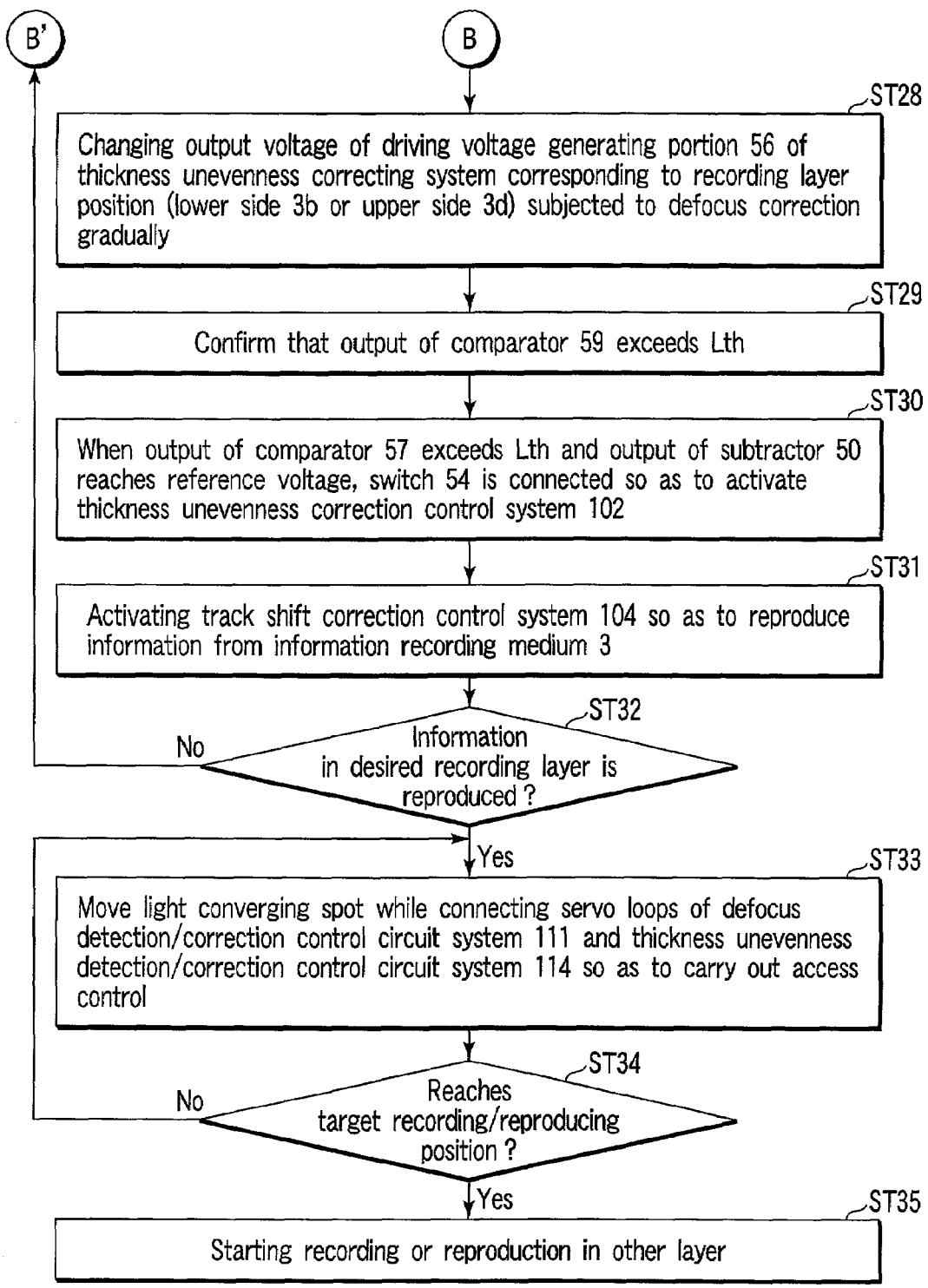

FIGS. 19A and 19B is a schematic diagram (flow chart) for explaining a processing method for recording information across plural recording layers 3b and 3d from a side of the information recording medium 3 and for reproducing the same information, which is a modification of the method for extracting a start timing of thickness unevenness detection/correction control by detecting a status having a small thickness unevenness amount using the sum signal of the thickness unevenness detecting signal described with reference to FIGS. 18A and 18B. In this case, all controls (servo loop) for "defocus correction control", "thickness unevenness correction control" and "track shift correction control" are turned off in a while and the objective lens 19 is moved to other recording layers 3b and 3d. After that, all the controls for the "defocus correction control", "thickness unevenness correction control" and "track shift correction control" are restored (servo loop is turned ON).

First, a host computer (not shown) specifies a range of information to be recorded or reproduced on the information recording medium 3 (ST21).

In step S21, information is recorded in a range specified in step S21 (ST22).

Next, termination of recording or reproduction in a recording layer is determined (ST23) and if the recording or reproduction is not terminated, current reproduction or recording is maintained until it is terminated (ST23-NO).

If recording or reproduction is terminated (ST23-YES), first, track shift correction control is terminated (track servo loop is turned off) (ST24) so as to terminate thickness unevenness correction control (thickness servo loop is turned off). That is, the switch 54 is turned off (ST25). Meanwhile, in step ST25, output (voltage value) of the driving voltage generating portion 56 just before the switch 84 is turned off is maintained by a memory (not shown) or a voltage holding circuit (not shown).

Subsequently, the switch 84 is turned off so as to terminate the defocus correction control (focus servo loop is turned off). Output of the driving voltage generating portion 56 is held by a memory or a voltage holding circuit (not shown). Further, a pulse for moving the objective lens 19 is generated from the driving voltage generating portion 82 just after so as to move a layer on which laser beam is converged by the objective lens 19 to another recording layer (ST26).

Next, the defocus correction control is started (focus servo loop is turned on). More detail, when a total value of detection signals outputted from the adder 85 exceeds a predetermined value Lfc while output value of the subtractor 81 reaches a reference value, the switch 84 is turned on and the servo loop of the defocus detection/correction circuit system 111 is turned on (ST27).

Subsequently, corresponding to a recording layer (3*d* or 3*b*) in which defocus correction is being carried out currently, the output of the driving voltage generating portion 56 of the thickness unevenness correcting circuit is changed gradually (ST28).

Next, the above-described step ST28 is held until the output level of the comparator 59 exceeds a predetermined value Lth (ST29). When the output of the comparator 59 exceeds the predetermined value Lth and the output of the subtractor 50 reaches the reference voltage, the switch 54 is turned on so that the thickness unevenness correcting system 102 is activated. That is, the thickness unevenness correction control is started (thickness servo loop is turned on) (ST30).

Then, the track shift correction control is started (track servo loop is turned on) or the track shift correcting system 104 is activated so as to reproduce information from the information recording medium 3 (ST31).

Next, pre-address information (not shown) in the information recording medium 3 is reproduced and whether or not information in a target recording layer 3*b* or 3*d* is reproduced is determined (ST32).

Unless information in the target recording layer is reproduced (ST32-NO), the sequential process from step ST24 is repeated (ST24 to ST32).

If in step ST32, information in the target recording layer is reproduced (ST32-YES), servo loops of the defocus detection/correction control system 111 and the thickness unevenness detecting/correcting system are turned on and a light converging spot converged by the objective lens 19 is moved, and then, the rough access or the dense access of moving only the objective lens is carried out (ST33).

In step ST33, whether or not reproduction of a target or arrival at a recording start position is attained is determined (ST34) and after the target position is reached (ST34-YES), the recording processing or reproduction processing is started (ST35).

Needless to say, if the light converging spot by the objective lens 19 does not reach the target position in step ST34, the step ST33 is repeated.

When the thickness unevenness correction control is interrupted by cutting off the switch 54 of the thickness unevenness detection/correction control circuit system 114 in step ST25, by holding the output of the driving voltage generating portion 56 at a voltage value just before the interruption, time required until the thickness unevenness correction control is stabilized can be reduced like in steps described with reference to FIG. 20, when the thickness unevenness correction control is restarted. Further, by generating a pulse for moving the objective lens 19 from the driving voltage generating portion 86 after all controls (servo loops) for "defocus correction control", "thickness unevenness correction control" and "track shift correction control" are cut off, in order to move the objective lens 19 to other recording layers 3*b* and 3*d*, a recording layer relating to the recording or reproduction can be changed easily. Meanwhile, after the objective recording layer is changed, the all controls for "defocus correction control", "thickness unevenness correction control" and "track shift correction control" may be restored in the order of the steps described with reference to FIGS. 18A and 18B.

Figure 20:
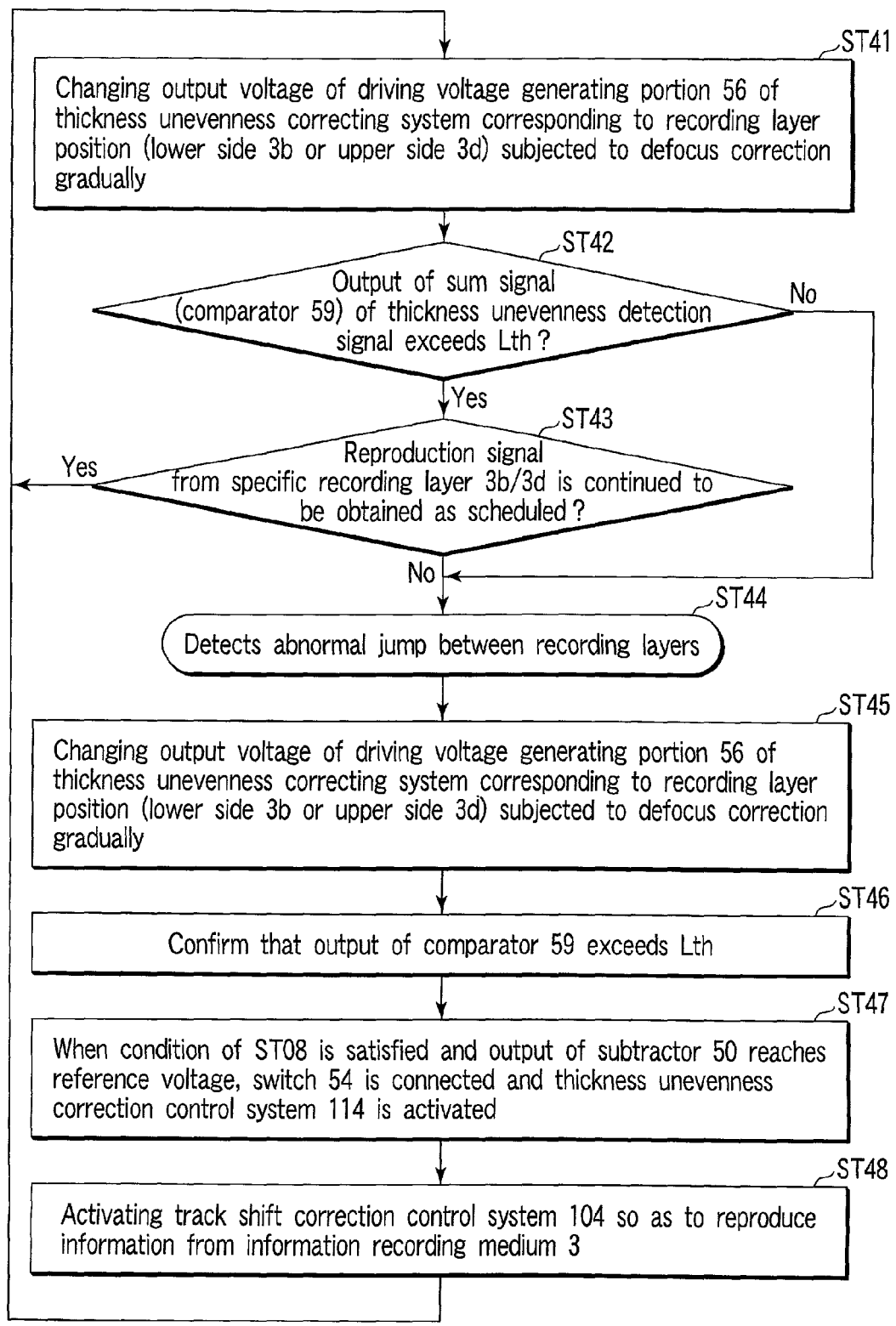
FIG. 20 is a schematic diagram (flow chart) for explaining a process for detecting a jump (an undesired shift of converging light between layers) between the recording layers on which the converging light is focused.

FIG. 20 is a schematic diagram (flow chart) for explaining a process for detecting an abnormal jump between the recording layers.

In steps shown in FIG. 20, the track shift detection/correction control circuit system 112 is activated (track servo loop is turned on) and with the defocus detection/correction control circuit system 111 activated (focus servo loop on), a change in the level of the sum signal (output of the adder 51) of the thickness unevenness detection signal is detected so as to detect an abnormal jump of the light converging spot between the recording layers.

Although not shown, address information indicating a detailed position on the information recording medium 3 is recorded in each of the recording layers 3*b* and 3*d* of the information recording medium 3 as for example, a pre-address.

As for the style of this pre-address, 1) recording layer information (identification information for identifying the upper recording layer 3*d* or the lower recording layer 3*b*) is recorded in the pre-address information, or 2) the pre-address information is set up in sequence number across the respective recording layers 3*b* and 3*d*.

It is necessary to distinguish which a recording layer whose information is reproduced according to the pre-address information is the upper recording layer 3*d* or the lower recording layer 3*b* immediately. Because this information is recorded preliminarily, which of the recording layers a currently reproduced recording layer can be distinguished by reproducing the pre-address information.

More specifically, during reproduction or recording of information in the specific recording layer 3*b* or 3*d* on the information recording medium 3 (ST41), whether or not the sum signal of the thickness unevenness detection signal or the output of the comparator 57 exceeds the predetermined value Lth is determined (ST42). If no reproduction signal from a scheduled recording layer is obtained (ST43-NO), it is determined that the objective lens 19 is moved unexpectedly due to an influence of disturbance or the like so that an abnormal jump of the light converging spot between the recording layers occurs (ST44) and then the servo of the track shift detecting/correcting system 112 is turned off (ST45).

Next, the switch 54 of the thickness unevenness detecting/correcting circuit system 114 is turned off so as to interrupt the thickness unevenness correction and at the same time, a voltage just before the interruption of the driving voltage generating portion 56 is maintained with a memory or a voltage holding circuit (not shown) (ST46). At this time, the thickness unevenness detection/correction control circuit system 114 holds the output of the driving voltage generating portion 56 at a voltage just before the interruption in order to prevent an abnormal movement of the thickness unevenness correcting convex lens 17 due to run-away of the thickness unevenness detection/correction control circuit system 114. Further, this run-away preventive processing makes it possible to reduce time required to stabilize the operation of the thickness unevenness detection/correction control circuit system 114.

Subsequently, by turning off the switch 84 of the thickness unevenness detecting/correcting circuit system 111, the defocus control is interrupted (ST47).

Hereinafter, the ST13 is continued from the steps ST06 described with reference to FIGS. 18A and 18B (ST48).

Although not shown, the condition of reproduction or recording of information in the specific recording layer 3*b* or 3*d* on the information recording medium 3 in step ST41 means that a) the defocus detection/correction control is being carried out (focus servo loop is on), b) the thickness unevenness detection/correction control is being carried out (thickness servo loop is on), and c) track shift detection/correction is being carried out (track servo loop is on).

During continuous reproduction or continuous recording, the output of the comparator 59 is monitored every predetermined interval. If it is lower than a predetermined value Lth or the output of the comparator 59 exceeds the predetermined value Lth, the pre-address signal recorded preliminarily in each recording layer 3$b$, 3$d$ is detected with the reproduction processing circuit 92 of the optical disk unit shown in FIG. 2 or FIGS. 12 to 16 in order to monitor whether or not reproduction or recording is attained in the scheduled recording layers 3$b$ and 3$d$. If it is detected that an unexpected recording layer 3$b$ is traced, an abnormal jump between recording layers is dispatched. Meanwhile, in the example shown in FIG. 20, detection of the abnormal jump using a thickness unevenness detection signal (ST42) and detection of the abnormal jump using a reproduction signal from the pre-address (ST43) are employed at the same time in order to intensify the reliability.

As described above, in the optical disk unit having the thickness unevenness detecting optical system shown in FIG. 2 or FIGS. 12 to 16, respectively, its thickness unevenness detection/correction range (dynamic range) is relatively small so that the thickness unevenness detection/correction control cannot be started from an arbitrary position. However, by moving the thickness unevenness correcting convex lens 17 slowly in the focusing condition so as to change thickness unevenness (spherical aberration) correction amount, monitoring a sum signal of the thickness unevenness signal so as to detect a position having a small thickness unevenness amount (spherical aberration after the correction) after the correction and starting the thickness unevenness correction control (thickness servo loop is turned on) with that condition, start timing of the thickness unevenness detection/correction control can be extracted without providing the optical disk unit with any new detecting circuit or detecting system.

By searching for a condition having a small thickness unevenness using the sum signal (output of the comparator 59) of the thickness unevenness detection signal and extracting a start timing for thickness unevenness detection/correction control, information can be recorded across plural recording layers 3$b$ and 3$d$ from a single side of the information recording medium 3 or can be reproduced.

Further, according to the present invention, by detecting a moving distance $\delta$ of the minimum circle of confusion and its direction, a spherical aberration generated accompanied by a change in the thickness of the transparent protective layer 3$a$ or spherical aberration amount generated when the spot section (light converging spot) of the laser beam 12 is moved between the recording layers 3$b$ and 3$d$ is detected rapidly. That is, the feature of the present invention is that the amount and direction of the spherical aberration are detected by using a shift of the minimum circle of confusion (position in which the center intensity is maximized) in the optical axis direction generated when the spherical aberration occurs.

The thickness unevenness correction method of the present invention uses the fact that only when the objective lens is focused, the thickness unevenness detection signal can be obtained at a high precision. If it is intended to start the thickness unevenness correction control with a condition before the defocus correction control is carried out, the thickness unevenness correction control is started based on an erroneous thickness unevenness detection signal, so that the thickness unevenness can be corrected stably at a high precision.

If upon thickness unevenness correction control (thickness servo loop is turned on), the light converging spot is moved from a currently focused recording layer to another recording layer unreasonably, the abnormal thickness unevenness correction control is activated so that thickness unevenness correction control runs away. Thus, by terminating the thickness unevenness correction control temporarily before the light converging position is moved between recording layers, the run-away of the thickness unevenness correction control can be controlled and at the same time, time required until thickness correction control is restarted (thickness servo loop is turned on) just after the light converging position is moved can be reduced. By using the thickness unevenness detection signal, the abnormal jump detection signal can be obtained at a high precision, so that the necessity of detecting the abnormal jump between recording layers with a defocus detecting optical system is eliminated. As a result, freedom of the optical design is increased, so that a high precision defocus detecting optical system can be established.

As described above, according to the optical disk unit of the present invention, even if a thickness unevenness is generated in transparent resin layer located on the side of the objective lens of the optical disk unit of the present invention, information can be recorded at a high recording density by removing an influence of spherical aberration or distortion of converging light.

Further, according to the present invention, by detecting a position little affected by the spherical aberration by referring to a sum of the thickness unevenness detection signal and starting the thickness unevenness correction control with that condition, thickness unevenness detection/correction control startup timing can be extracted without providing an optical disk unit having a relatively small thickness unevenness detection/correction range (dynamic range) with any new detecting circuit and/or a detecting system.

The present invention is not limited to the embodiments described above and can be modified in various manners without departing from the spirit and scope of the invention.

For example, the present invention can provide a method for compensating for an influence of thickness unevenness in a recording medium including:

an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

controlling for at least one of said defocus correcting mechanism and said thickness unevenness correcting mechanism to approach a predetermined objective value based on at least one of a defocus amount detected by said defocus detecting system and a thickness unevenness amount (degree of spherical aberration) detected by said thickness unevenness detecting system.

The present invention can also provide to a method for compensating for an influence of thickness unevenness in a recording medium including:

an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

when controlling for at least one of said defocus correcting mechanism and said thickness unevenness correcting mechanism to approach a predetermined objective value based on at least one of a defocus amount detected by said defocus detecting system and a thickness unevenness amount detected by said thickness unevenness detecting system, controlling so that said thickness unevenness amount approaches said object value by means of said thickness unevenness correcting mechanism while said defocus amount is being controlled to be brought near the object value by means of said defocus correcting mechanism.

The present invention can further provide a method for compensating for an influence of thickness unevenness in a recording medium including: an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

detecting an abnormal jump (erroneous motion of the objective lens) in which although said objective lens is controlled so as to be focused on any recording layer in a recording medium, said objective lens is moved undesirably so as to focus on a different recording layer, said abnormal jump being detected by referring to a sum of signals outputted form each photo detecting region of said thickness unevenness detecting system while said objective lens is controlled in terms of position by means of said defocus correcting mechanism so as to approach a predetermined position.

Still further, the present invention can provide a method for compensating for an influence of thickness unevenness in a recording medium including:

an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

while [in a range in which] the position of said objective lens is controlled so as to approach a predetermined position by means of said defocus correcting mechanism, the sum of signals outputted from each photo detecting region of said thickness unevenness detecting system is referred to so that the thickness correction control by said thickness unevenness correcting mechanism is started.

Further another, the present invention can provide a method for compensating for an influence of thickness unevenness in a recording medium including: an objective lens for focusing light from a light source a predetermined position of any one of a guide groove or a recording mark string provided in any recording layer in a recording medium having two or more recording layers; a defocus detecting system for detecting a defocus generated when light converged to the recording medium by said objective lens is not focused at a predetermined position; a track shift detecting system for detecting a track shift generated when said objective lens is not focused at a predetermined position of any one of the guide groove or the recording mark; a thickness unevenness detecting system for detecting a thickness unevenness (spherical aberration) of transparent resin layer in the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; a defocus correcting mechanism for correcting a defocus detected by said defocus detecting system; and a track shift correcting mechanism for correcting a track shift detected by said track shift detecting system, said method comprising:

when changing the recording layer on which said light is focused on from a status in which said light is focused on any recording layer in the recording medium with said objective lens to another recording layer, stopping correction of said track shift with said track shift correcting mechanism and stopping changing of the focusing characteristic of light impinging upon the objective lens through said thickness unevenness correcting mechanism.

Still further, the present invention can provide a method for compensating for an influence of thickness unevenness in a recording medium including:

an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

detecting a thickness unevenness of the recording layer with said thickness unevenness detecting system in a condition in which the defocus amount outputted from said defocus detecting system is maximized.

Further another, the present invention can provide a method for compensating for an influence of thickness unevenness in a recording medium including: an objective lens for focusing light from a light source to a recording layer of a recording medium; a defocus detecting system including a detecting system provided with at least two different detection characteristics and for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, wherein said thickness unevenness detecting system detects a thickness unevenness of the recording layer using a detection signal outputted from a detecting system of said defocus detecting system.

Still further, the present invention can provide a method for compensating for an influence of thickness unevenness in a recording medium including: an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, wherein said thickness unevenness detecting system includes an optical device for changing the optical characteristic of light section and provides a detection sensitivity defined thereby.

Further another, the present invention can provide a method for compensating for an influence of thickness unevenness in a recording medium including: an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, wherein said thickness unevenness detecting system includes an optical device includes at least one of a filter or an apodizer for changing the optical characteristic of light section and provides a detection sensitivity defined thereby.

Still further, the present invention can provide a method for compensating for an influence of thickness unevenness in a recording medium including: an objective lens for focusing light from a light source to a recording layer of a recording medium; a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, wherein the band of a servo signal for said defocus correction control is different from a band of a servo signal for said thickness unevenness correction control.

Further another, the present invention can provide a method for compensating for an influence of thickness unevenness in a recording medium including: an objective lens for focusing light from a light source to a recording layer of a recording medium;

a defocus detecting system for detecting a defocus generated when light converged to the recording medium by said objective lens is not focused at a predetermined position; a thickness unevenness detecting system for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, wherein the band of a servo signal for said defocus correction control is different from a band of a servo signal for said thickness unevenness correction control and the band of said servo signal corresponding to a response frequency of said thickness unevenness correcting mechanism is lower than the band of said servo signal corresponding to a response frequency of said defocus correcting mechanism.

Still further, the present invention can provide an optical head unit comprising:

a light source for supplying light of a predetermined wavelength;

an objective lens for focusing light from said light source to the recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system for detecting a thickness unevenness in a transparent resin layer of the recording medium provided nearest said objective lens; and a thickness unevenness correcting mechanism for changing the focusing characteristic of light impinging upon said objective lens from said light source based on a change in the thickness of said transparent resin layer of said recording medium detected by said thickness detecting system.

Further another, the present invention can provide an optical head unit comprising:

a light source for supplying light of a predetermined wavelength;

an objective lens for focusing light from said light source to the recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system, includes an optical device which, when the radius of a spot section of light which is a detection object is assumed to be 1, damps the amount of said light in a range of $r \leq 0.88$ or changes the phase characteristic of said light or changes the phase of said light while damping the amount of said light, for detecting a thickness unevenness in a transparent resin layer of the recording medium provided nearest said objective lens; and a thickness unevenness correcting mechanism for changing the focusing characteristic of light impinging upon said objective lens from said light source based on a change in the thickness of said transparent resin layer of said recording medium detected by said thickness detecting system.

Still further, the present invention can provide an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system for detecting a thickness unevenness in a transparent resin layer of the recording medium provided nearest said objective lens, said thickness unevenness detecting system having an optical system for detecting a change of a maximum position of center intensity in the optical axis direction while the defocus correction is being carried out based on the defocus detected by said defocus detecting system; and a thickness unevenness correcting mechanism for changing the focusing characteristic of light impinging upon said objective lens from said light source based on a change in the thickness of said transparent resin layer of said recording medium detected by said thickness detecting system, wherein said optical head unit corrects a defocus of said objective lens using the defocus detection signal detected by said defocus detecting system and upon correcting the defocus, detects a thickness unevenness of said transparent resin layer by referring to a thickness unevenness detection signal detected from said optical system of said thickness unevenness detecting system.

Further another, the present invention can provide an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system, includes an optical device which, when the radius of a spot section of light which is a detection object is assumed to be 1, damps the amount of said light in a range of $r \leq 0.88$ or changes the phase characteristic of said light or changes the phase of said light while damping the amount of said light, for detecting a thickness unevenness in a transparent resin layer of the recording medium provided nearest said objective lens, said thickness unevenness detecting system having an optical system for detecting a change of a maximum position of center intensity in the optical axis direction while the defocus correction is being carried out based on the defocus detected by said defocus detecting system; and a thickness unevenness correcting mechanism for changing the focusing characteristic of light impinging upon said objective lens from said light source based on a change in the thickness of said transparent resin layer of said recording medium detected by said thickness detecting system, wherein said optical head unit corrects a defocus of said objective lens using the defocus detection signal detected by said defocus detecting system and upon correcting the defocus, detects a thickness unevenness of said transparent resin layer by referring to a thickness unevenness detection signal detected from said optical system of said thickness unevenness detecting system.

Still further, the present invention can provide an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system detects a thickness unevenness of said transparent protective layer in said recording medium by detecting a change of the maximum position of center intensity in the optical axis direction while the defocus correction is being carried out based on the defocus detected by said defocus detecting system; and a thickness unevenness correcting mechanism for changing the focusing characteristic of light impinging upon said objective lens from said light source based on a change in the thickness of said transparent resin layer of said recording medium detected by said thickness detecting system, wherein
said optical head unit corrects a defocus of said objective lens using the defocus detection signal detected by said defocus detecting system and upon correcting the defocus, detects a thickness unevenness of said transparent resin layer by referring to a thickness unevenness detection signal detected from said optical system of said thickness unevenness detecting system.

Further another, the present invention can provide an information recording/reproducing apparatus for reproducing information recorded in the recording layer or recording the information in said recording medium, said information recording/reproducing apparatus including an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system for detecting a thickness unevenness in a transparent resin layer of the recording medium provided nearest said objective lens; and a thickness unevenness correcting mechanism for changing the focusing characteristic of light impinging upon said objective lens from said light source based on a change in the thickness of said transparent resin layer of said recording medium detected by said thickness detecting system, wherein
the thickness unevenness of said transparent resin layer is detected using a defocus detecting signal detected by said defocus detecting system so as to remove an influence of the defocus of said objective lens by removing an influence of the thickness unevenness of the transparent resin layer.

Still further, the present invention can provide an information recording/reproducing apparatus for reproducing information recorded in the recording layer or recording the information in said recording medium, said information recording/reproducing apparatus including an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system, includes an optical device which, when the radius of a spot section of light which is a detection object is assumed to be 1, damps the amount of said light in a range of $r \leq 0.88$ or changes the phase characteristic of said light or changes the phase of said light while damping the amount of said light, for detecting a thickness unevenness in a transparent resin layer of the recording medium provided nearest said objective lens; and a thickness unevenness correcting mechanism for changing the focusing characteristic of light impinging upon said objective lens from said light source based on a change in the thickness of said transparent resin layer of said recording medium detected by said thickness detecting system, wherein
the thickness unevenness of said transparent resin layer is detected using a defocus detecting signal detected by said defocus detecting system so as to remove an influence of the defocus of said objective lens by removing an influence of the thickness unevenness of the transparent resin layer.

Further another, the present invention can provide an information recording/reproducing apparatus for reproducing information recorded in the recording layer or recording the information in said recording medium, said information recording/reproducing apparatus including an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system detects a thickness unevenness of said transparent protective layer of said recording medium by detecting a change in which the center intensity in the optical axis direction is maximized while the defocus correction is being carried out by referring to the amount of the defocus detected by said defocus detecting system; and a thickness unevenness correcting mechanism for changing the focusing characteristic of light impinging upon said objective lens from said light source based on a change in the thickness of said transparent resin layer of said recording medium detected by said thickness detecting system, wherein
the thickness unevenness of said transparent resin layer is detected using a defocus detecting signal detected by said defocus detecting system so as to remove an influence of the defocus of said objective lens by removing an influence of the thickness unevenness of the transparent resin layer.

Still further, the present invention can provide an information recording/reproducing apparatus for reproducing information recorded in the recording layer or recording the information in said recording medium, said information recording/reproducing apparatus including an optical head unit comprising:

an objective lens for focusing light from the light source to a recording layer of the recording medium;

an objective lens moving mechanism for moving the objective lens in the optical axis direction and in the direction intersecting a guide groove and a signal mark string formed in said recording medium preliminarily;

a defocus detecting system for detecting a defocus in said objective lens;

a thickness unevenness detecting system, includes an optical device which, when the radius of a spot section of light which is a detection object is assumed to be 1, damps the amount of said light in a range of $r \leq 0.88$ or changes the phase characteristic of said light or changes the phase of said light while damping the amount of said light, for detecting a thickness unevenness in a transparent resin layer of the recording medium provided nearest said objective lens;

a defocus correcting mechanism for correcting the defocus of said objective lens by using a defocus detecting signal;

wherein
said defocus correcting mechanism corrects the defocus of said objective lens using the defocus detecting signal detected by said defocus detecting system and detects a thickness unevenness of the transparent resin layer using said thickness unevenness detecting signal detected by said thickness unevenness detecting system upon correcting the defocus so as to remove an influence of the defocus of said objective lens by removing an influence of the thickness unevenness of the transparent resin layer; and a thickness unevenness correcting mechanism for changing the focusing characteristic of light impinging upon said objective lens from said light source based on a change in the thickness of said transparent resin layer of said recording medium detected by said thickness detecting system, wherein the thickness unevenness of said transparent resin layer is detected using a defocus detecting signal detected by said defocus detecting system so as to remove an influence of the defocus of said objective lens by removing an influence of the thickness unevenness of the transparent resin layer.

Further another, the present invention can provide a method for compensating for an influence of thickness unevenness in a recording medium upon reproducing information recorded in the recording layer of the recording medium or recording information in said recording medium, including an optical head comprising: an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

moving said objective lens in a predetermined direction while a voltage whose magnitude changes gradually is applied to said thickness unevenness correcting mechanism, with said defocus correcting system turned off;

detecting that said objective lens is located in the vicinity of a focusing position by referring to the level of a sum signal of the defocus detecting signal outputted form individual photo detecting regions of said defocus detecting system;

activating said defocus correcting system when the sum level of said defocus detecting signal reaches a reference voltage;

moving said thickness unevenness correcting mechanism in the direction of decreasing the thickness unevenness correction amount detected by said thickness unevenness detecting system with respect to the recording layer on which light converged by said objective lens is focused; and activating said thickness unevenness correcting mechanism when the thickness unevenness detecting signal outputted by said thickness unevenness detecting system is substantially a reference voltage.

Still further, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

when changing the recording layer which light is focused by said objective lens from a currently focused recording layer to another recording layer, terminating changing of the focusing characteristic of light by the thickness unevenness correcting mechanism, terminating defocus correction control by the defocus correcting mechanism, and moving a light converging position by said objective lens.

Further another, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

when changing the recording layer which light is focused by said objective lens from a currently focused recording layer to another recording layer, terminating changing of the focusing characteristic of light by the thickness unevenness correcting mechanism, terminating defocus correction control by the defocus correcting mechanism, and moving a light converging position by said objective lens.

Still further, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

a level change in said thickness unevenness detecting signal is used so as to detect said objective lens erroneous move.

Further another, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

said thickness unevenness detecting mechanism is capable of generating at least two independent detecting signals and detecting said objective lens erroneous move by referring to a sum of the detecting signals outputted therefrom.

Still further, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

said thickness unevenness detecting mechanism is capable of generating at least two independent detecting signals and detecting said objective lens erroneous move by referring to a sum of the detecting signals outputted therefrom.

Further another, the present invention can provide a method for removing an influence of thickness unevenness in a recording medium upon reproducing information recorded in the recording layer of the recording medium or recording information in said recording medium, including an optical head comprising: a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system, said method comprising:

moving said objective lens in a predetermined direction while a voltage whose magnitude changes gradually is applied to said thickness unevenness correcting mechanism, with said defocus correcting system turned off;

detecting that said objective lens is located in the vicinity of a focusing position by referring to the level of a sum signal of the defocus detecting signal outputted form individual photo detecting regions of said defocus detecting system;

activating said defocus correcting system when said defocus detecting signal outputted from said defocus detecting system reaches a reference voltage;

moving said thickness unevenness correcting mechanism in the direction of decreasing the thickness unevenness correction amount detected by said thickness unevenness detecting system with respect to the recording layer on which said objective lens is focused;

activating said thickness unevenness correcting mechanism when the thickness unevenness detecting signal outputted by said thickness unevenness detecting system is substantially a reference voltage; and detecting the objective lens erroneous move that said objective lens is moved so as to focus light from a currently focused recording layer to another recording layer upon correcting said defocus.

Still further, the present invention can provide an information recording/reproducing apparatus for reproducing information recorded in the recording layer of a recording medium or recording information in said recording medium, comprising:

an optical head including an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving section moves said objective lens in a predetermined direction while a voltage whose magnitude changes gradually is applied to said thickness unevenness correcting mechanism, with said defocus correcting system turned off;

detecting section detects said objective lens is located in the vicinity of a focusing position by referring to the level of a sum signal of the defocus detecting signal outputted form individual photo detecting regions of said defocus detecting system;

first activating section controls said defocus correcting system when the sum level of said defocus detecting signals reaches a reference voltage;

moving control section controls said thickness unevenness correcting mechanism in the direction of decreasing the thickness unevenness correction amount detected by said thickness unevenness detecting system with respect to the recording layer on which said objective lens is focused; and second activating section controls said thickness unevenness correcting mechanism when the thickness unevenness detecting signal outputted by said thickness unevenness detecting system is substantially a reference voltage.

Further another, the present invention can provide an information recording/reproducing apparatus for reproducing information recorded in a recording layer of the recording medium and recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving section moves said objective lens in a predetermined direction while a voltage whose magnitude changes gradually is applied to said thickness unevenness correcting mechanism, with said defocus correcting system turned off;

detecting section detects said objective lens is located in the vicinity of a focusing position by referring to the level of a sum signal of the defocus detecting signal outputted form individual photo detecting regions of said defocus detecting system;

first activating section controls said defocus correcting system when the sum level of said defocus detecting signals reaches a reference voltage;

moving control section controls said thickness unevenness correcting mechanism in the direction of decreasing the thickness unevenness correction amount detected by said thickness unevenness detecting system with respect to the recording layer on which said objective lens is focused; and second activating section controls said thickness unevenness correcting mechanism when the thickness unevenness detecting signal outputted by said thickness unevenness detecting system is substantially a reference voltage;

when changing the recording layer which light is focused by said objective lens from a currently focused recording layer to another recording layer, terminating changing of the focusing characteristic of light by the thickness unevenness correcting mechanism, terminating defocus correction control by the defocus correcting mechanism, and moving a light converging position by said objective lens.

Still further, the present invention can provide an information recording/reproducing apparatus for reproducing information recorded in a recording layer of the recording medium and recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving section moves said objective lens in a predetermined direction while a voltage whose magnitude changes gradually is applied to said thickness unevenness correcting mechanism, with said defocus correcting system turned off;

detecting section detects said objective lens is located in the vicinity of a focusing position by referring to the level of a sum signal of the defocus detecting signal outputted form individual photo detecting regions of said defocus detecting system;

first activating section controls said defocus correcting system when the sum level of said defocus detecting signals reaches a reference voltage;

moving control section controls said thickness unevenness correcting mechanism in the direction of decreasing the thickness unevenness correction amount detected by said thickness unevenness detecting system with respect to the recording layer on which said objective lens is focused; and second activating section controls said thickness unevenness correcting mechanism when the thickness unevenness detecting signal outputted by said thickness unevenness detecting system is substantially a reference voltage;

when changing the recording layer which light is focused by said objective lens from a currently focused recording layer to another recording layer, terminating changing of the focusing characteristic of light by the thickness unevenness correcting mechanism, terminating defocus correction control by the defocus correcting mechanism, and moving a light converging position by said objective lens.

Further another, the present invention can provide an information recording/reproducing apparatus for reproducing information recorded in a recording layer of the recording medium and recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving section moves said objective lens in a predetermined direction while a voltage whose magnitude changes gradually is applied to said thickness unevenness correcting mechanism, with said defocus correcting system turned off;

detecting section detects said objective lens is located in the vicinity of a focusing position by referring to the level of a sum signal of the defocus detecting signal outputted form individual photo detecting regions of said defocus detecting system;

first activating section controls said defocus correcting system when the sum level of said defocus detecting signals reaches a reference voltage;

moving control section controls said thickness unevenness correcting mechanism in the direction of decreasing the thickness unevenness correction amount detected by said thickness unevenness detecting system with respect to the recording layer on which said objective lens is focused; and second activating section controls said thickness unevenness correcting mechanism when the thickness unevenness detecting signal outputted by said thickness unevenness detecting system is substantially a reference voltage;

when changing the recording layer which light is focused by said objective lens from a currently focused recording layer to another recording layer, terminating changing of the focusing characteristic of light by the thickness unevenness correcting mechanism, terminating defocus correction control by the defocus correcting mechanism, and moving a light converging position by said objective lens and using a level change in said thickness unevenness detecting signal to detect said objective lens erroneous move.

Still further, the present invention can provide an information recording/reproducing apparatus for reproducing information recorded in a recording layer of the recording medium and recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving section moves said objective lens in a predetermined direction while a voltage whose magnitude changes gradually is applied to said thickness unevenness correcting mechanism, with said defocus correcting system turned off;

detecting section detects said objective lens is located in the vicinity of a focusing position by referring to the level of a sum signal of the defocus detecting signal outputted form individual photo detecting regions of said defocus detecting system;

first activating section controls said defocus correcting system when the sum level of said defocus detecting signals reaches a reference voltage;

moving control section controls said thickness unevenness correcting mechanism in the direction of decreasing the thickness unevenness correction amount detected by said thickness unevenness detecting system with respect to the recording layer on which said objective lens is focused; and second activating section controls said thickness unevenness correcting mechanism when the thickness unevenness detecting signal outputted by said thickness unevenness detecting system is substantially a reference voltage;

wherein said thickness unevenness detecting mechanism is capable of generating at least two independent detecting signals and detecting said objective lens erroneous move by referring to a sum of the detecting signals outputted therefrom.

Further another, the present invention can provide an information recording/reproducing apparatus for reproducing information recorded in a recording layer of the recording medium and recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position, and for detecting an objective lens erroneous move that said objective lens is moved so as to focus light from a recording layer on which light converged by said objective lens is currently focused to another recording layer by using the thickness unevenness detecting signal outputted from the thickness unevenness detecting system; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

wherein said thickness unevenness detecting mechanism is capable of generating at least two independent detecting signals and detecting said objective lens erroneous move by referring to a sum of the detecting signals outputted therefrom.

Still further, the present invention can provide an information recording/reproducing apparatus for reproducing information recorded in the recording layer of a recording medium or recording information in said recording medium, comprising:

an optical head including a light source for supplying light of a predetermined wavelength; an objective lens for focusing light from a light source to a recording layer of a recording medium; a defocus detecting system for detecting a defocus generated when light converged to the recording medium by said objective lens is not focused at a predetermined position; a thickness unevenness detecting system including at least two photo detecting regions and for detecting a thickness unevenness (spherical aberration) in a transparent resin layer of the recording medium provided nearest said objective lens; a thickness unevenness correcting mechanism for changing focusing characteristic of light impinging upon said objective lens from a light source based on a change in thickness of the transparent resin layer of the recording medium detected by the thickness unevenness detecting system; and a defocus correcting mechanism for correcting a defocus detected by said defocus detecting system;

moving said objective lens in a predetermined direction while a voltage whose magnitude changes gradually is applied to said thickness unevenness correcting mechanism, with said defocus correcting system turned off;

detecting that said objective lens is located in the vicinity of a focusing position by referring to the level of a sum signal of the defocus detecting signal outputted form individual photo detecting regions of said defocus detecting system;

activating said defocus correcting system when the sum level of said defocus detecting signals reaches a reference voltage;

moving said thickness unevenness correcting mechanism in the direction of decreasing the thickness unevenness correction amount detected by said thickness unevenness detecting system with respect to the recording layer on which said objective lens is focused; and activating said thickness unevenness correcting mechanism when the thickness unevenness detecting signal outputted by said thickness unevenness detecting system is substantially a reference voltage;

wherein said optical head corrects a defocus of said objective lens using the defocus detection signal detected by said defocus detecting system and upon correcting the defocus, detects a thickness unevenness of said transparent resin layer by referring to a thickness unevenness detection signal detected from said optical system of said thickness unevenness detecting system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical head unit comprising:
a light source that supplies light of a predetermined wavelength;
an objective lens that focuses the light from the light source to the recording layer of a recording medium;
an objective lens moving mechanism that moves the objective lens in the optical axis direction and in the direction intersecting a guide groove and a signal mark string preliminarily formed in the recording medium;
a defocus detecting system that detects a defocus in the objective lens;
a thickness unevenness detecting system that detects a thickness unevenness in a transparent resin layer of the recording medium provided nearest to the objective lens; and a thickness unevenness correcting mechanism that changes a focusing characteristic of light impinging upon the objective lens from the light source based on a change in the thickness of the transparent resin layer of the recording medium detected by the thickness unevenness detecting system, the thickness unevenness correcting mechanism being operated with a smaller gain relative to a servo gain of a DC level of the frequency characteristic of a defocus correcting control circuit.

2. An information recording/reproducing apparatus for reproducing information recorded in a recording layer or recording the information in a recording medium, the information recording/reproducing apparatus including an optical head unit comprising:
a light source;
an objective lens that focuses light from the light source to the recording layer of the recording medium;
an objective lens moving mechanism that moves the objective lens in the optical axis direction and in the direction intersecting a guide groove and a signal mark string formed in the recording medium preliminarily;
a defocus detecting system that detects a defocus in the objective lens;
a thickness unevenness detecting system that detects a thickness unevenness in a transparent resin layer of the recording medium provided nearest the objective lens; and a thickness unevenness correcting mechanism that changes a focusing characteristic of the light impinging upon the objective lens from the light source based on a change in the thickness of the transparent resin layer of the recording medium detected by the thickness unevenness detecting system, the thickness unevenness correcting mechanism being operated with a smaller gain relative to a servo gain of a DC level of the frequency characteristic of a defocus correcting control circuit, wherein the thickness unevenness of the transparent resin layer is detected using a defocus detecting signal detected by the defocus detecting system so as to remove an influence of the defocus of the objective lens by removing an influence of the thickness unevenness of the transparent resin layer.

3. An information recording/reproducing apparatus according to claim 2, wherein the thickness unevenness detecting system includes at least two photo detecting regions, each detects a thickness unevenness in the transparent resin layer of the recording medium provided nearest the objective lens, and when changing the recording layer on which light is focused by the objective lens from a currently focused recording layer to another recording layer, terminating changing of a focusing characteristic of the light by the thickness unevenness correcting mechanism, terminating defocus correction control by the defocus correcting mechanism, and moving a light converging position by the objective lens.

4. An information recording/reproducing apparatus according to claim 2, further comprising:

moving the objective lens in a predetermined direction while a voltage whose magnitude changes gradually is applied to the thickness unevenness correcting mechanism, with a defocus correcting system turned off;

detecting that the objective lens is located in the vicinity of a focusing position by referring to the level of a sum signal of the defocus detecting signal outputted from individual photo detecting regions of the defocus detecting system;

activating the defocus correcting system when the sum level of the defocus detecting signals reaches a reference voltage;

moving the thickness unevenness correcting mechanism in the direction of decreasing the thickness unevenness correction amount detected by the thickness unevenness detecting system with respect to the recording layer on which the objective lens is focused;

activating the thickness unevenness correcting mechanism when the thickness unevenness detecting signal outputted by the thickness unevenness detecting system is substantially equal to a reference voltage; and when changing the recording layer on which light is focused by the objective lens from a currently focused recording layer to another recording layer, terminating changing of the focusing characteristic of light by the thickness unevenness correcting mechanism, terminating defocus correction control by the defocus correcting system, and moving a light converging position by the objective lens.

* * * * *